US008139787B2

United States Patent

Haykin et al.

(10) Patent No.: US 8,139,787 B2

(45) Date of Patent: Mar. 20, 2012

(54) METHOD AND DEVICE FOR BINAURAL SIGNAL ENHANCEMENT

(76) Inventors: Simon Haykin, Ancaster (CA); Rong Dong, Hamilton (CA); Simon Doclo, Schilde (BE); Marc Moonen, Herent-Winksele (BE)

( * ) Notice: Subject to any disclaimer, the term of this patent is extended or adjusted under 35 U.S.C. 154(b) by 465 days.

(21) Appl. No.: 12/066,148

(22) PCT Filed: Sep. 8, 2006

(86) PCT No.: PCT/CA2006/001476

§ 371 (c)(1), (2), (4) Date: May 26, 2009

(87) PCT Pub. No.: WO2007/028250

PCT Pub. Date: Mar. 15, 2007

(65) Prior Publication Data

US 2009/0304203 A1 Dec. 10, 2009

Related U.S. Application Data

(60) Provisional application No. 60/715,134, filed on Sep. 9, 2005.

(51) Int. Cl.
*H04B 15/00* (2006.01)

(52) U.S. Cl. ........................................ 381/94.1; 704/226

(58) Field of Classification Search .............. 381/92–94, 381/94.1, 94.2, 94.3; 704/223, 226, 112, 704/233

See application file for complete search history.

(56) References Cited

U.S. PATENT DOCUMENTS 4,956,867 A 9/1990 Zurek et al.
5,473,701 A 12/1995 Cezanne et al.
5,473,759 A 12/1995 Slaney et al.
5,511,128 A 4/1996 Lindemann
5,627,799 A 5/1997 Hoshuyama
5,651,071 A 7/1997 Lindemann et al.
5,675,659 A 10/1997 Torkkola
6,185,309 B1 2/2001 Attias (Continued)

FOREIGN PATENT DOCUMENTS

EP 1017253 7/2000

(Continued)

OTHER PUBLICATIONS

Parra & Spence, "Convolutive blind separation of non-stationary sources", IEEE Trans. Speech and Audio Processing, vol. 8, No. 3, pp. 320-327, May 2000.

(Continued)

*Primary Examiner* — Nathan Ha
(74) *Attorney, Agent, or Firm* — Bereskin & Parr

(57) ABSTRACT

Various embodiments for components and associated methods that can be used in a binaural speech enhancement system are described. The components can be used, for example, as a pre-processor for a hearing instrument and provide binaural output signals based on binaural sets of spatially distinct input signals that include one or more input signals. The binaural signal processing can be performed by at least one of a binaural spatial noise reduction unit and a perceptual binaural speech enhancement unit. The binaural spatial noise reduction unit performs noise reduction while preferably preserving the binaural cues of the sound sources. The perceptual binaural speech enhancement unit is based on auditory scene analysis and uses acoustic cues to segregate speech components from noise components in the input signals and to enhance the speech components in the binaural output signals.

35 Claims, 14 Drawing Sheets

U.S. PATENT DOCUMENTS

| | | | | |
|---|---|---|---|---|
| 6,222,927 | B1 | 4/2001 | Feng et al. | |
| 6,424,960 | B1 | 7/2002 | Lee et al. | |
| 6,449,586 | B1 | 9/2002 | Hoshuyama | |
| 6,757,395 | B1 | 6/2004 | Fang et al. | |
| 6,865,490 | B2 | 3/2005 | Cauwenberghs et al. | |
| 6,901,363 | B2 | 5/2005 | Balan et al. | |
| 7,499,686 | B2 * | 3/2009 | Sinclair et al. | 455/223 |
| 7,672,466 | B2 * | 3/2010 | Yamada et al. | 381/94.7 |
| 7,680,656 | B2 * | 3/2010 | Zhang et al. | 704/233 |
| 7,881,480 | B2 * | 2/2011 | Buck et al. | 381/94.1 |
| 7,965,834 | B2 * | 6/2011 | Alves et al. | 379/406.13 |
| 2001/0031053 | A1 * | 10/2001 | Feng et al. | 381/92 |
| 2002/0041695 | A1 | 4/2002 | Luo | |
| 2003/0138115 | A1 * | 7/2003 | Krochmal et al. | 381/94.1 |
| 2003/0138116 | A1 * | 7/2003 | Jones et al. | 381/94.1 |
| 2004/0037438 | A1 * | 2/2004 | Liu et al. | 381/94.1 |
| 2004/0196994 | A1 | 10/2004 | Kates | |
| 2004/0252852 | A1 | 12/2004 | Taenzer | |
| 2005/0060142 | A1 * | 3/2005 | Visser et al. | 704/201 |
| 2005/0069162 | A1 | 3/2005 | Haykin et al. | |
| 2011/0172997 | A1 * | 7/2011 | Yang et al. | 704/226 |

FOREIGN PATENT DOCUMENTS

| | | |
|---|---|---|
| WO | 200197558 | 12/2001 |
| WO | 200203749 | 1/2002 |
| WO | 2005006808 | 1/2005 |

OTHER PUBLICATIONS

Buchner, Aichner & Kellermann, "A Generalization of Blind Source Separation Algorithms for Conveolutive Mixtures Based on Second-Order Statistics", IEEE Trans. Speech and Audio Processing, vol. 13, No. 1, pp. 120-134, Jan. 2005.

Doclo & Moonen, "GSVD-base optimal filtering for single and multi-microphone speech enhancement", IEEE Trans. Speech and Audio Processing, vol. 50, No. 9, pp. 2230-2244, Sep. 2002.

Maj, Moonen, & Woulters, "SVD-based optimal filtering technique for noise reduction in hearing aids using two microphones", EURASIP Journal on applied signal processing, vol. 2002, No. 4, pp. 432-443, Apr. 2002.

Klasen, Van Den Bogaert, Moonen & Woulters, "Preservation of interaural time delay for binaural hearing aids through multi-channel wiener filtering based noise reduction", in Proc. IEEE Int. Conf. Acoustics, Speech, and Signal Processing, Philadelphia, PA, USA, Mar. 2005, pp. 29-32.

Klasen, Van Den Bogaert, Moonen & Woulters, "Binaural noise reduction for hearing aids: Preserving interaural time delay cues", in Proc. Of the IEEE Benelux Signal Processing Symposium, Antwerp, Belgium, Apr. 2005, pp. 23-26.

Rosenthal & Okun, "Computational Auditory Scene Analysis", Lawrence Erlbaum Associates, 1998.

Ellis, "Modeling the auditory organization of speech—a summary and some comments", In Listening to Speech: An auditory perspective, Oxford University Press, 1999.

Cooke & Ellis, "The auditory organization of speech and other sources in listeners and computational models", Speech Communication, vol. 35, No. 3-4, pp. 141-177, Oct. 2001.

Brown & Wang, "Spearation of speech by computation auditory scene analysis", Ch. 16 in Speech Enhancement, Springer-Verlag, pp. 371-402, 2005.

Nakatani & Okuno, " Harmonic sound stream segregation using localisation and its applicaiton to speech stream segregation", Speech Communication, vol. 27, No. 3-4, pp. 209-222, Apr. 1999.

Shamsoddino & Denbigh, "A sound segregation algorithm for reverberant conditions", Speech Communication, vol. 33, No. 3, pp. 179-196, Feb. 2001.

Nix, Kleinschmidt & Hohmann, "Computational Auditory Scene Analysis by using statistics of high-dimensional speech dynamics and sound source direction", in Proc. EUROSPEECH, Geneva, Switerland, Sep. 2003, pp. 1441-1444.

Ellis, "Prediction-driven computational auditory scene analysis", Ph. D. Thesis, MIT, USA, 1996: Wang & Brown, "Separation of Speech from Interfering sounds using oscillartory correlation", IEEE Trans. On Neural Networks, vol. 10., No. 3, pp. 684-697, May 1999.

Parsons, "Separation of speech from interfering speech by means of harmonic selection", J. Acoust. Soc. Amer. vol. 60, No. 4, pp. 911-918, Oct. 1976.

Karjalainen & Tolonen, "Multi-pitch and periodicity analysis model for sound separation and auditory scene analysis", in Proc. IEEE Trans. Int. Conf. Acoustics, Speech, and Signal Processing, Phoenix, AZ, USA, Mar. 1999, pp. 929-932.

Hu & Wang, "Monaural Speech segregation based on pitch tracking and amplitude modulation", IEEE Trans. On Neural Networks, vol. 15, No. 5, pp. 1135-1150, Sep. 2004.

Kollmeier & Koch, "Speech enhancement based on physiological and psychoacoustical models of modulation perception and binaural interaction", J. Acoust. Soc. Amer. vol. 95, No. 3, pp. 1593-1602, Mar. 1994.

Brown & Cooke, "Computational auditory scene analysis", Computer Speech and Language, vol. 8, No. 4, pp. 297-336, Oct. 1994.

Fishbach, "Auditory Scenes Analysis: Primary Segmentation and Feature Estimation", in Computational Auditory Scene Analysis, Lawrence Erlbaum Associates, pp. 105-114, 1998.

Lyon, "Computational models of binaural localization and separation", in Proc. IEEE Int. Conf. Acoustics, Speech, and Signal Processing, Boston, MA, USA, pp. 1148-1151, Apr. 1983.

Bodden, "Binaural modelling and auditory scene analysis", in Proc. IEEE Workshop on Applications of Signal Processing to Audio and Acoustics, New Paltz Ny, USA, pp. 31-34, Oct. 1995.

Roman, Wang & Brown, "Speech segregation based on sound localization", J. Acoust. Soc. Amer. vol. 114, No. 4, pp. 2236-2252, Oct. 2003.

Wittkopp, "Two-Channel Noise Reduction Algorithms Motivated by Models of Binaural Interaction", Ph. D. Thesis, University of Oldenburg, Mar. 2001.

Woods, Hansen, Wittkop & Kollmeier, "A simple architecture for using multiple cues in sound separation", in Int. Conf. On Spoken Language Processing (ICSLP), Philadelphia PA, USA, pp. 909-912, Oct. 1996.

Godsmark & Brown, "A blackboard architecture for computational auditory scene analysis", Speech Communication, vol. 27, No. 3-4, pp. 351-366, Apr. 1999; Ellis, Prediction-driven computational auditory scene analysis, Ph.D Thesis, MIT, USA, 1996.

Nishimura et al.: "A New Adaptive Binaural Microphone Array System Using a Weighted Least Squares Algorithm", Proceedings (ICASSP '02) IEEE International Conference on Acoustics, Speech and Signal Processing, 2002, May 13-17, 2002, vol. 2, pp. 1925-1928, Orlando, United States.

Cherry: Some experiments on the recognition of speech, with one and with two ears:, J. Acoust. Soc. Amer., vol. 25, No. 5, pp. 975-979, Sep. 1953.

Haykin et al.: "The Cocktail Party Problem" Neural Computation, vol. 17, No. 9, pp. 1875-1902, Sep. 2005.

Bregman "Auditory Scene Analysis", MIT Press, 1990.

Moore "Speech Processing for the hearing-impaired: Successes, failures, and implications for speech mechanisms", Sppech Communication, vol. 41, No. 1, pp. 81-91, Aug. 2003.

Bondy et al.: "A Novel singal-processing strategy for hearing-aid design: neurocompensation", Signal Processing, vol. 84, No. 7, pp. 1239-1253, Jul. 2004.

Vaindyanathan: "Multirate Systems and Filter Banks", Prentice Hall, 1992.

Shynk: "Frequency-domain and multirate adaptive filtering", IEEE Signal Processing Magazine, vol. 9, No. 1, pp. 14-37, Jan. 1992.

Frost: "An Algorithm for linearly constrained adaptive array processing", Proc. Of the IEEE, vol. 60, pp. 926-935, Aug. 1972.

Gannot et al.: "Signal Enhancement Using Beamforming and Non-Stationarity with Applications to Speech", IEEE Trans. Signal Processing, vol. 49, No. 8, pp. 1614-1626, Aug. 2001.

Griffiths et al.: "An Alternative approach to linearly constrained adaptive beamforming", IEEE Trans. Antennas Propagation, vol. 30, pp. 27-34, Jan. 1982.

Haykin : "Adaptive Filter Theory", Prentice-Hall, 2001.

Cox et al.: " Robust adaptive beamforming:, IEEE Trans. Acoust. Speech and Signal Processing", vol. 35, No. 10, pp. 1365-1376, Oct. 1987.
Gardner et al.: "HRTF measurements of a KEMAR", J. Accoust. Soc. Am. vol. 97, No. 6, pp. 3907-3908, Jun. 1995.
Algazi et al.: "Approximating the head-related transfer function using simple geometric models of the head and torso", J. Accoust. Soc. Am. vol. 112, No. 5, pp. 20953-2064, Nov. 2002.
Wightman et al. : "The dominant role of low-frequency interaural time difference in sound localization", J. Accoust. Soc. Am. vol. 91, No. 3, pp. 1648-1661, Mar. 1992.
Slaney: "An Efficient Implementation of the Patterson-Holdworth Auditory Filterbank", Apple Computer 1993.
Irino et al.: "A time-varying, analysis/synthesis auditory filterbank using the gammachirp", in Proc. IEEE Int. Conf. Acoustics, Speech, and Signal Processing, Seattle WA, USA, May 1998, pp. 3653-3656.
Blimes: "Timing is of the Essence: Perceptual and Computational Techniques for Representing, Learning, and Reproducing Expressive Timing in Percussive Rhythm", Master Thesis, MIT, USA, 1993.
Scheirer: Tempo and Beat Analysis of Acoustic Musical Sygnals:, J. Acoust. Soc. Amer., vol. 103, No. 1, pp. 588-601, Jan. 1998.
Fishbach et al.: Auditory Edge Dectection: A Neural Model for Physiological and Phychoacoustical Responses to Amplitude Transients: Journal of Neurophysiology, vol. 85, pp. 2303-2323, 2001.
Drullman et al. : "Effect of temporal envelopesmearing on speech reception", J. Accoust. Soc. Amer. vol. 95, No. 2, pp. 1053-1064, Feb. 1994.
Drullman et al.: "Effect of reducing slow temporal modulations on speech reception", J. Accoust. Soc. Amer. vol. 95, No. 5, pp. 2670-2680, May 1994.
Lin et al. : "Auditory filter bank inversion", In. Proc. IEEE Int. Symp. On Circuits and Systems, Sydney, Australia, May 2001, pp. 537-540.
International Preliminary Report on Patentability, received in the corresponding International Patent Application Serial No. PCT/CA2006/001476, dated Mar. 2008.
International Search Report, received in the corresponding International Patent Application Serial No. PCT/CA2006/001476, dated Jan. 2, 2007.
Soede, Berkhout & Bilsen: "Development of a directional hearing instrument based on array technology", J. Acoust. Soc. Amer., vol. 94, No. 2, pp. 785-798, Aug. 1993.
Stadler & Rabinowitz : "On the potential of fixed arrays for hearing aids", J. Acoust. Soc. Amer. vol. 94, No. 3, pp. 1332-1342, Sep. 1993.
Kates: "Superdirective arrays for hearing aids", J. Acoust. Soc. Amer. vol. 94, No. 4, pp. 1930-1933, Oct. 1993.
Sydow: "Broadband beamforming for a microphone array", J. Acoust. Soc. Amer. vol. 96, No. 2, pp. 845-849, Aug. 1994.
Desloge, Rabinowitz & Zurek, "Microphone-array hearing aids with binaural output-Part 1: Fixed processing systems", IEEE Trans. Speech and Audio Processing, vol. 5, No. 6, pp. 529-542, Nov. 1997.
Merks, Boone & Berkhout: "Design of a broadside array for a binaural hearing aid", in Proc. IEEE, Workshop on Applications of Signal Processing to Audio and Acoustics, New Paltz NY, USA, Oct. 1997.
Lotter: "Single and multimicrophone speech enhancement for hearing aids", Ph. D. Thesis, RWTH Aachen, Germany, Aug. 2004.
Goto et al.:"Beat tracking based on Multiple-agent architecture—A Real-time beat tracking system for Audio sygnals", In Proc. Int. Conf. On Multiagent Systems, 1996, pp. 103-110.
Bai & Lin, "Microphone array signal processing with application in three-dimensional hearing", J. Acoust. Soc. Amer. vol. 117, No. 4, pp. 2112-2121, Apr. 2005.
Nordebo, Claesson & Nordholm, "Adaptive beamforming: Spatial filter designed blocking matrix" IEEE Journal of Oceanic Engineering, vol. 19, No. 4, pp. 583-590, Oct. 1994.
Hoshuyama, Suglyama & Hirano, "A robust adaptive beamforming for microphone arrays with a blocking matrix using constrained adaptive filters", IEEE Trans. Signal Processing, vol. 47, pp. 2677-2684, Oct. 1999.
Herbordt & Kellermann, "Adaptive beamforming for audio signal acquistion", chapter 6in Adaptive Signal Processing: Applications to Real-World Problems, pp. 155-194, Springer-Verlag, 2003.
Spriet, Moonen & Wouters, "Spatially pre-processed speech distortion weighted multi-channel Wiener Filtering for noise reduction", Signal Processing vol. 84, pp. 2367-2387, Dec. 2004.
Doclo, Spriet, Wouters & Moonen: "Speech Distortion weighted multichannel wiener filtering techniques for noise reduction", Chapter 9 in Speech Enhancement, pp. 199-228, Springer-Verlag, 2005.
Greenberg & Zurek, "Evaluation of an Adaptive Beamforming Method for Hearing Aids", J. Acoust. Soc. Amer. vol. 91, No. 3, pp. 1662-1676, Mar. 1992.
Kompis & Dillier, "Noise reduction for Hearing Aids: Combining Directional Microphones with an Adaptive Beamformer", J. Acoust. Soc. Amer. vol. 96, No. 3, pp. 1910-1913, Sep. 1994.
Vanden Berghe & Woulters, "An adaptive noise canceller for hearing aids using two nearby microphones", J. Acoust. Soc. Amer. vol. 103, No. 6, pp. 3621-3626, Jun. 1998.
Luo, Yang, Pavlovic & Nehoral, "Adaptive Null-Forming Scheme in Digital Hearing Aids", IEEE Trans. Signal Processing, vol. 50, No. 7, pp. 1583-1590, Jul. 2002.
Maj, Wouters & Moonen, "Noise reduction results of an adaptive filtering technique for dual-microphone behind-the-ear hearing aids", Ear and Hearing, vol. 25, pp. 215-229, Jun. 2004.
Liu, Wheeler, O'Brien, Lansing, Bilger, Jones & Feng, "A two-microphone dual delay-line approach for extraction of speech sound in the presence of multiple interferes", J. Acoust. Soc. Amer. vol. 110, No. 6, pp. 3218-3231, Dec. 2001.
Welker, Greenberg, Desloge & Zurek, "Microphone-array hearing aids with binaural output-Part II: A two-microphone adaptive system", IEEE Trans. Speech and Audio Processing, vol. 5, No. 6, pp. 543-551, Nov. 1997.
Suzuki, Tsukui, Asano, Nishimura & Sone, New design method of a binaural microphone array using multiple constraints, IEICE Trans. Fundamentals, vol. E82-A, No. 4, pp. 588-596, Apr. 1999.
Comon, "Independent component analysis, A new concept?", Signal Processing, vol. 36, No. 3, pp. 287-314, Apr. 1994.
Bell & Sejnowski, "An information-maximisation approach to blind separation and blind deconvolution", Neural Computation, vol. 7, No. 6, pp. 1004-1034, 1995.

* cited by examiner

METHOD AND DEVICE FOR BINAURAL SIGNAL ENHANCEMENT

FIELD

Various embodiments of a method and device for binaural signal processing for speech enhancement for a hearing instrument are provided herein.

BACKGROUND

Hearing impairment is one of the most prevalent chronic health conditions, affecting approximately 500 million people world-wide. Although the most common type of hearing impairment is conductive hearing loss, resulting in an increased frequency-selective hearing threshold, many hearing impaired persons additionally suffer from sensorineural hearing loss, which is associated with damage of hair cells in the cochlea. Due to the loss of temporal and spectral resolution in the processing of the impaired auditory system, this type of hearing loss leads to a reduction of speech intelligibility in noisy acoustic environments.

In the so-called "cocktail party" environment, where a target sound is mixed with a number of acoustic interferences, a normal hearing person has the remarkable ability to selectively separate the sound source of interest from the composite signal received at the ears, even when the interferences are competing speech sounds or a variety of non-stationary noise sources (see e.g. Cherry, *"Some experiments on the recognition of speech, with one and with two ears", J. Acoust. Soc. Amer.*, vol. 25, no. 5, pp. 975-979, September 1953; Haykin & Chen, "*The Cocktail Party Problem", Neural Computation*, vol. 17, no. 9, pp. 1875-1902, September 2005).

One way of explaining auditory sound segregation in the "cocktail party" environment is to consider the acoustic environment as a complex scene containing multiple objects and to hypothesize that the normal auditory system is capable of grouping these objects into separate perceptual streams based on distinctive perceptual cues. This process is often referred to as auditory scene analysis (see e.g. Bregman, "*Auditory Scene Analysis", MIT Press,* 1990).

According to Bregman, sound segregation consists of a two-stage process: feature selection/calculation and feature grouping. Feature selection essentially involves processing the auditory inputs to provide a collection of favorable features (e.g. frequency-selective, pitch-related, temporal-spectral like features). The grouping process, on the other hand, is responsible for combining the similar elements according to certain principles into one or more coherent streams, where each stream corresponds to one informative sound source. Grouping processes may be data-driven (primitive) or schema-driven (knowledge-based). Examples of primitive grouping cues that may be used for sound segregation include common onsets/offsets across frequency bands, pitch (fundamental frequency) and harmonically, same location in space, temporal and spectral modulation, pitch and energy continuity and smoothness.

In noisy acoustic environments, sensorineural hearing impaired persons typically require a signal-to-noise ratio (SNR) up to 10-15 dB higher than a normal hearing person to experience the same speech intelligibility (see e.g. Moore, "*Speech processing for the hearing-impaired: successes, failures, and implications for speech mechanisms", Speech Communication*, vol. 41, no. 1, pp. 81-91, August 2003). Hence, the problems caused by sensorineural hearing loss can only be solved by either restoring the complete hearing functionality, i.e. completely modeling and compensating the sensorineural hearing loss using advanced non-linear auditory models (see e.g. Bondy, Becker, Bruce, Trainor & Haykin, *"A novel signal-processing strategy for hearing-aid design: neurocompensation", Signal Processing*, vol. 84, no. 7, pp. 1239-1253, July 2004; US2005/069162, "Binaural adaptive hearing aid"), and/or by using signal processing algorithms that selectively enhance the useful signal and suppress the undesired background noise sources.

Many hearing instruments currently have more than one microphone, enabling the use of multi-microphone speech enhancement algorithms. In comparison with single-microphone algorithms, which can only use spectral and temporal information, multi-microphone algorithms can additionally exploit the spatial information of the speech and the noise sources. This generally results in a higher performance, especially when the speech and the noise sources are spatially separated. The typical microphone array in a (monaural) multi-microphone hearing instrument consists of closely spaced microphones in an endfire configuration. Considerable noise reduction can be achieved with such arrays, at the expense however of increased sensitivity to errors in the assumed signal model, such as microphone mismatch, look direction error and reverberation.

Many hearing impaired persons have a hearing loss in both ears, such that they need to be fitted with a hearing instrument at each ear (i.e. a so-called bilateral or binaural system). In many bilateral systems, a monaural system is merely duplicated and no cooperation between the two hearing instruments takes place. This independent processing and the lack of synchronization between the two monaural systems typically destroys the binaural auditory cues. When these binaural cues are not preserved, the localization and noise reduction capabilities of a hearing impaired person are reduced.

SUMMARY

In one aspect, at least one embodiment described herein provides a binaural speech enhancement system for processing first and second sets of input signals to provide a first and second output signal with enhanced speech, the first and second sets of input signals being spatially distinct from one another and each having at least one input signal with speech and noise components. The binaural speech enhancement system comprises a binaural spatial noise reduction unit for receiving and processing the first and second sets of input signals to provide first and second noise-reduced signals, the binaural spatial noise reduction unit is configured to generate one or more binaural cues based on at least the noise component of the first and second sets of input signals and performs noise reduction while attempting to preserve the binaural cues for the speech and noise components between the first and second sets of input signals and the first and second noise-reduced signals; and, a perceptual binaural speech enhancement unit coupled to the binaural spatial noise reduction unit, the perceptual binaural speech enhancement unit being configured to receive and process the first and second noise-reduced signals by generating and applying weights to time-frequency elements of the first and second noise-reduced signals, the weights being based on estimated cues generated from the at least one of the first and second noise-reduced signals.

The estimated cues can comprise a combination of spatial and temporal cues.

The binaural spatial noise reduction unit can comprise: a binaural cue generator that is configured to receive the first and second sets of input signals and generate the one or more binaural cues for the noise component in the sets of input signals; and a beamformer unit coupled to the binaural cue generator for receiving the one or more generated binaural cues and processing the first and second sets of input signals to produce the first and second noise-reduced signals by minimizing the energy of the first and second noise-reduced signals under the constraints that the speech component of the first noise-reduced signal is similar to the speech component of one of the input signals in the first set of input signals, the speech component of the second noise-reduced signal is similar to the speech component of one of the input signals in the second set of input signals and that the one or more binaural cues for the noise component in the first and second sets of input signals is preserved in the first and second noise-reduced signals.

The beamformer unit can perform the TF-LCMV method extended with a cost function based on one of the one or more binaural cues or a combination thereof.

The beamformer unit can comprise: first and second filters for processing at least one of the first and second set of input signals to respectively produce first and second speech reference signals, wherein the speech component in the first speech reference signal is similar to the speech component in one of the input signals of the first set of input signals and the speech component in the second speech reference signal is similar to the speech component in one of the input signals of the second set of input signals; at least one blocking matrix for processing at least one of the first and second sets of input signals to respectively produce at least one noise reference signal, where the at least one noise reference signal has minimized speech components; first and second adaptive filters coupled to the at least one blocking matrix for processing the at least one noise reference signal with adaptive weights; an error signal generator coupled to the binaural cue generator and the first and second adaptive filters, the error signal generator being configured to receive the one or more generated binaural cues and the first and second noise-reduced signals and modify the adaptive weights used in the first and second adaptive filters for reducing noise and attempting to preserve the one or more binaural cues for the noise component in the first and second noise-reduced signals. The first and second noise-reduced signals can be produced by subtracting the output of the first and second adaptive filters from the first and second speech reference signals respectively.

The generated one or more binaural cues can comprise at least one of interaural time difference (ITD), interaural intensity difference (IID), and interaural transfer function (ITF).

The one or more binaural cues can be additionally determined for the speech component of the first and second set of input signals.

The binaural cue generator can be configured to determine the one or more binaural cues using one of the input signals in the first set of input signals and one of the input signals in the second set of input signals.

Alternatively, the one or more desired binaural cues can be determined by specifying the desired angles from which sound sources for the sounds in the first and second sets of input signals should be perceived with respect to a user of the system and by using head related transfer functions.

In an alternative, the beamformer unit can comprise first and second blocking matrices for processing at least one of the first and second sets of input signals respectively to produce first and second noise reference signals each having minimized speech components and the first and second adaptive filters are configured to process the first and second noise reference signals respectively.

In another alternative, the beamformer unit can further comprise first and second delay blocks connected to the first and second filters respectively for delaying the first and second speech reference signals respectively, and wherein the first and second noise-reduced signals are produced by subtracting the output of the first and second delay blocks from the first and second speech reference signals respectively.

The first and second filters can be matched filters.

The beamformer unit can be configured to employ the binaural linearly constrained minimum variance methodology with a cost function based on one of an Interaural Time Difference (ITD) cost function, an Interaural Intensity Difference (IID) cost function and an Interaural Transfer function cost (ITF) function for selecting values for weights.

The perceptual binaural speech enhancement unit can comprise first and second processing branches and a cue processing unit. A given processing branch can comprise: a frequency decomposition unit for processing one of the first and second noise-reduced signals to produce a plurality of time-frequency elements for a given frame; an inner hair cell model unit coupled to the frequency decomposition unit for applying nonlinear processing to the plurality of time-frequency elements; and a phase alignment unit coupled to the inner hair cell model unit for compensating for any phase lag amongst the plurality of time-frequency elements at the output of the inner hair cell model unit. The cue processing unit can be coupled to the phase alignment unit of both processing branches and can be configured to receive and process first and second frequency domain signals produced by the phase alignment unit of both processing branches. The cue processing unit can further be configured to calculate weight vectors for several cues according to a cue processing hierarchy and combine the weight vectors to produce first and second final weight vectors.

The given processing branch can further comprise: an enhancement unit coupled to the frequency decomposition unit and the cue processing unit for applying one of the final weight vectors to the plurality of time-frequency elements produced by the frequency decomposition unit; and a reconstruction unit coupled to the enhancement unit for reconstructing a time-domain waveform based on the output of the enhancement unit.

The cue processing unit can comprise: estimation modules for estimating values for perceptual cues based on at least one of the first and second frequency domain signals, the first and second frequency domain signals having a plurality of time-frequency elements and the perceptual cues being estimated for each time-frequency element; segregation modules for generating the weight vectors for the perceptual cues, each segregation module being coupled to a corresponding estimation module, the weight vectors being computed based on the estimated values for the perceptual cues; and combination units for combining the weight vectors to produce the first and second final weight vectors.

According to the cue processing hierarchy, weight vectors for spatial cues can be first generated to include an intermediate spatial segregation weight vector, weight vectors for temporal cues can then generated based on the intermediate spatial segregation weight vector, and weight vectors for temporal cues can then combined with the intermediate spatial segregation weight vector to produce the first and second final weight vectors.

The temporal cues can comprise pitch and onset, and the spatial cues can comprise interaural intensity difference and interaural time difference.

The weight vectors can include real numbers selected in the range of 0 to 1 inclusive for implementing a soft-decision process wherein for a given time-frequency element. A higher weight can be assigned when the given time-frequency element has more speech than noise and a lower weight can be assigned when the given time-frequency element has more noise than speech.

The estimation modules which estimate values for temporal cues can be configured to process one of the first and second frequency domain signals, the estimation modules which estimate values for spatial cues can be configured to process both the first and second frequency domain signals, and the first and second final weight vectors are the same.

Alternatively, one set of estimation modules which estimate values for temporal cues can be configured to process the first frequency domain signal, another set of estimation modules which estimate values for temporal cues can be configured to process the second frequency domain signal, estimation modules which estimate values for spatial cues can be configured to process both the first and second frequency domain signals, and the first and second final weight vectors are different.

For a given cue, the corresponding segregation module can be configured to generate a preliminary weight vector based on the values estimated for the given cue by the corresponding estimation unit, and to multiply the preliminary weight vector with a corresponding likelihood weight vector based on a priori knowledge with respect to the frequency behaviour of the given cue.

The likelihood weight vector can be adaptively updated based on an acoustic environment associated with the first and second sets of input signals by increasing weight values in the likelihood weight vector for components of a given weight vector that correspond more closely to the final weight vector.

The frequency decomposition unit can comprise a filterbank that approximates the frequency selectivity of the human cochlea.

For each frequency band output from the frequency decomposition unit, the inner hair cell model unit can comprise a half-wave rectifier followed by a low-pass filter to perform a portion of nonlinear inner hair cell processing that corresponds to the frequency band.

The perceptual cues can comprise at least one of pitch, onset, interaural time difference, interaural intensity difference, interaural envelope difference, intensity, loudness, periodicity, rhythm, offset, timbre, amplitude modulation, frequency modulation, tone harmonicity, formant and temporal continuity.

The estimation modules can comprise an onset estimation module and the segregation modules can comprise an onset segregation module.

The onset estimation module can be configured to employ an onset map scaled with an intermediate spatial segregation weight vector.

The estimation modules can comprise a pitch estimation module and the segregation modules can comprise a pitch segregation module.

The pitch estimation module can be configured to estimate values for pitch by employing one of: an autocorrelation function resealed by an intermediate spatial segregation weight vector and summed across frequency bands; and a pattern matching process that includes templates of harmonic series of possible pitches.

The estimation modules can comprise an interaural intensity difference estimation module, and the segregation modules can comprise an interaural intensity difference segregation module.

The interaural intensity difference estimation module can be configured to estimate interaural intensity difference based on a log ratio of local short time energy at the outputs of the phase alignment unit of the processing branches.

The cue processing unit can further comprise a lookup table coupling the IID estimation module with the IID segregation module, wherein the lookup table provides IID-frequency-azimuth mapping to estimate azimuth values, and wherein higher weights can be given to the azimuth values closer to a centre direction of a user of the system.

The estimation modules can comprise an interaural time difference estimation module and the segregation modules can comprise an interaural time difference segregation module.

The interaural time difference estimation module can be configured to cross-correlate the output of the inner hair cell unit of both processing branches after phase alignment to estimate interaural time difference.

In another aspect, at least one embodiment described herein provides a method for processing first and second sets of input signals to provide a first and second output signal with enhanced speech, the first and second sets of input signals being spatially distinct from one another and each having at least one input signal with speech and noise components. The method comprises:

a) generating one or more binaural cues based on at least the noise component of the first and second set of input signals;

b) processing the two sets of input signals to provide first and second noise-reduced signals while attempting to preserve the binaural cues for the speech and noise components between the first and second sets of input signals and the first and second noise-reduced signals; and, c) processing the first and second noise-reduced signals by generating and applying weights to time-frequency elements of the first and second noise-reduced signals, the weights being based on estimated cues generated from the at least one of the first and second noise-reduced signals.

The method can further comprise combining spatial and temporal cues for generating the estimated cues.

Processing the first and second sets of input signals to produce the first and second noise-reduced signals can comprise minimizing the energy of the first and second noise-reduced signals under the constraints that the speech component of the first noise-reduced signal is similar to the speech component of one of the input signals in the first set of input signals, the speech component of the second noise-reduced signal is similar to the speech component of one of the input signals in the second set of input signals and that the one or more binaural cues for the noise component in the input signal sets is preserved in the first and second noise-reduced signals.

Minimizing can comprise performing the TF-LCMV method extended with a cost function based on one of: an Interaural Time Difference (ITD) cost function, an Interaural Intensity Difference (IID) cost function, an Interaural Transfer function cost (ITF) and a combination thereof.

The minimizing can further comprise:

applying first and second filters for processing at least one of the first and second set of input signals to respectively produce first and second speech reference signals, wherein the first speech reference signal is similar to the speech component in one of the input signals of the first set of input signals and the second reference signal is similar to the speech component in one of the input signals of the second set of input signals;

applying at least one blocking matrix for processing at least one of the first and second sets of input signals to respectively produce at least one noise reference signal, where the at least one noise reference signal has minimized speech components;

applying first and second adaptive filters for processing the at least one noise reference signal with adaptive weights;

generating error signals based on the one or more estimated binaural cues and the first and second noise-reduced signals and using the error signals to modify the adaptive weights used in the first and second adaptive filters for reducing noise and preserving the one or more binaural cues for the noise component in the first and second noise-reduced signals, wherein, the first and second noise-reduced signals are produced by subtracting the output of the first and second adaptive filters from the first and second speech reference signals respectively.

The generated one or more binaural cues can comprise at least one of interaural time difference (ITD), interaural intensity difference (IID), and interaural transfer function (ITF).

The method can further comprise additionally determining the one or more desired binaural cues for the speech component of the first and second set of input signals.

Alternatively, the method can comprise determining the one or more desired binaural cues using one of the input signals in the first set of input signals and one of the input signals in the second set of input signals.

Alternatively, the method can comprise determining the one or more desired binaural cues by specifying the desired angles from which sound sources for the sounds in the first and second sets of input signals should be perceived with respect to a user of a system that performs the method and by using head related transfer functions.

Alternatively, the minimizing can comprise applying first and second blocking matrices for processing at least one of the first and second sets of input signals to respectively produce first and second noise reference signals each having minimized speech components and using the first and second adaptive filters to process the first and second noise reference signals respectively.

Alternatively, the minimizing can further comprise delaying the first and second reference signals respectively, and producing the first and second noise-reduced signals by subtracting the output of the first and second delay blocks from the first and second speech reference signals respectively.

The method can comprise applying matched filters for the first and second filters.

Processing the first and second noise reduced signals by generating and applying weights can comprise applying first and second processing branches and cue processing, wherein for a given processing branch the method can comprise:

decomposing one of the first and second noise-reduced signals to produce a plurality of time-frequency elements for a given frame by applying frequency decomposition;

applying nonlinear processing to the plurality of time-frequency elements; and compensating for any phase lag amongst the plurality of time-frequency elements after the nonlinear processing to produce one of first and second frequency domain signals;

and wherein the cue processing further comprises calculating weight vectors for several cues according to a cue processing hierarchy and combining the weight vectors to produce first and second final weight vectors.

For a given processing branch the method can further comprise:

applying one of the final weight vectors to the plurality of time-frequency elements produced by the frequency decomposition to enhance the time-frequency elements; and reconstructing a time-domain waveform based on the enhanced time-frequency elements.

The cue processing can comprise:

estimating values for perceptual cues based on at least one of the first and second frequency domain signals, the first and second frequency domain signals having a plurality of time-frequency elements and the perceptual cues being estimated for each time-frequency element;

generating the weight vectors for the perceptual cues for segregating perceptual cues relating to speech from perceptual cues relating to noise, the weight vectors being computed based on the estimated values for the perceptual cues; and, combining the weight vectors to produce the first and second final weight vectors.

According to the cue processing hierarchy, the method can comprise first generating weight vectors for spatial cues including an intermediate spatial segregation weight vector, then generating weight vectors for temporal cues based on the intermediate spatial segregation weight vector, and then combining the weight vectors for temporal cues with the intermediate spatial segregation weight vector to produce the first and second final weight vectors.

The method can comprise selecting the temporal cues to include pitch and onset, and the spatial cues to include interaural intensity difference and interaural time difference.

The method can further comprise generating the weight vectors to include real numbers selected in the range of 0 to 1 inclusive for implementing a soft-decision process wherein for a given time-frequency element, a higher weight is assigned when the given time-frequency element has more speech than noise and a lower weight is assigned for when the given time-frequency element has more noise than speech.

The method can further comprise estimating values for the temporal cues by processing one of the first and second frequency domain signals, estimating values for the spatial cues by processing both the first and second frequency domain signals together, and using the same weight vector for the first and second final weight vectors.

The method can further comprise estimating values for the temporal cues by processing the first and second frequency domain signals separately, estimating values for the spatial cues by processing both the first and second frequency domain signals together, and using different weight vectors for the first and second final weight vectors.

For a given cue, the method can comprise generating a preliminary weight vector based on estimated values for the given cue, and multiplying the preliminary weight vector with a corresponding likelihood weight vector based on a priori knowledge with respect to the frequency behaviour of the given cue.

The method can further comprise adaptively updating the likelihood weight vector based on an acoustic environment associated with the first and second sets of input signals by increasing weight values in the likelihood weight vector for components of the given weight vector that correspond more closely to the final weight vector.

The decomposing step can comprise using a filterbank that approximates the frequency selectivity of the human cochlea.

For each frequency band output from the decomposing step, the non-linear processing step can include applying a half-wave rectifier followed by a low-pass filter.

The method can comprise estimating values for an onset cue by employing an onset map scaled with an intermediate spatial segregation weight vector.

The method can comprise estimating values for a pitch cue by employing one of: an autocorrelation function rescaled by an intermediate spatial segregation weight vector and summed across frequency bands; and a pattern matching process that includes templates of harmonic series of possible pitches.

The method can comprise estimating values for an interaural intensity difference cue based on a log ratio of local short time energy of the results of the phase lag compensation step of the processing branches.

The method can further comprise using IID-frequency-azimuth mapping to estimate azimuth values based on estimated interaural intensity difference and frequency, and giving higher weights to the azimuth values closer to a frontal direction associated with a user of a system that performs the method.

The method can further comprise estimating values for an interaural time difference cue by cross-correlating the results of the phase lag compensation step of the processing branches.

BRIEF DESCRIPTION OF THE DRAWINGS

For a better understanding of the embodiments described herein and to show more clearly how it may be carried into effect, reference will now be made, by way of example only, to the accompanying drawings, in which.

DETAILED DESCRIPTION

Figure 1:
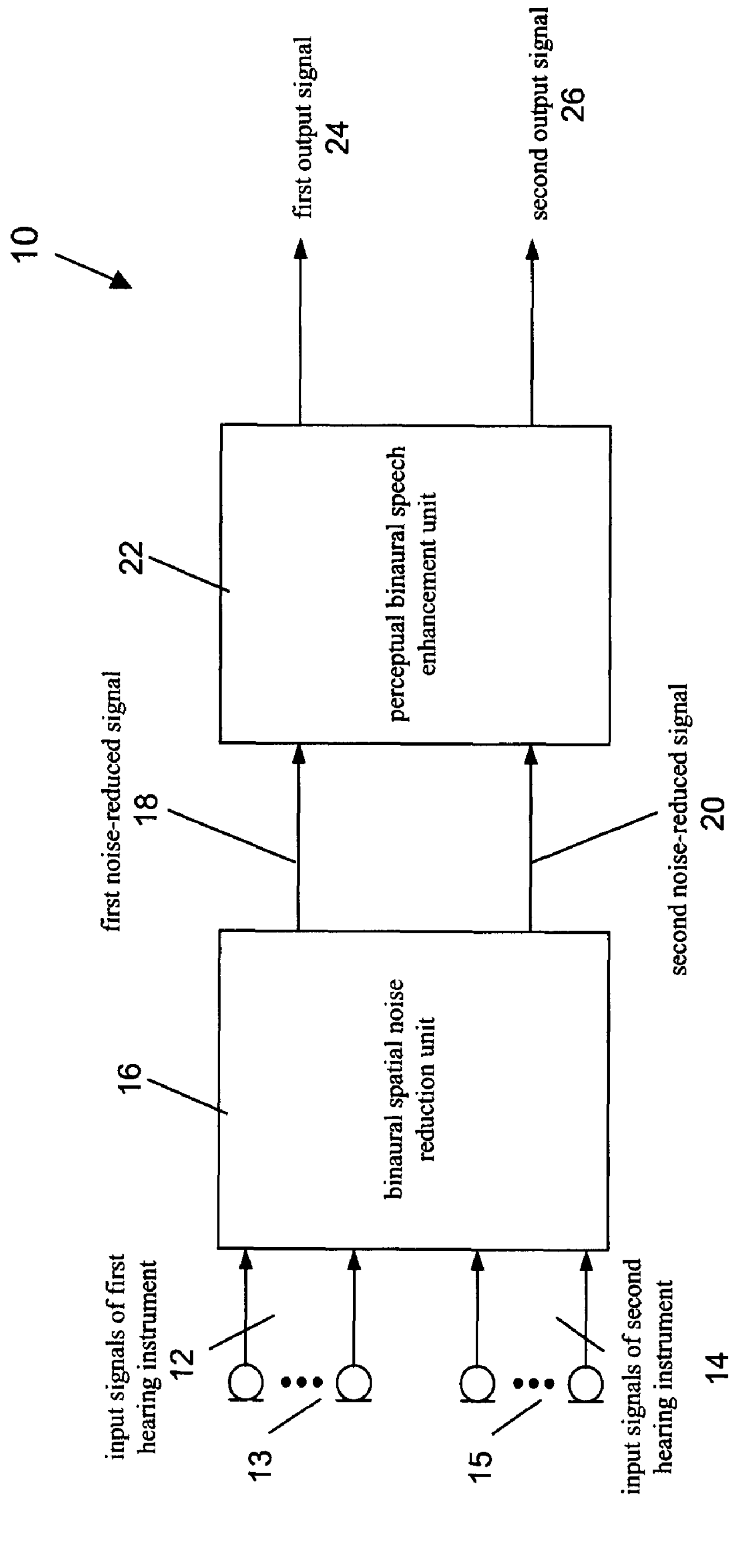
FIG. 1 is a block diagram of an exemplary embodiment of a binaural signal processing system including a binaural spatial noise reduction unit and a perceptual binaural speech enhancement unit.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the various embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

The exemplary embodiments described herein pertain to various components of a binaural speech enhancement system and a related processing methodology with all components providing noise reduction and binaural processing. The system can be used, for example, as a pre-processor to a conventional hearing instrument and includes two parts, one for each ear. Each part is preferably fed with one or more input signals. In response to these multiple inputs, the system produces two output signals. The input signals can be provided, for example, by two microphone arrays located in spatially distinct areas; for example, the first microphone array can be located on a hearing instrument at the left ear of a hearing instrument user and the second microphone array can be located on a hearing instrument at the right ear of the hearing instrument user. Each microphone array consists of one or more microphones. In order to achieve true binaural processing, both parts of the hearing instrument cooperate with each other, e.g. through a wired or a wireless link, such that all microphone signals are simultaneously available from the left and the right hearing instrument so that a binaural output signal can be produced (i.e. a signal at the left ear and a signal at the right ear of the hearing instrument user).

Signal processing can be performed in two stages. The first stage provides binaural spatial noise reduction, preserving the binaural cues of the sound sources, so as to preserve the auditory impression of the acoustic scene and exploit the natural binaural hearing advantage and provide two noise-reduced signals. In the second stage, the two noise-reduced signals from the first stage are processed with the aim of providing perceptual binaural speech enhancement. The perceptual processing is based on auditory scene analysis, which is performed in a manner that is somewhat analogous to the human auditory system. The perceptual binaural signal enhancement selectively extracts useful signals and suppresses background noise, by employing pre-processing that is somewhat analogous to the human auditory system and analyzing various spatial and temporal cues on a time-frequency basis.

The various embodiments described herein can be used as a pre-processor for a hearing instrument. For instance, spatial noise reduction may be used alone. In other cases, perceptual binaural speech enhancement may be used alone. In yet other cases, spatial noise reduction may be used with perceptual binaural speech enhancement.

Referring first to FIG. 1, shown therein is a block diagram of an exemplary embodiment of a binaural speech enhancement system 10. In this embodiment, the binaural speech enhancement system 10 combines binaural spatial noise reduction and perceptual binaural speech enhancement that can be used, for example, as a pre-processor for a conventional hearing instrument. In other embodiments, the binaural speech enhancement system 10 may include just one of binaural spatial noise reduction and perceptual binaural speech enhancement.

The embodiment of FIG. 1 shows that the binaural speech enhancement system 10 includes first and second arrays of microphones 13 and 15, a binaural spatial noise reduction unit 16 and a perceptual binaural speech enhancement unit 22. The binaural spatial noise reduction unit 16 performs spatial noise reduction while at the same time limiting speech distortion and taking into account the binaural cues of the speech and the noise components, either to preserve these binaural cues or to change them to pre-specified values. The perceptual binaural speech enhancement unit 22 performs time-frequency processing for suppressing time-frequency regions dominated by interference. In one instance, this can be done by the computation of a time-frequency mask that is based on at least some of the same perceptual cues that are used in the auditory scene analysis that is performed by the human auditory system.

The binaural speech enhancement system 10 uses two sets of spatially distinct input signals 12 and 14, which each include at least one spatially distinct input signal and in some cases more than one signal, and produces two spatially distinct output signals 24 and 26. The input signal sets 12 and 14 are provided by the two input microphone arrays 13 and 15, which are spaced apart from one another. In some implementations, the first microphone array 13 can be located on a hearing instrument at the left ear of a hearing instrument user and the second microphone array 15 can be located on a hearing instrument at the right ear of the hearing instrument user. Each microphone array 13 and 15 includes at least one microphone, but preferably more than one microphone to provide more than one input signal in each input signal set 12 and 14.

Signal processing is performed by the system 10 in two stages. In the first stage, the input signals from both microphone arrays 12 and 14 are processed by the binaural spatial noise reduction unit 16 to produce two noise-reduced signals 18 and 20. The binaural spatial noise reduction unit 16 provides binaural spatial noise reduction, taking into account and preserving the binaural cues of the sound sources sensed in the input signal sets 12 and 14. In the second stage, the two noise-reduced signals 18 and 20 are processed by the perceptual binaural speech enhancement unit 22 to produce the two output signals 24 and 26. The unit 22 employs perceptual processing based on auditory scene analysis that is performed in a manner that is somewhat similar to the human auditory system. Various exemplary embodiments of the binaural spatial noise reduction unit 16 and the perceptual binaural speech enhancement unit 22 are discussed in further detail below.

To facilitate an explanation of the various embodiments of the invention, a frequency-domain description for the signals and the processing which is used is now given in which ω represents the normalized frequency-domain variable (i.e. $-\pi \leqq \omega \leqq \pi$). Hence, in some implementations, the processing that is employed may be implemented using well-known FFT-based overlap-add or overlap-save procedures or subband procedures with an analysis and a synthesis filterbank (see e.g. Vaidyanathan, "*Multirate Systems and Filter Banks", Prentice Hall,* 1992, Shynk, "*Frequency-domain and multirate adaptive filtering", IEEE Signal Processing Magazine*, vol. 9, no. 1, pp. 14-37, January 1992).

Figure 2:
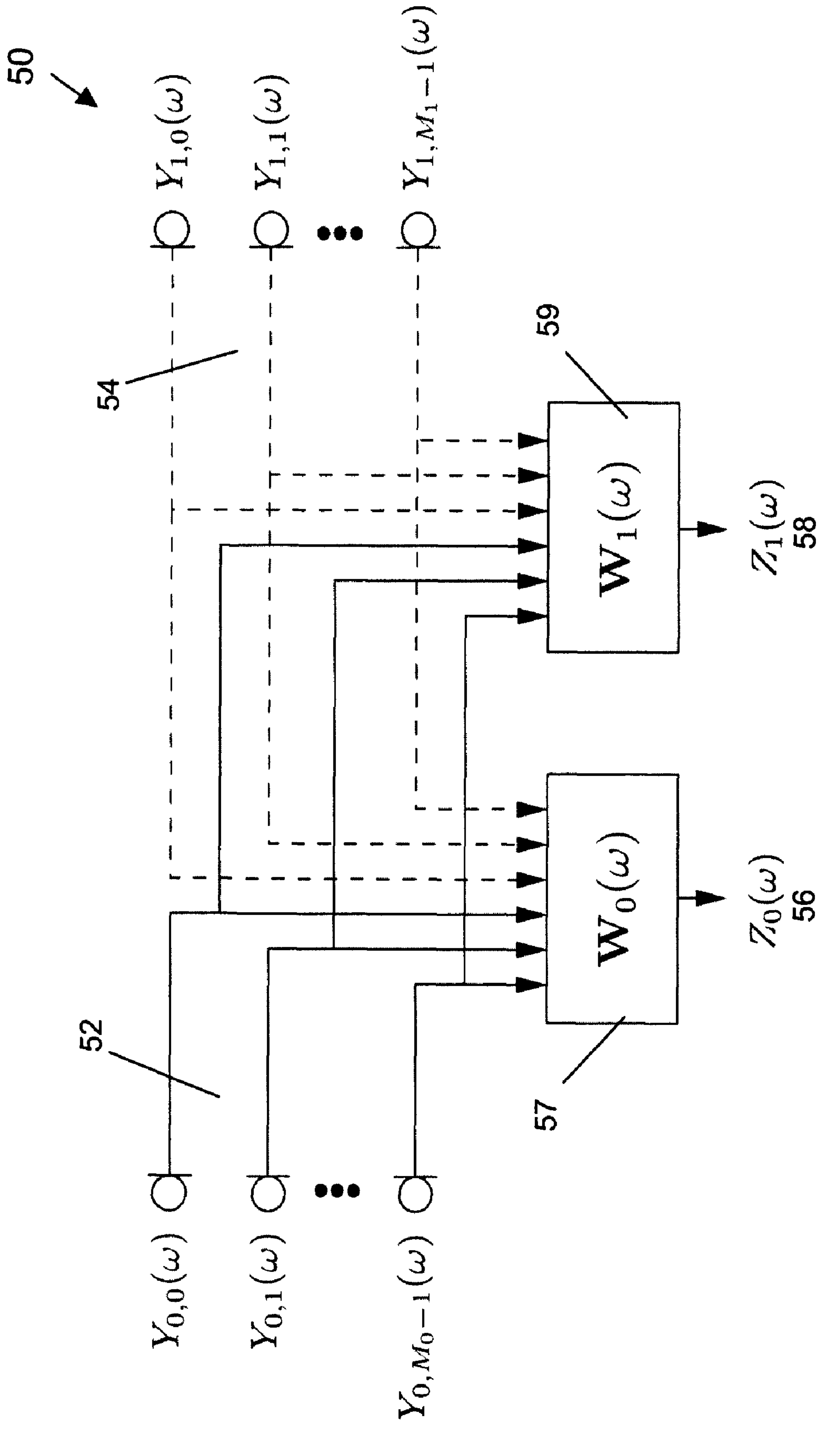
FIG. 2 depicts a typical binaural hearing instrument configuration.

Referring now to FIG. 2, shown therein is a block diagram for a binaural hearing instrument configuration 50 in which the left and the right hearing components include microphone arrays 52 and 54, respectively, consisting of $M_0$ and $M_1$ microphones. Each microphone array 52 and 54 consists of at least one microphone, and in some cases more than one microphone. The $m^{th}$ microphone signal in the left microphone array 52 $Y_{0,m}(\omega)$ can be decomposed as follows:

$$Y_{0,m}(\omega)=X_{0,m}(\omega)+V_{0,m}(\omega),\ m=0 \ldots M_0-1, \tag{1}$$

where $X_{0,m}(\omega)$ represents the speech component and $V_{0,m}(\omega)$ represents the corresponding noise component. Assuming that one desired speech source is present, the speech component $X_{0,m}(\omega)$ is equal to $$X_{0,m}(\omega)=A_{0,m}(\omega)S(\omega), \tag{2}$$

where $A_{0,m}(\omega)$ is the acoustical transfer function (TF) between the speech source and the $m^{th}$ microphone in the left microphone array 52 and $S(\omega)$ is the speech signal. Similarly, the $m^{th}$ microphone signal in the right microphone array 54 $Y_{1,m}(\omega)$ can be written according to equation 3:

$$Y_{1,m}(\omega)=X_{1,m}(\omega)+V_{1,m}(\omega)=A_{1,m}(\omega)S(\omega)+V_{1,m}(\omega). \tag{3}$$

In order to achieve true binaural processing, left and right hearing instruments associated with the left and right microphone arrays 52 and 54 respectively need to be able to cooperate with each other, e.g. through a wired or a wireless link, such that it may be assumed that all microphone signals are simultaneously available at the left and the right hearing instrument or in a central processing unit. Defining an M-dimensional signal vector $Y(\omega)$, with $M=M_0+M_1$, as:

$$Y(\omega)=[Y_{0,0}(\omega) \ldots Y_{0,M_0-1}(\omega) Y_{1,0}(\omega) \ldots Y_{1,M_1-1}(\omega)]^T. \tag{4}$$

The signal vector can be written as:

$$Y(\omega)=X(\omega)+V(\omega)=A(\omega)S(\omega)+V(\omega), \tag{5}$$

with $X(\omega)$ and $V(\omega)$ defined similarly as in (4), and the TF vector defined according to equation 6:

$$A(\omega)=[A_{0,0}(\omega) \ldots A_{0,M_0-1}(\omega) A_{1,0}(\omega) \ldots A_{1,M_1-1}(\omega)]^T. \tag{6}$$

In a binaural hearing system, a binaural output signal, i.e. a left output signal $Z_0(\omega)$ 56 and a right output signal $Z_1(\omega)$ 58, is generated using one or more input signals from both the left and right microphone arrays 52 and 54. In some implementations, all microphone signals from both microphone arrays 52 and 54 may be used to calculate the binaural output signals 56 and 58 represented by:

$$Z_0(\omega)=W_0^H(\omega)Y(\omega),$$

$$Z_1(\omega)=W_1^H(\omega)Y(\omega), \tag{7}$$

where $W_0(\omega)$ 57 and $W_1(\omega)$ 59 are M-dimensional complex weight vectors, and the superscript H denotes Hermitian transposition. In some implementations, instead of using all available microphone signals 52 and 54, it is possible to use a subset of the microphone signals, e.g. compute $Z_0(\omega)$ 56 using only the microphone signals from the left microphone array 52 and compute $Z_1(\omega)$ 58 using only the microphone signals from the right microphone array 54.

The left output signal 56 can be written as $$Z_0(\omega)=Z_{x0}(\omega)+Z_{v0}(\omega)=W_0^H(\omega)X(\omega)+W_0^H(\omega)V(\omega), \tag{8}$$

where $Z_{x0}(\omega)$ represents the speech component and $Z_{v0}(\omega)$ represents the noise component. Similarly, the right output signal 58 can be written as $Z_1(\omega)=Z_{x1}(\omega)+Z_{v1}(\omega)$. A 2M-dimensional complex stacked weight vector including weight vectors $W_0(\omega)$ 57 and $W_1(\omega)$ 59 can then be defined as shown in equation 9:

$$W(\omega)=\begin{bmatrix} W_0(\omega) \\ W_1(\omega) \end{bmatrix}. \tag{9}$$

The real and the imaginary part of $W(\omega)$ can respectively be denoted by $W_R(\omega)$ and $W_I(\omega)$ and represented by a 4M-dimensional real-valued weight vector defined according to equation 10:

$$\tilde{W}(\omega)=\begin{bmatrix}W_R(\omega)\\W_l(\omega)\end{bmatrix}=\begin{bmatrix}W_{0R}(\omega)\\W_{1R}(\omega)\\W_{0l}(\omega)\\W_{1l}(\omega)\end{bmatrix}. \qquad (10)$$

For conciseness, the frequency-domain variable ω will be omitted from the remainder of the description.

Figure 3:
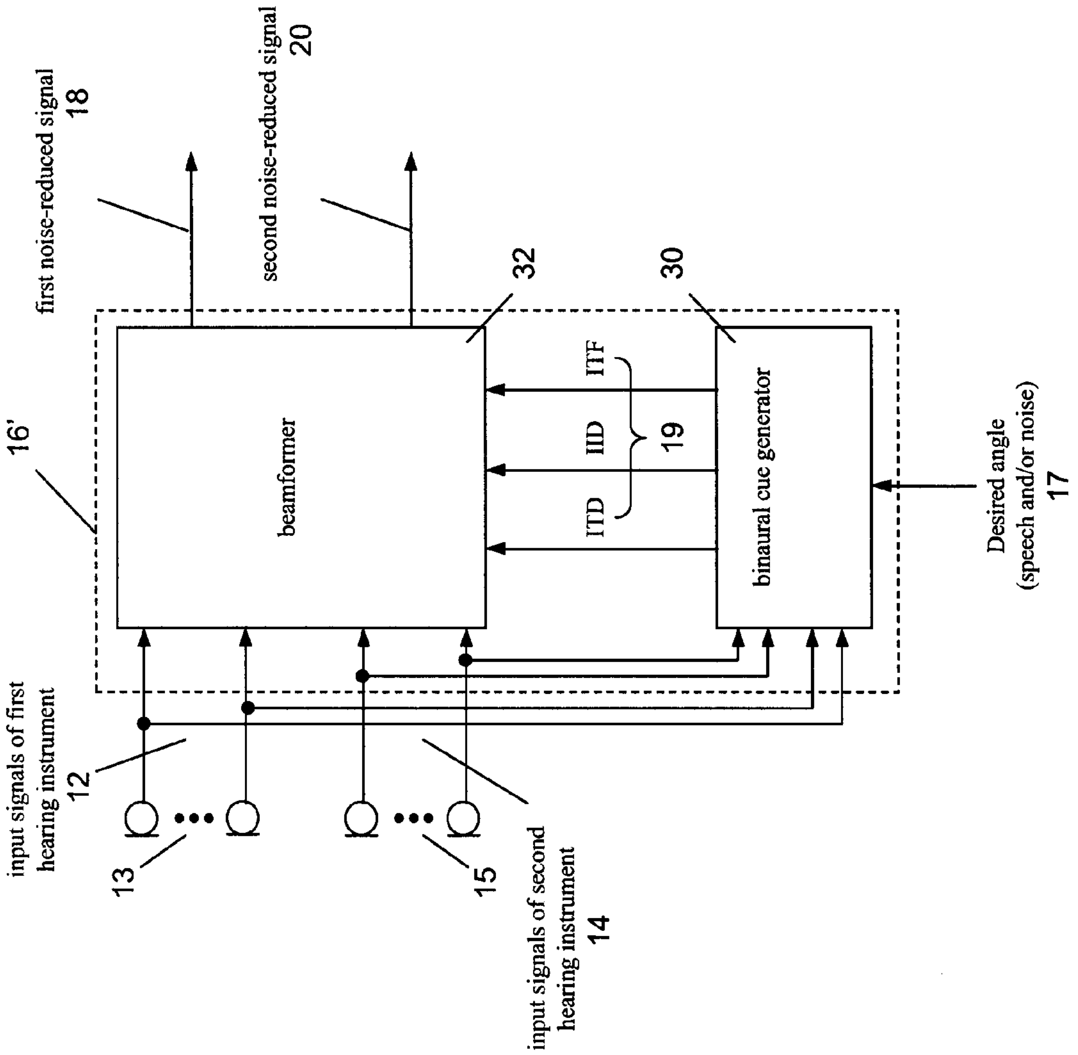
FIG. 3 is a block diagram of one exemplary embodiment of the binaural spatial noise reduction unit of FIG. 1.

Referring now to FIG. 3, an embodiment of the binaural spatial noise reduction stage 16' includes two main units: a binaural cue generator 30 and a beamformer 32. In some implementations, the beamformer 32 processes signals according to an extended TF-LCMV (Linearly Constrained Minimum Variance using Transfer Function ratios) processing methodology. In the binaural cue generator 30, desired binaural cues 19 of the sound sources sensed by the microphone arrays 13 and 15 are determined. In some embodiments, the binaural cues 19 include at least one of the interaural time difference (ITD), the interaural intensity difference (IID), the interaural transfer function (ITF), or a combination thereof. In some embodiments, only the desired binaural cues 19 of the noise component are determined. In other embodiments, the desired binaural cues 19 of the speech component are additionally determined. In some embodiments, the desired binaural cues 19 are determined using the input signal sets 12 and 14 from both microphone arrays 13 and 15, thereby enabling the preservation of the binaural cues 19 between the input signal sets 12 and 14 and the respective noise-reduced signals 18 and 20. In other embodiments, the desired binaural cues 19 can be determined using one input signal from the first microphone array 13 and one input signal from the second microphone array 15. In other embodiments, the desired binaural cues 19 can be determined by computing or specifying the desired angles 17 from which the sound sources should be perceived and by using head related transfer functions. The desired angles 17 may also be computed by using the signals that are provided by the first and second input signal sets 12 and 14 as is commonly known by those skilled in the art. This also holds true for the embodiments shown in FIGS. 6*a*, 6*b* and 7.

In some implementations, the beamformer 32 concurrently processes the input signal sets 12 and 14 from both microphone arrays 13 and 15 to produce the two noise-reduced signals 18 and 20 by taking into account the desired binaural cues 19 determined in the binaural cue generator 30. In some implementations, the beamformer 32 performs noise reduction, limits speech distortion of the desired speech component, and minimizes the difference between the binaural cues in the noise-reduced output signals 18 and 20 and the desired binaural cues 19.

In some implementations, the beamformer 32 processes data according to the extended TF-LCMV methodology. The TF-LCMV methodology is known to perform multi-microphone noise reduction and limit speech distortion. In accordance with the invention, the extended TF-LCMV methodology that can be utilized by the beamformer 32 allows binaural speech enhancement while at the same time preserving the binaural cues 19 when the desired binaural cues 19 are determined directly using the input signal sets 12 and 14, or with modifications provided by specifying the desired angles 17 from which the sound sources should be perceived. Various embodiments of the extended TF-LCMV methodology used in the binaural spatial noise reduction unit 16 will be discussed after the conventional TF-LCMV methodology has been described.

A linearly constrained minimum variance (LCMV) beamforming method (see e.g. Frost, "*An algorithm for linearly constrained adaptive array processing," Proc. of the IEEE*, vol. 60, pp. 926-935, August 1972) has been derived in the prior art under the assumption that the acoustic transfer function between the speech source and each microphone consists of only gain and delay values, i.e. no reverberation is assumed to be present. The prior art LCMV beamformer has been modified for arbitrary transfer functions (i.e. TF-LCMV) in a reverberant acoustic environment (see Gannot, Burshtein & Weinstein, "*Signal Enhancement Using Beamforming and Non-Stationarity with Applications to Speech," IEEE Trans. Signal Processing*, vol. 49, no. 8, pp. 1614-1626, August 2001). The TF-LCMV beamformer minimizes the output energy under the constraint that the speech component in the output signal is equal to the speech component in one of the microphone signals. In addition, the prior art TF-LCMV does not make any assumptions about the position of the speech source, the microphone positions and the microphone characteristics. However, the prior art TF-LCMV beamformer has never been applied to binaural signals.

Referring back to FIG. 2, for a binaural hearing instrument configuration 50, the objective of the prior art TF-LCMV beamformer is to minimize the output energy under the constraint that the speech component in the output signal is equal to a filtered version (usually a delayed version) of the speech signal S. Hence, the filter $W_0$ 57 generating the left output signal $Z_0$ 56 can be obtained by minimizing the minimum variance cost function:

$$J_{MV,0}(W_0)=E\{|Z_0|^2\}=W_0^H R_y W_0, \qquad (11)$$

subject to the constraint:

$$Z_{x0}=W_0^H X=F_0^* S, \qquad (12)$$

where $F_0$ denotes a prespecified filter. Using (2), this is equivalent to the linear constraint:

$$W_0^H A=F_0^*, \qquad (13)$$

where * denotes complex conjugation. In order to solve this constrained optimization problem, the TF vector A needs to be known. Accurately estimating the acoustic transfer functions is quite a difficult task, especially when background noise is present. However, a procedure has been presented for estimating the acoustic transfer function ratio vector:

$$H_0=\frac{A}{A_{0,r_0}}, \qquad (14)$$

by exploiting the non-stationarity of the speech signal, and assuming that both the acoustic transfer functions and the noise signal are stationary during some analysis interval (see Gannot, Burshtein & Weinstein, "*Signal Enhancement Using Beamforming and Non-Stationarity with Applications to Speech," IEEE Trans. Signal Processing*, vol 49, no. 8, pp. 1614-1626, August 2001). When the speech component in the output signal is now constrained to be equal to (a filtered version of) the speech component $X_{0,r_0}=A_{0,r_0}S$ for a given reference microphone signal instead of the speech signal S, the constrained optimization problem for the prior art TF-LCMV becomes:

$$\min_{W_0} J_{MV,0}(W_0) = W_0^H R_y W_0, \text{ subject to } W_0^H H_0 = F_0^*. \quad (15)$$

Similarly, the filter $W_1$ 59 generating the right output signal $Z_1$ 58 is the solution of the constrained optimization problem:

$$\min_{W_1} J_{MV,1}(W_1) = W_1^H R_y W_1, \text{ subject to } W_1^H H_1 = F_1^*. \quad (16)$$

with the TF ratio vector for the right hearing instrument defined by:

$$H_1 = \frac{A}{A_{1,r_1}}. \quad (17)$$

Hence, the total constrained optimization problem comes down to minimizing $$J_{MV}(W) = J_{MV,0}(W_0) + \alpha J_{MV,1}(W_1), \quad (18)$$

subject to the linear constraints $$W_0^H H_0 = F_0^*, \; W_1^H H_1 = F_1^*, \quad (19)$$

where $\alpha$ trades off the MV cost functions used to produce the left and right output signals 56 and 58 respectively. However, since both terms in $J_{MV}(W)$ are independent of each other, for now, it may be said that this factor has no influence on the computation of the optimal filter $W_{MV}$.

Using (9), the total cost function $J_{MV}(W)$ in (18) can be written as $$J_{MV}(W) = W^H R_t W \quad (20)$$

with the 2M×2M-dimensional complex matrix $R_t$ defined by $$R_t = \begin{bmatrix} R_y & 0_M \\ 0_M & \alpha R_y \end{bmatrix}. \quad (21)$$

Using (9), the two linear constraints in (19) can be written as $$W^H H = F^H \quad (22)$$

with the 2M×2-dimensional matrix H defined by $$H = \begin{bmatrix} H_0 & 0_{M\times 1} \\ 0_{M\times 1} & H_1 \end{bmatrix}, \quad (23)$$

and the 2-dimensional vector F defined by $$F = \begin{bmatrix} F_0 \\ F_1 \end{bmatrix}. \quad (24)$$

The solution of the constrained optimization problem (20) and (22) is equal to $$W_{MV} = R_t^{-1} H [H^H R_t^{-1} H]^{-1} F \quad (25)$$

such that $$W_{MV,0} = \frac{R_y^{-1} H_0 F_0}{H_0^H R_y^{-1} H_0}, \; W_{MV,1} = \frac{R_y^{-1} H_1 F_1}{H_1^H R_y^{-1} H_1}. \quad (26)$$

Using (10), the MV cost function in (20) can be written as $$J_{MV}(\tilde{W}) = \tilde{W}^T \tilde{R}_t \tilde{W} \quad (27)$$

with $$\tilde{R}_t = \begin{bmatrix} R_{t,R} & -R_{t,I} \\ R_{t,I} & R_{t,R} \end{bmatrix}, \quad (28)$$

and the linear constraints in (22) can be written as $$\tilde{W}^T \overline{H} = \tilde{F}^T \quad (29)$$

with the 4M×4-dimensional matrix $\overline{H}$ and the 4-dimensional vector F defined by $$\overline{H} = \begin{bmatrix} H_{0,R} & -H_{0,I} \\ H_{0,I} & H_{0,R} \end{bmatrix}, \; \tilde{F} = \begin{bmatrix} F_R \\ F_I \end{bmatrix}. \quad (30)$$

Figure 4:
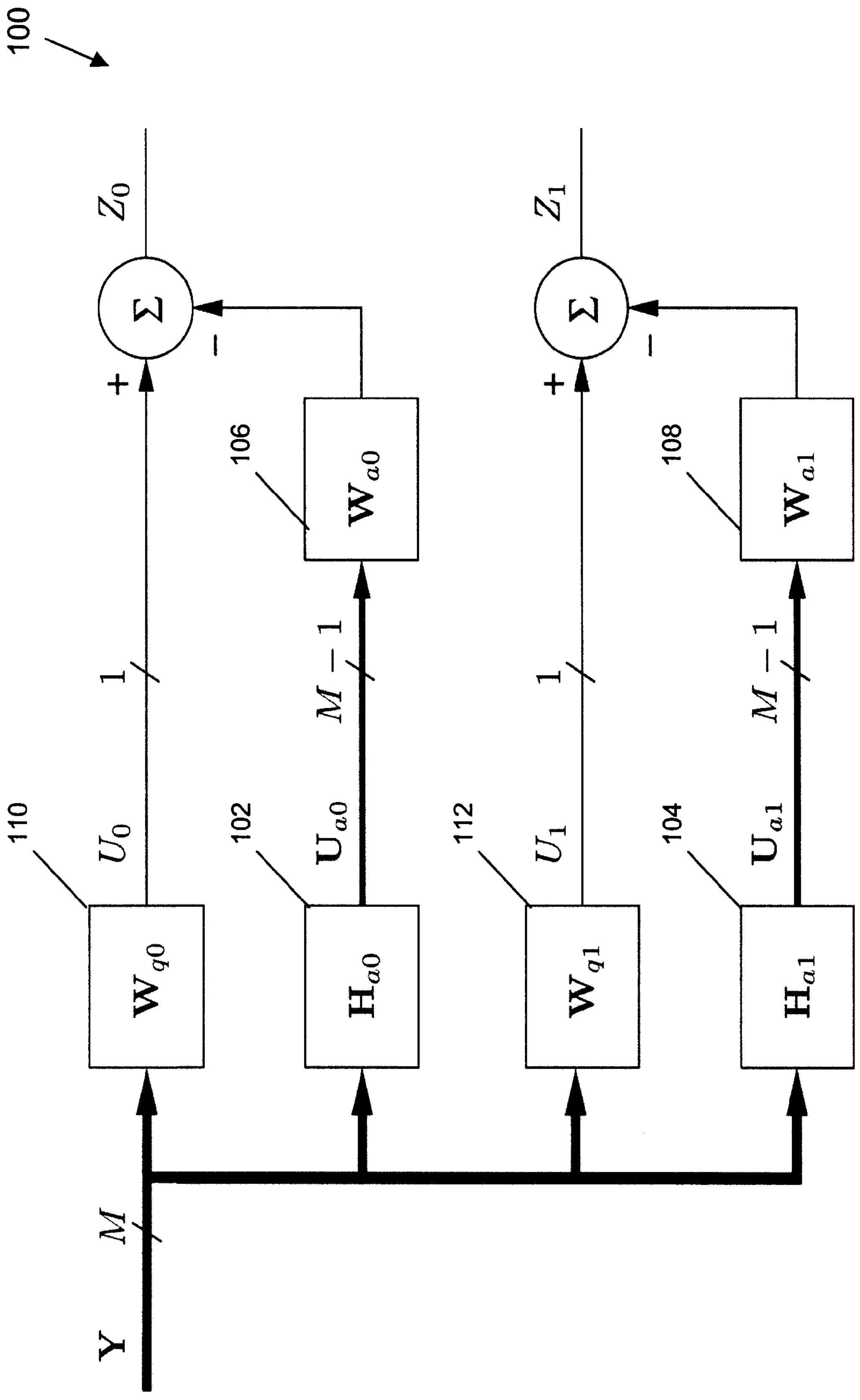
FIG. 4 is a block diagram of a beamformer that processes data according to a binaural Linearly Constrained Minimum Variance methodology using Transfer Function ratios (TF-LCMV)

Referring now to FIG. 4, a binaural TF-LCMV beamformer 100 is depicted having filters 110, 102, 106, 112, 104 and 108 with weights $W_{q0}$, $H_{a0}$, $W_{a0}$, $W_{q1}$, $H_{a1}$ and $W_{a1}$ that are defined below. In the monaural case, it is well known that the constrained optimization problem (20) and (22) can be transformed into an unconstrained optimization problem (see e.g. Griffiths & Jim, "*An alternative approach to linearly constrained adaptive beamforming,*" *IEEE Trans. Antennas Propagation*, vol. 30, pp. 27-34, January 1982; U.S. Pat. No. 5,473,701, "Adaptive microphone array"). The weights $W_0$ and $W_1$ of filters 57 and 59 of the binaural hearing instrument configuration 50 (as illustrated in FIG. 2) are related to the configuration 100 shown in FIG. 4, according to the following parameterizations:

$$W_0 = H_0 V_0 - H_{a0} W_{a0}$$

$$W_1 = H_1 V_1 - H_{a1} W_{a1}, \quad (31)$$

with the blocking matrices $H_{a0}$ 102 and $H_{a1}$ 104 equal to the M×(M−1)-dimensional null-spaces of $H_0$ and $H_1$, and $W_{a0}$ 106 and $W_{a1}$ 108 (M−1)-dimensional filter vectors. A single reference signal is generated by filter blocks 110 and 112 while up to M−1 signals can be generated by filter blocks 102 and 104. Assuming that $r_0=0$, a possible choice for the blocking matrix $H_{a0}$ 102 is:

$$H_{a0} = \begin{bmatrix} -\frac{A_1^*}{A_0^*} & -\frac{A_2^*}{A_0} & \cdots & -\frac{A_{M-1}^*}{A_0^*} \\ 1 & 0 & \cdots & 0 \\ 0 & 1 & \cdots & 0 \\ \vdots & & \ddots & \vdots \\ 0 & 0 & \cdots & 1 \end{bmatrix}. \quad (32)$$

By applying the constraints (19) and using the fact that $H_{a0}^H H_0=0$ and $H_{a1}^H H_1=0$, the following is derived $$V_0^* H_0^H H_0 = F_0^*,\ V_1 H_1^H H_1 = F_1^*, \quad (33)$$

such that $$W_0 = W_{q0} - H_{a0} W_{a0}$$

$$W_1 = W_{q1} - H_{a1} W_{a1}, \quad (34)$$

with the fixed beamformers (matched filters) $W_{q0}$ 110 and $W_{q1}$ 112 defined by $$W_{q0} = \frac{H_0 F_0}{H_0^H H_0},\ W_{q1} = \frac{H_1 F_1}{H_1^H H_1}. \quad (35)$$

The constrained optimization of the M-dimensional filters $W_0$ 57 and $W_1$ 59 now has been transformed into the unconstrained optimization of the (M−1)-dimensional filters $W_{a0}$ 106 and $W_{a1}$ 108. The microphone signals $U_0$ and $U_1$ filtered by the fixed beamformers 110 and 112 according to:

$$U_0 = W_{q0}^H Y,\ U_1 = W_{q1}^H Y, \quad (36)$$

will be referred to as speech reference signals, whereas the signals $U_{a0}$ and $U_{a1}$ filtered by the blocking matrices 102 and 104 according to:

$$U_{a0} = H_{a0}^H Y,\ U_{a1} = H_{a1}^H Y, \quad (37)$$

will be referred to as noise reference signals. Using the filter parameterization in (34), the filter W can be written as:

$$W = W_q - H_a W_a, \quad (38)$$

with the 2M-dimensional vector $W_q$ defined by $$W_q = \begin{bmatrix} W_{q0} \\ W_{q1} \end{bmatrix}, \quad (39)$$

the 2(M−1)-dimensional filter $W_a$ defined by $$W_a = \begin{bmatrix} W_{a0} \\ W_{a1} \end{bmatrix}, \quad (40)$$

and the 2M×2(M−1)-dimensional blocking matrix $H_a$ defined by $$H_a = \begin{bmatrix} H_{a0} & 0_{M\times(M-1)} \\ 0_{M\times(M-1)} & H_{a1} \end{bmatrix}. \quad (41)$$

The unconstrained optimization problem for the filter $W_a$ then is defined by $$J_{MV}(W_a) = (W_q - H_a W_a)^H R_t (W_q - H_a W_a), \quad (42)$$

such that the filter minimizing $J_{MV}(W_a)$ is equal to $$W_{MV,a} = (H_a^H R_t H_a)^{-1} H_a^H R_t W_q, \quad (43)$$

and $$W_{MV,a0} = (H_{a0}^H R_y H_{a0})^{-1} H_{a0}^H R_y W_{q0}$$

$$W_{MV,a1} = (H_{a1}^H R_y H_{a1})^{-1} H_{a1}^H R_y W_{q1}. \quad (44)$$

Note that these filters also minimize the unconstrained cost function:

$$J_{MV}(W_{a0}, W_{a1}) = E\{|U_0 - W_{a0}^H U_{a0}|^2\} + \alpha E\{|U_1 - W_{a1}^H U_{a1}|^2\}, \quad (45)$$

and the filters $W_{MV,a0}$ and $W_{MV,a1}$ can also be written according to equation 46.

$$W_{MV,a0} = E\{U_{a0} U_{a0} U_{a0}^H\}^{-1} E\{U_{a0}^H U_0^*\}$$

$$W_{MV,a1} = E\{U_{a1} U_{a1}^H\}^{-1} E\{U_{a1}^H U_1^*\}. \quad (46)$$

Assuming that one desired speech source is present, it can be shown that:

$$H_{a0}^H R_y = H_{a0}^H (P_s |A_{0,r_0}|^2 H_0 H_0^H + R_v) = H_{a0}^H R_v, \quad (47)$$

and similarly, $H_{a1}^H R_y = H_{a1}^H R_v$. In other words, the blocking matrices $H_{a0}$ 102 and $H_{a1}$ 104 (theoretically) cancel all speech components, such that the noise references only contain noise components. Hence, the optimal filters 106 and 108 can also be written as:

$$W_{MV,a0} = (H_{a0}^H R_v H_{a0})^{-1} H_{a0}^H R_v W_{q0}$$

$$W_{MV,a1} = (H_{a1}^H R_v H_{a1})^{-1} H_{a1}^H R_v W_{q1}. \quad (48)$$

In order to adaptively solve the unconstrained optimization problem in (45), several well-known time-domain and frequency-domain adaptive algorithms are available for updating the filters $W_{a0}$ 106 and $W_{a1}$ 108, such as the recursive least squares (RLS) algorithm, the (normalized) least mean squares (LMS) algorithm, and the affine projection algorithm (APA) for example (see e.g. Haykin, "*Adaptive Filter Theory", Prentice-Hall,* 2001). Both filters 106 and 108 can be updated independently of each other. Adaptive algorithms have the advantage that they are able to track changes in the statistics of the signals over time. In order to limit the signal distortion caused by possible speech leakage in the noise references, the adaptive filters 106 and 108 are typically only updated during periods and for frequencies where the interference is assumed to be dominant (see e.g. U.S. Pat. No. 4,956,867*, "Adaptive beamforming for noise reduction*"; U.S. Pat. No. 6,449,586*, "Control method of adaptive array and adaptive array apparatus*"), or an additional constraint, e.g. a quadratic inequality constraint, can be imposed on the update formula of the adaptive filter 106 and 108 (see e.g. Cox et al., "*Robust adaptive beamforming", IEEE Trans. Acoust. Speech and Signal Processing*', vol. 35, no. 10, pp. 1365-1376, October 1987; U.S. Pat. No. 5,627,799*, "Beamformer using coefficient restrained adaptive filters for detecting interference signals*").

Since the speech components in the output signals of the TF-LCMV beamformer 100 are constrained to be equal to the speech components in the reference microphones for both microphone arrays, the binaural cues, such as the interaural time difference (ITD) and/or the interaural intensity difference (IID), for example, of the speech source are generally well preserved. On the contrary, the binaural cues of the noise sources are generally not preserved. In addition to reducing the noise level, it is advantageous to at least partially preserve these binaural noise cues in order to exploit the differences between the binaural speech and noise cues. For instance, a speech enhancement procedure can be employed by the perceptual binaural speech enhancement unit 22 that is based on exploiting the difference between binaural speech and noise cues.

A cost function that preserves binaural cues can be used to derive a new version of the TF-LCMV methodology referred to as the extended TF-LCMV methodology. In general, there are three cost functions that can be used to provide the binaural cue-preservation that can be used in combination with the TF-LCMV method. The first cost function is related to the interaural time difference (ITD), the second cost function is related to the interaural intensity difference (IID), and the third cost function is related to the interaural transfer function (ITF). By using these cost functions in combination with the binaural TF-LCMV methodology, the calculation of weights for the filters 106 and 108 for the two hearing instruments is linked (see block 168 in FIG. 5 for example). All cost functions require prior information, which can either be determined from the reference microphone signals of both microphone arrays 13 and 15, or which further involves the specification of desired angles 17 from which the speech or the noise components should be perceived and the use of head related transfer functions.

The Interaural Time Difference (ITD) cost function can be generically defined as:

$$J_{ITD}(W)=|ITD_{out}(W)-ITD_{des}|^2, \tag{49}$$

where $ITD_{out}$ denotes the output ITD and $ITD_{des}$ denotes the desired ITD. This cost function can be used for the noise component as well as for the speech component. However, in the remainder of this section, only the noise component will be considered since the TF-LCMV processing methodology preserves the speech component between the input and output signals quite well. It is assumed that the ITD can be expressed using the phase of the cross-correlation between two signals. For instance, the output cross-correlation between the noise components in the output signals is equal to:

$$E\{Z_{v0}Z_{v1}^*\}=W_0^H R_v W_1. \tag{50}$$

In some embodiments, the desired cross-correlation is set equal to the input cross-correlation between the noise components in the reference microphone in both the left and right microphone arrays 13 and 15 as shown in equation 51.

$$s=E\{V_{0,r_0}V_{1,r_1}^*\}=R_v(r_0,r_1). \tag{51}$$

It is assumed that the input cross-correlation between the noise components is known, e.g. through measurement during periods and frequencies when the noise is dominant. In other embodiments, instead of using the input cross-correlation (51), it is possible to use other values. If the output noise component is to be perceived as coming from the direction $\theta_v$, where $\theta=0°$ represents the direction in front of the head, the desired cross-correlation can be set equal to:

$$s(\omega)=HRTF_0(\omega,\theta_v)HRTF_1^*(\omega,\theta_v), \tag{52}$$

where $HRTF_0(\omega,\theta)$ represents the frequency and angle-dependent (azimuthal) head-related transfer function for the left ear and $HRTF_1(\omega,\theta)$ represents the frequency and angle-dependent head-related transfer function for the right ear. HRTFs contain important spatial cues, including ITD, IID and spectral characteristics (see e.g. Gardner & Martin, "*HRTF measurements of a KEMAR*", *J. Acoust. Soc. Am.*, vol. 97, no. 6, pp. 3907-3908, June 1995; Algazi, Duda, Duraiswami, Gumerov & Tang, "*Approximating the head-related transfer function using simple geometric models of the head and torso,*" *J. Acoust. Soc. Am.*, vol. 112, no. 5, pp. 2053-2064, November 2002). For free-field conditions, i.e. neglecting the head shadow effect, the desired cross-correlation reduces to:

$$s(\omega)=e^{-j\omega\frac{d\sin\theta_v}{c}f_s}, \tag{53}$$

where d denotes the distance between the two reference microphones, c≈340 m/s is the speed of sound, and $f_s$ denotes the sampling frequency.

Using the difference between the tangent of the phase of the desired and the output cross-correlation, the ITD cost function is equal to:

$$\begin{aligned} J_{ITD,1}(W) &= \left[\frac{(W_0^H R_v W_1)_I}{(W_0^H R_v W_1)_R} - \frac{s_I}{s_R}\right]^2 \\ &= \frac{\left[(W_0^H R_v W_1)_I - \frac{s_I}{s_R}(W_0^H R_v W_1)_R\right]^2}{(W_0^H R_v W_1)_R^2}. \end{aligned} \tag{54}$$

However, when using the tangent of an angle, a phase difference of 180° between the desired and the output cross-correlation also minimizes $J_{ITD,1}(W)$, which is absolutely not desired. A better cost function can be constructed using the cosine of the phase difference $\phi(W)$ between the desired and the output correlation, i.e.

$$\begin{aligned} J_{ITD,2}(W) &= 1-\cos(\phi(W)) \\ &= 1-\frac{s_R(W_0^H R_v W_1)_R + s_I(W_0^H R_v W_1)_I}{\sqrt{s_R^2+s_I^2}\sqrt{(W_0^H R_v W_1)_R^2+(W_0^H R_v W_1)_I^2}} \end{aligned} \tag{55}$$

Using (9), the output cross-correlation in (50) is defined by:

$$W_0^H R_v W_1 = W^H \overline{R}_v^{01} W, \tag{56}$$

with $$\overline{R}_v^{01} = \begin{bmatrix} 0_M & R_v \\ 0_M & 0_M \end{bmatrix}. \tag{57}$$

Using (10), the real and the imaginary part of the output cross-correlation can be respectively written as:

$$\begin{aligned} (W_0^H R_v W_1)_R &= \tilde{W}^T \tilde{R}_{v1} \tilde{W} \\ (W_0^H R_v W_1)_I &= \tilde{W}^T \tilde{R}_{v2} \tilde{W}, \end{aligned} \tag{58}$$

with $$\tilde{R}_{v1} = \begin{bmatrix} \overline{R}_{v,R}^{01} & -\overline{R}_{v,I}^{01} \\ -\overline{R}_{v,I}^{01} & \overline{R}_{v,R}^{01} \end{bmatrix},\ \tilde{R}_{v2} = \begin{bmatrix} \overline{R}_{v,I}^{01} & \overline{R}_{v,R}^{01} \\ -\overline{R}_{v,R}^{01} & \overline{R}_{v,I}^{01} \end{bmatrix}. \tag{59}$$

Hence, the ITD cost function in (55) can be defined by:

$$J_{ITD,2}(\tilde{W}) = 1-\frac{\tilde{W}^T\tilde{R}_{vs}\tilde{W}}{\sqrt{\left(\tilde{W}^T\tilde{R}_{v1}\tilde{W}\right)^2+\left(\tilde{W}^T\tilde{R}_{v2}\tilde{W}\right)^2}} \tag{60}$$

with $$\begin{aligned} \tilde{R}_{vs} &= \frac{s_R\tilde{R}_{v1}+s_I\tilde{R}_{v2}}{\sqrt{s_R^2+s_I^2}} \\ &= \frac{1}{\sqrt{s_R^2+s_I^2}} \\ &\quad \begin{bmatrix} s_R\overline{R}_{v,R}^{01}+s_I\overline{R}_{v,I}^{01} & -s_R\overline{R}_{v,I}^{01}+s_I\overline{R}_{v,R}^{01} \\ s_R\overline{R}_{v,I}^{01}-s_I\overline{R}_{v,R}^{01} & s_R\overline{R}_{v,R}^{01}+s_I\overline{R}_{v,I}^{01} \end{bmatrix}. \end{aligned} \tag{61}$$

The gradient of $J_{ITD,2}$ with respect to W is given by:

$$\frac{\partial J_{ITD,2}(\tilde{W})}{\partial \tilde{W}} = -\frac{\left(\tilde{R}_{vs} + \tilde{R}_{vs}^T\right)\tilde{W}}{\left(\tilde{W}^T\tilde{R}_{v1}\tilde{W}\right)^2 + \left(\tilde{W}^T\tilde{R}_{v2}\tilde{W}\right)^2} + \frac{\left(\tilde{W}^T\tilde{R}_{vs}\tilde{W}\right)}{\left[\left(\tilde{W}^T\tilde{R}_{v1}\tilde{W}\right)^2 + \left(\tilde{W}^T\tilde{R}_{v2}\tilde{W}\right)^2\right]^{\frac{3}{2}}}\tilde{R}_H\tilde{W}, \tag{62}$$

with $$\tilde{R}_H = \left(\tilde{W}^T\tilde{R}_{v1}\tilde{W}\right)\left(\tilde{R}_{v1}\tilde{R}_{v1}^T\right) + \left(\tilde{W}^T\tilde{R}_{v2}\tilde{W}\right)\left(\tilde{R}_{v2}\tilde{R}_{v2}^T\right).$$

The corresponding Hessian of $J_{ITD,2}$ is given by:

$$\frac{\partial J_{ITD,2}(\tilde{W})}{\partial^2 \tilde{W}} = -\frac{\tilde{R}_{vs} + \tilde{R}_{vs}^T}{\sqrt{\left(\tilde{W}^T\tilde{R}_{v1}\tilde{W}\right)^2 + \left(\tilde{W}^T\tilde{R}_{v2}\tilde{W}\right)^2}} - 3\frac{\left(\tilde{W}^T\tilde{R}_{vs}\tilde{W}\right)\tilde{R}_{H,4}\tilde{W}\tilde{W}^T\tilde{R}_{H,4}}{\left[\left(\tilde{W}^T\tilde{R}_{v1}\tilde{W}\right)^2 + \left(\tilde{W}^T\tilde{R}_{v2}\tilde{W}\right)^2\right]^{\frac{5}{2}}} + \frac{\left(\tilde{W}^T\tilde{R}_{vs}\tilde{W}\right)}{\left[\left(\tilde{W}^T\tilde{R}_{v1}\tilde{W}\right)^2 + \left(\tilde{W}^T\tilde{R}_{v2}\tilde{W}\right)^2\right]^{\frac{3}{2}}} \cdot \left[\begin{array}{c} \tilde{R}_{H,4} + \\ \left(\tilde{R}_{v1} + \tilde{R}_{v1}^T\right)\tilde{W}\tilde{W}^T\left(\tilde{R}_{v1} + \tilde{R}_{v1}^T\right) + \\ \left(\tilde{R}_{v2} + \tilde{R}_{v2}^T\right)\tilde{W}\tilde{W}^T\left(\tilde{R}_{v2} + \tilde{R}_{v2}^T\right) \end{array}\right] + \frac{\left(\tilde{R}_{vs} + \tilde{R}_{vs}^T\right)\tilde{W}\tilde{W}^T\tilde{R}_{H,4} + \tilde{R}_{H,4}\tilde{W}\tilde{W}^T\left(\tilde{R}_{vs} + \tilde{R}_{vs}^T\right)}{\left[\left(\tilde{W}^T\tilde{R}_{v1}\tilde{W}\right)^2 + \left(\tilde{W}^T\tilde{R}_{v2}\tilde{W}\right)^2\right]^{\frac{3}{2}}}.$$

The Interaural Intensity Difference (IID) cost function is generically defined as:

$$J_{IID}(W) = |IID_{out}(W) - IID_{des}|^2, \tag{63}$$

where $IID_{out}$ denotes the output IID and $IID_{des}$ denotes the desired IID. This cost function can be used for the noise component as well as for the speech component. However, in the remainder of this section, only the noise component will be considered for reasons previously given. It is assumed that the IID can be expressed as the power ratio of two signals. Accordingly, the output power ratio of the noise components in the output signals can be defined by:

$$IID_{out}(W) = \frac{E\{|Z_{v0}|^2\}}{E\{|Z_{v0}|^2\}} = \frac{W_0^H R_v W_0}{W_1^H R_v W_1}. \tag{64}$$

In some embodiments, the desired power ratio can be set equal to the input power ratio of the noise components in the reference microphone in both microphone arrays 13 and 15, i.e.:

$$IID_{des} = \frac{E\{|V_{0,r_0}|^2\}}{E\{|V_{1,r_1}|^2\}} = \frac{R_v(r_0, r_0)}{R_v(r_1, r_1)} = \frac{P_{v0}}{P_{v1}}. \tag{65}$$

It is assumed that the input power ratio of the noise components is known, e.g. through measurement during periods and frequencies when the noise is dominant. In other embodiments, if the output noise component is to be perceived as coming from the direction $\theta_v$, the desired power ratio is equal to:

$$IID_{des} = \frac{|HRTF_0(\omega, \theta_v)|^2}{|HRTF_1(\omega, \theta_v)|^2}, \tag{66}$$

or equal to 1 in free-field conditions.

The cost function in (63) can then be expressed as:

$$J_{IID,1}(W) = \left[\frac{W_0^H R_v W_0}{W_1^H R_v W_1} - IID_{des}\right]^2 = \frac{[(W_0^H R_v W_0) - IID_{des}(W_1^H R_v W_1)]^2}{(W_1^H R_v W_1)^2}. \tag{67}$$

In other embodiments, for mathematical convenience, only the denominator of (67) will be used as the cost function, i.e.:

$$J_{IID,2}(W) = [(W_0^H R_v W_0) - IID_{des}(W_1^H R_v W_1)]^2. \tag{68}$$

Using (9), the output noise powers can be written as $$W_0^H R_v W_0 = W^H \overline{R}_v^{00} W,\quad W_1^H R_v W_1 = W^H \overline{R}_v^{11} W, \tag{69}$$

with $$\overline{R}_v^{00} = \begin{bmatrix} R_v & 0_M \\ 0_M & 0_m \end{bmatrix},\quad \overline{R}_v^{11} = \begin{bmatrix} 0_M & 0_M \\ 0_M & R_v \end{bmatrix}. \tag{70}$$

Using (10), the output noise powers can be defined by:

$$W_0^H R_v W_0 = \tilde{W}^T \hat{R}_{v0} \tilde{W},\quad W_1^H R_v W_1 = \tilde{W}^H \hat{R}_{v1} \tilde{W}, \tag{71}$$

with $$\hat{R}_{v0} = \begin{bmatrix} \overline{R}_{v,R}^{00} & -\overline{R}_{v,I}^{00} \\ \overline{R}_{v,I}^{00} & \overline{R}_{v,R}^{00} \end{bmatrix},\quad \hat{R}_{v1} = \begin{bmatrix} \overline{R}_{v,R}^{11} & -\overline{R}_{v,I}^{11} \\ \overline{R}_{v,I}^{11} & \overline{R}_{v,R}^{11} \end{bmatrix}. \tag{72}$$

The cost function $J_{IID,1}$ in (67) can be defined by:

$$J_{IID,1}(\tilde{W}) = \frac{\left(\tilde{W}^T\hat{R}_{vd}\tilde{W}\right)^2}{\left(\tilde{W}^T\hat{R}_{v1}\tilde{W}\right)^2} \tag{73}$$

with $$\hat{R}_{vd} = \hat{R}_{v0} - IID_{des}\hat{R}_{v1} = \begin{bmatrix} R_{v,R} & 0_M & -R_{v,I} & 0_M \\ 0_M & -IID_{des}R_{v,R} & 0_M & IID_{des}R_{v,I} \\ R_{v,I} & 0_M & R_{v,R} & 0_M \\ 0_M & -IID_{des}R_{v,I} & 0_M & -IID_{des}R_{v,R} \end{bmatrix}. \tag{74}$$

The cost function $J_{IID,2}$ in (68) can be defined by:

$$J_{IID,2}(\tilde{W}) = (\tilde{W}^T\hat{R}_{vd}\tilde{W})^2 \tag{75}$$

The gradient and the Hessian of $J_{IID,1}$ with respect to $\tilde{W}$ can be respectively given by:

$$\frac{\partial J_{IID,1}(\tilde{W})}{\partial \tilde{W}} = 2\frac{(\tilde{W}^T\hat{R}_{vd}\tilde{W})^2}{(\tilde{W}^T\hat{R}_{v1}\tilde{W})^3}\begin{bmatrix}(\tilde{W}^T\hat{R}_{v1}\tilde{W})(\hat{R}_{vd}+\hat{R}_{vd}^T)\tilde{W} - \\ (\tilde{W}^T\hat{R}_{vd}\tilde{W})(\hat{R}_{v1}+\hat{R}_{v1}^T)\tilde{W}\end{bmatrix} \tag{76}$$

$$\frac{\partial^2 J_{IID,1}(\tilde{W})}{\partial^2 \tilde{W}} = \frac{2}{(\tilde{W}^T\hat{R}_{v1}\tilde{W})^4}\begin{Bmatrix}(\hat{R}_{H,2}\tilde{W}\tilde{W}^T\hat{R}_{H,2}^T)+ \\ (\tilde{W}^T\hat{R}_{vd}\tilde{W})(\tilde{W}^T\hat{R}_{v1}\tilde{W})^2(\hat{R}_{vd}+\hat{R}_{vd}^T)- \\ (\tilde{W}^T\hat{R}_{v1}\tilde{W})(\tilde{W}^T\hat{R}_{vd}\tilde{W})^2(\hat{R}_{v1}+\hat{R}_{v1}^T)- \\ (\tilde{W}^T\hat{R}_{vd}\tilde{W})^2(\hat{R}_{v1}+\hat{R}_{v1}^T)\tilde{W}\tilde{W}^T(\hat{R}_{v1}+\hat{R}_{v1}^T)\end{Bmatrix},$$

with $$\hat{R}_{H,2} = (\tilde{W}^T\hat{R}_{v1}\tilde{W})^2(\hat{R}_{vd}+\hat{R}_{vd}^T) - 2(\tilde{W}^T\hat{R}_{vd}\tilde{W})(\hat{R}_{v1}+\hat{R}_{v1}^T).$$

The corresponding gradient and Hessian of $J_{IID,2}$ can be given by:

$$\frac{\partial J_{IID,2}(\tilde{W})}{\partial \tilde{W}} = 2(\tilde{W}^T\hat{R}_{vd}\tilde{W})(\hat{R}_{vd}+\hat{R}_{vd}^T)\tilde{W} \tag{77}$$

$$\frac{\partial^2 J_{IID,2}(\tilde{W})}{\partial^2 \tilde{W}} = 2\begin{bmatrix}(\tilde{W}^T\hat{R}_{vd}\tilde{W})(\hat{R}_{vd}+\hat{R}_{vd}^T)+ \\ (\hat{R}_{vd}+\hat{R}_{vd}^T)\tilde{W}\tilde{W}^T(\hat{R}_{vd}+\hat{R}_{vd}^T)\end{bmatrix}.$$

Since $$\tilde{W}^T\frac{\partial^2 J_{IID,2}(\tilde{W})}{\partial^2 \tilde{W}}\tilde{W} = 12(\tilde{W}^T\hat{R}_{vd}\tilde{W})^2 = 12 J_{IID,2}(\tilde{W}) \tag{78}$$

is positive for all $\tilde{W}$, the cost function $J_{IID,2}$ is convex.

Instead of taking into account the output cross-correlation and the output power ratio, another possibility is to take into account the Interaural Transfer Function (ITF). The ITF cost function is generically defined as:

$$J_{ITF}(W)=|ITF_{out}(W)-ITF_{des}|^2, \tag{79}$$

where $ITF_{out}$ denotes the output ITF and $ITF_{des}$ denotes the desired ITF. This cost function can be used for the noise component as well as for the speech component. However, in the remainder of this section, only the noise component will be considered. The processing methodology for the speech component is similar. The output ITF of the noise components in the output signals can be defined by:

$$ITF_{out}(W) = \frac{Z_{v0}}{Z_{v1}} = \frac{W_0^H V}{W_1^H V}. \tag{80}$$

In other embodiments, if the output noise components are to be perceived as coming from the direction $\theta_v$, the desired ITF is equal to:

$$ITF_{des}(\omega) = \frac{HRTF_0(\omega, \theta_v)}{HRTF_1(\omega, \theta_v)}, \tag{81}$$

or $$ITF_{des}(\omega) = e^{-j\omega\frac{d\sin\theta_v}{c}f_s}, \tag{82}$$

in free-field conditions. In other embodiments, the desired ITF can be equal to the input ITF of the noise components in the reference microphone in both hearing instruments, i.e.

$$ITF_{des} = \frac{V_0}{V_1}, \tag{83}$$

which is assumed to be constant.

The cost function to be minimized can then be given by:

$$J_{ITF,1}(W) = E\left\{\left|\frac{W_0^H V}{W_1^H V} - ITF_{des}\right|^2\right\} \tag{84}$$

However, it is not possible to write this expression using the noise correlation matrix $R_v$. For mathematical convenience, a modified cost function can be defined:

$$\begin{aligned} J_{ITF,2}(W) &= E\{|W_0^H V - ITF_{des} W_1^H V|^2\} \\ &= E\left\{\left|W^H\begin{bmatrix} V \\ -ITF_{des}V\end{bmatrix}\right|^2\right\} \\ &= W^H\begin{bmatrix} R_v & -ITF_{des}^* R_v \\ -ITF_{des}R_v & |ITF_{des}|^2 R_v\end{bmatrix}W. \end{aligned} \tag{85}$$

Since the cost function $J_{ITF,2}(W)$ depends on the power of the noise component, whereas the original cost function $J_{ITF,1}(W)$ is independent of the amplitude of the noise component, a normalization with respect to the power of the noise component can be performed, i.e.:

$$J_{ITF,3}(W) = W^H R_{vt} W \tag{86}$$

with $$R_{vt} = \frac{M}{\mathrm{diag}(R_v)}\begin{bmatrix} R_v & -ITF_{des}^* R_v \\ -ITF_{des}R_v & |ITF_{des}|^2 R_v\end{bmatrix}. \tag{87}$$

In other embodiments, since the original cost function $J_{ITF,1}(W)$ is also independent of the size of the filter coefficients, equation (86) can be normalized with the norm of the filter, i.e.

$$J_{ITF,4}(W) = \frac{W^H R_{vt} W}{W^H W} \tag{88}$$

The binaural TF-LCMV beamformer 100, as illustrated in FIG. 4, can be extended with at least one of the different proposed cost functions based on at least one of the binaural cues 19 such as the ITD, IID or the ITF. Two exemplary embodiments will be given, where in the first embodiment the extension is based on the ITD and IID, and in the second embodiment the extension is based on the ITF. Since the speech components in the output signals of the binaural TF-LCMV beamformer 100 are constrained to be equal to the speech components in the reference microphones for both microphone arrays, the binaural cues of the speech source are generally well preserved. Hence, in some implementations of the beamformer 32, only the MV cost function with binaural cue-preservation of the noise component is extended. However, in some implementations of the beamformer 32, the MV cost function can be extended with binaural cue-preservation of the speech and noise components. This can be achieved by using the same cost functions/formulas but replacing the noise correlation matrices by speech correlation matrices. By extending the TF-LCMV with binaural cue-preservation in the extended TF-LCMV beamformer unit 32, the computation of the filters $W_0$ 57 and $W_1$ 59 for both left and right hearing instruments is linked.

In some embodiments, the MV cost function can be extended with a term that is related to the ITD cue and the IID cue of the noise component, the total cost function can be expressed as:

$$J_{tot,1}(\tilde{W}) = J_{MV}(\tilde{W}) + \beta J_{ITD}(\tilde{W}) + \gamma J_{IID}(\tilde{W}) \tag{89}$$

subject to the linear constraints defined in (29), i.e.:

$$\tilde{W}^T \tilde{H} = \tilde{F}^T$$

where β and γ are weighting factors, $J_{MV}(\tilde{W})$ is defined in (27), $J_{ITD}(\tilde{W})$ is defined in (60), and $J_{IID}(\tilde{W})$ is defined in either (73) or (75). The weighting factors may preferably be frequency-dependent, since it is known that for sound localization the ITD cue is more important for low frequencies, whereas the IID cue is more important for high frequencies (see e.g. Wightman & Kistler, "*The dominant role of low-frequency interaural time differences in sound localization,*" *J. Acoust. Soc. Am.*, vol. 91, no. 3, pp. 1648-1661, March. 1992). Since no closed-form expression is available for the filter solving this constrained optimization problem, iterative constrained optimization techniques can be used. Many of these optimization techniques are able to exploit the analytical expressions for the gradient and the Hessian that have been derived for the different terms in (89).

In some implementations, the MV cost function can be extended with a term that is related to the Interaural Transfer Function (ITF) of the noise component, and the total cost function can be expressed as:

$$J_{tot,2}(W) = J_{MV}(W) + \delta J_{ITF}(W) \tag{90}$$

subject to the linear constraints defined in (22), $$W^H H = F^H \tag{91}$$

where δ is a weighting factor, $J_{MV}(W)$ is defined in (20), and $J_{ITF}(W)$ is defined either in (86) or (88). When using (88), a closed-form expression is not available for the filter minimizing the total cost function $J_{tot,2}(\tilde{W})$, and hence, iterative constrained optimization techniques can be used to find a solution. When using (86), the total cost function can be written as:

$$J_{tot,2}(W) = W^H R_t W + \delta W^H R_{vt} W \tag{92}$$

such that the filter minimizing this constrained cost function can be derived according to:

$$W_{tot,2} = (R_t + \delta R_{vt})^{-1} H [H^H (R_t + \delta R_{vt})^{-1} H]^{-1} F. \tag{93}$$

Using the parameterization defined in (34), the constrained optimization problem of the filter W can be transformed into the unconstrained optimization problem of the filter $W_a$, defined in (45), i.e.:

$$J_{MV}(W_a) = E\left\{\left|U_0 - W_a^H \begin{bmatrix} U_{a0} \\ 0_{M-1} \end{bmatrix}\right|^2\right\} + \alpha E\left\{\left|U_1 - W_a^H \begin{bmatrix} 0_{M-1} \\ U_{a1} \end{bmatrix}\right|^2\right\}, \tag{94}$$

and the cost function in (85) can be written as:

$$\begin{aligned} J_{ITF,2}(W_a) &= E\left\{\left| \begin{matrix} (W_{q0}^H - W_{a0}^H H_{a0}^H)V - \\ (W_{q1}^H - W_{a1}^H H_{a1}^H) ITF_{des} V \end{matrix} \right|^2\right\} \\ &= E\left\{\left|(U_{v0} - ITF_{des} U_{v1}) - W_a^H \begin{bmatrix} U_{v,a0} \\ -ITF_{des} U_{v,a1} \end{bmatrix}\right|^2\right\}, \end{aligned} \tag{95}$$

with $U_{v0}$ and $U_{v1}$ respectively denoting the noise component of the speech reference signals $U_0$ and $U_1$, and likewise $U_{v,a0}$ and $U_{v,a1}$ denoting the noise components of the noise reference signals $U_{a0}$ and $U_{a1}$. The total cost function $J_{tot,2}(W_a)$ is equal to the weighted sum of the cost functions $J_{MV}(W_0)$ and $J_{ITF,2}(W_a)$, i.e.:

$$J_{tot,2}(W_a) = J_{MV}(W_a) + \delta J_{ITF,2}(W_a) \tag{96}$$

where δ includes the normalization with the power of the noise component, cf. (87).

The gradient of $J_{tot,2}(W_a)$ with respect to $W_a$ can be given by:

$$\begin{aligned} \frac{\partial J_{tot,2}(W_a)}{\partial W_a} = & -2E\left\{\begin{bmatrix} U_{a0} \\ 0_{M-1} \end{bmatrix} U_0^*\right\} + 2E\left\{\begin{bmatrix} U_{a0} \\ 0_{M-1} \end{bmatrix} [U_{a0}^H \; 0_{M-1}^H]\right\} W_a - \\ & 2\alpha E\left\{\begin{bmatrix} 0_{M-1} \\ U_{a1} \end{bmatrix} U_1^*\right\} + 2\alpha E\left\{\begin{bmatrix} 0_{M-1} \\ U_{a1} \end{bmatrix} [0_{M-1}^H \; U_{a1}^H]\right\} W_a - \\ & 2\delta E\left\{\begin{bmatrix} U_{v,a0} \\ -ITF_{des} U_{v,a1} \end{bmatrix} (U_{v0} - ITF_{des} U_{v1})^*\right\} + \\ & 2\delta E\left\{\begin{bmatrix} U_{v,a0} \\ -ITF_{des} U_{v,a1} \end{bmatrix} [U_{v,a0}^H \; -ITF_{des}^* U_{v,a1}^H]\right\} W_a \\ = & -2E\left\{\begin{bmatrix} U_{a0} \\ 0_{M-1} \end{bmatrix} Z_0^*\right\} - 2\alpha E\left\{\begin{bmatrix} 0_{M-1} \\ U_{a1} \end{bmatrix} Z_1^*\right\} - \\ & 2\delta E\left\{\begin{bmatrix} U_{v,a0} \\ -ITF_{des} U_{v,a1} \end{bmatrix} (Z_{v0} - ITF_{des} Z_{v1})^*\right\}. \end{aligned}$$

By setting the gradient equal to zero, the normal equations are obtained:

$$\underbrace{\left( \begin{bmatrix} E\{U_{a0} U_{a0}^H\} & 0_{M-1} \\ 0_{M-1} & \alpha E\{U_{a1} U_{a1}^H\} \end{bmatrix} + \delta \begin{bmatrix} E\{U_{v,a0} U_{v,a0}^H\} & -ITF_{des}^* E\{U_{v,a0} U_{v,a1}^H\} \\ -ITF_{des} E\{U_{v,a1} U_{v,a0}^H\} & |ITF_{des}|^2 E\{U_{v,a1} U_{v,a1}^H\} \end{bmatrix} \right)}_{R_a} W_a =$$

$$\underbrace{E\left\{\begin{bmatrix} U_{a0} \\ 0_{M-1} \end{bmatrix} U_0^*\right\} + \alpha E\left\{\begin{bmatrix} 0_{M-1} \\ U_{a1} \end{bmatrix} U_1^*\right\} + \delta E\left\{\begin{bmatrix} U_{v,a0} \\ -ITF_{des} U_{v,a1} \end{bmatrix} (U_{v0} - ITF_{des} U_{v1})^*\right\}}_{r_a},$$

such that the optimal filter is given by:

$$W_{a,opt} = R_a^{-1} r_a. \tag{97}$$

The gradient descent approach for minimizing $J_{tot,2}(W_a)$ yields:

$$W_a(i+1) = W_a(i) - \frac{\rho}{2}\left[\frac{\partial J_{tot,2}(W_a)}{\partial W_a}\right]_{W_a - W_a(i)}, \tag{98}$$

where i denotes the iteration index and ρ is the step size parameter. A stochastic gradient algorithm for updating $W_a$ is obtained by replacing the iteration index i by the time index k and leaving out the expectation values, as shown by:

$$W_a(k+1) = W_a(k) + \rho\left\{\begin{array}{l}\begin{bmatrix} U_{a0}(k) \\ 0_{M-1}\end{bmatrix} Z_0^*(k) + \\ \alpha\begin{bmatrix} 0_{M-1} \\ U_{a1}(k)\end{bmatrix} Z_1^*(k) + \\ \delta\begin{bmatrix} U_{v,a0}(k) \\ -ITF_{des}U_{v,a1}(k)\end{bmatrix} \\ \begin{pmatrix} Z_{v0}(k) - \\ ITF_{des}Z_{v1}(k)\end{pmatrix}^* \end{array}\right\}. \tag{99}$$

Figure 5:
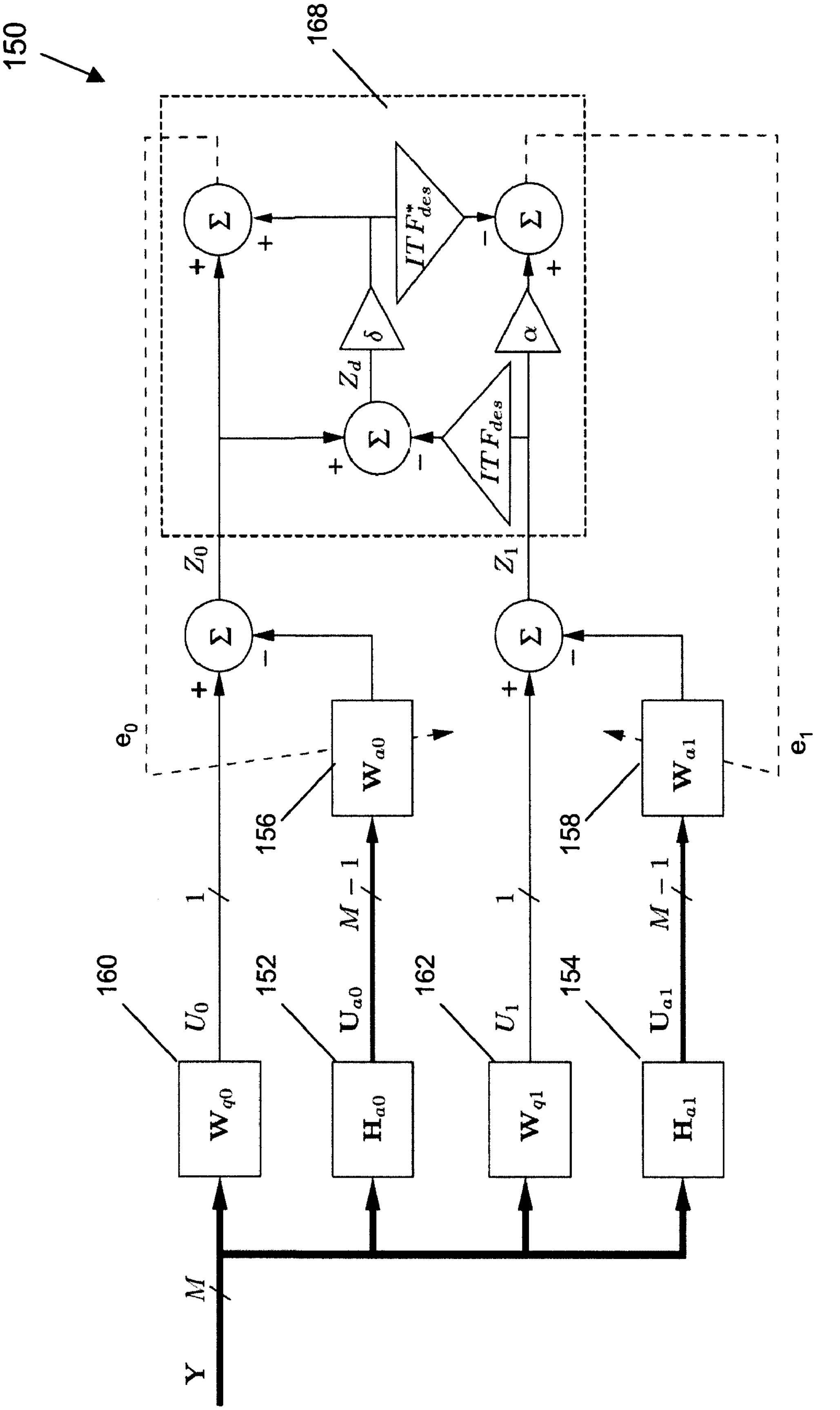
FIG. 5 is a block diagram of another exemplary embodiment of the binaural spatial noise reduction unit taking into account the interaural transfer function of the noise component.

It can be shown that:

$$E\{W_a(k+1) - W_{a,opt}\} = [I_{2(M-1)} - \rho R_a]^{k+1} E\{W_a(0) - W_{a,opt}\}, \tag{100}$$

such that the adaptive algorithm in (99) is convergent in the mean if the step size ρ is smaller than $2/\lambda_{max}$, where $\lambda_{max}$ is the maximum eigenvalue of $R_a$. Hence, similar to standard LMS adaptive updating, setting $$\rho < \frac{2}{E\{U_{a0}^H U_{a0}\} + \alpha E\{U_{a1}^H U_{a1}\} + \delta\begin{pmatrix} E\{U_{v,a0}^H U_{v,a0}\} + \\ |ITF_{des}|^2 E\{U_{v,a1}^H U_{v,a1}\}\end{pmatrix}} \tag{101}$$

guarantees convergence (see e.g. Haykin, "*Adaptive Filter Theory*", *Prentice-Hall,* 2001). The adaptive normalized LMS (NLMS) algorithm for updating the filters $W_{a0}(k)$ and $W_{a1}(k)$ during noise-only periods hence becomes:

$$\begin{aligned}
Z_0(k) &= U_0(k) - W_{a0}^H(k)U_{a0}(k) \\
Z_1(k) &= U_1(k) - W_{a1}^H(k)U_{a1}(k) \\
Z_d(k) &= Z_0(k) - ITF_{des}Z_1(k) \\
P_{a0}(k) &= \lambda P_{a0}(k-1) + (1-\lambda)U_{a0}^H(k)U_{a0}(k) \\
P_{a1}(k) &= \lambda P_{a1}(k-1) + (1-\lambda)U_{a1}^H(k)U_{a1}(k) \\
P(k) &= (1+\delta)P_{a0}(k) + (\alpha + \delta|ITF_{des}|^2)P_{a1}(k) \\
W_{a0}(k+1) &= W_{a0}(k) + \frac{\rho'}{P(k)}U_{a0}(Z_0(k) + \delta Z_d(k))^* \\
W_{a1}(k+1) &= W_{a1}(k) + \frac{\rho'}{P(k)}U_{a1}(Z_1(k) + \delta\, ITF_{des}^* Z_d(k))^*
\end{aligned} \tag{102}$$

where λ is a forgetting factor for updating the noise energy (these equations roughly correspond to the block processing shown in FIG. 5 although not all parameters are shown in FIG. 5). This algorithm is similar to the adaptive TF-LCMV implementation described in Gannot, Burshtein & Weinstein, "*Signal Enhancement Using Beamforming and Non-Stationarity with Applications to Speech,*" *IEEE Trans. Signal Processing*, vol. 49, no. 8, pp. 1614-1626, August 2001, where the left output signal $Z_0(k)$ is replaced by $Z_0(k)+\delta Z_d(k)$, and the right output signal $Z_1(k)$ is replaced by $\alpha Z_1(k)-\delta\ ITF_{des}Z_d(k)$ which is feedback that is taken into account to adapt the weights of adaptive filters $W_{a0}$ and $W_{a1}$ which correspond to filters 156 and 158 in FIGS. 6*a*, 6*b* and 7. Alpha is a trade-off parameter between the left and the right hearing instrument (for example, see equation (18)), generally set equal to 1. Delta is the trade-off between binaural cue-preservation and noise reduction.

A block diagram of an exemplary embodiment of the extended TF-LCMV structure 150 that takes into account the interaural transfer function (ITF) of the noise component is depicted in FIG. 5. Instead of using the NLMS algorithm for updating the weights for the filters, it is also possible to use other adaptive algorithms, such as the recursive least squares (RLS) algorithm, or the affine projection algorithm (APA) for example. Blocks 160, 152, 162 and 154 generally correspond to blocks 110, 102, 112 and 104 of beamformer 100. Blocks 156 and 158 somewhat correspond to blocks 106 and 108, however, the weights for blocks 156 and 158 are adaptively updated based on error signals $e_0$ and $e_1$ calculated by the error signal generator 168. The error signal generator 168 corresponds to the equations in (102), i.e. first an intermediate signal $Z_d$ is generated by multiplying the second noise-reduced signal $Z_1$ (corresponds to the second noise-reduced signal 20) by the desired value of the ITF cue $ITF_{des}$ and subtracting it from the first noise-reduced signal $Z_0$ (corresponds to the first noise-reduced signal 18). Then, the error signal $e_0$ for the first adaptive filter 156 is generated by multiplying the intermediate signal $Z_d$ by the weighting factor δ and adding it to the first noise-reduced signal $Z_0$, while the error signal $e_1$ for the second adaptive filter 158 is generated by multiplying the intermediate signal $Z_d$ by the weighting factor δ and the complex conjugate of the desired value of the ITF cue $ITF_{des}$ and subtracting it from the second noise-reduced signal $Z_1$ multiplied by the factor α. The value $ITF_{des}$ is a frequency-dependent number that specifies the direction of the location of the noise source relative to the first and second microphone arrays.

Figure 6A:
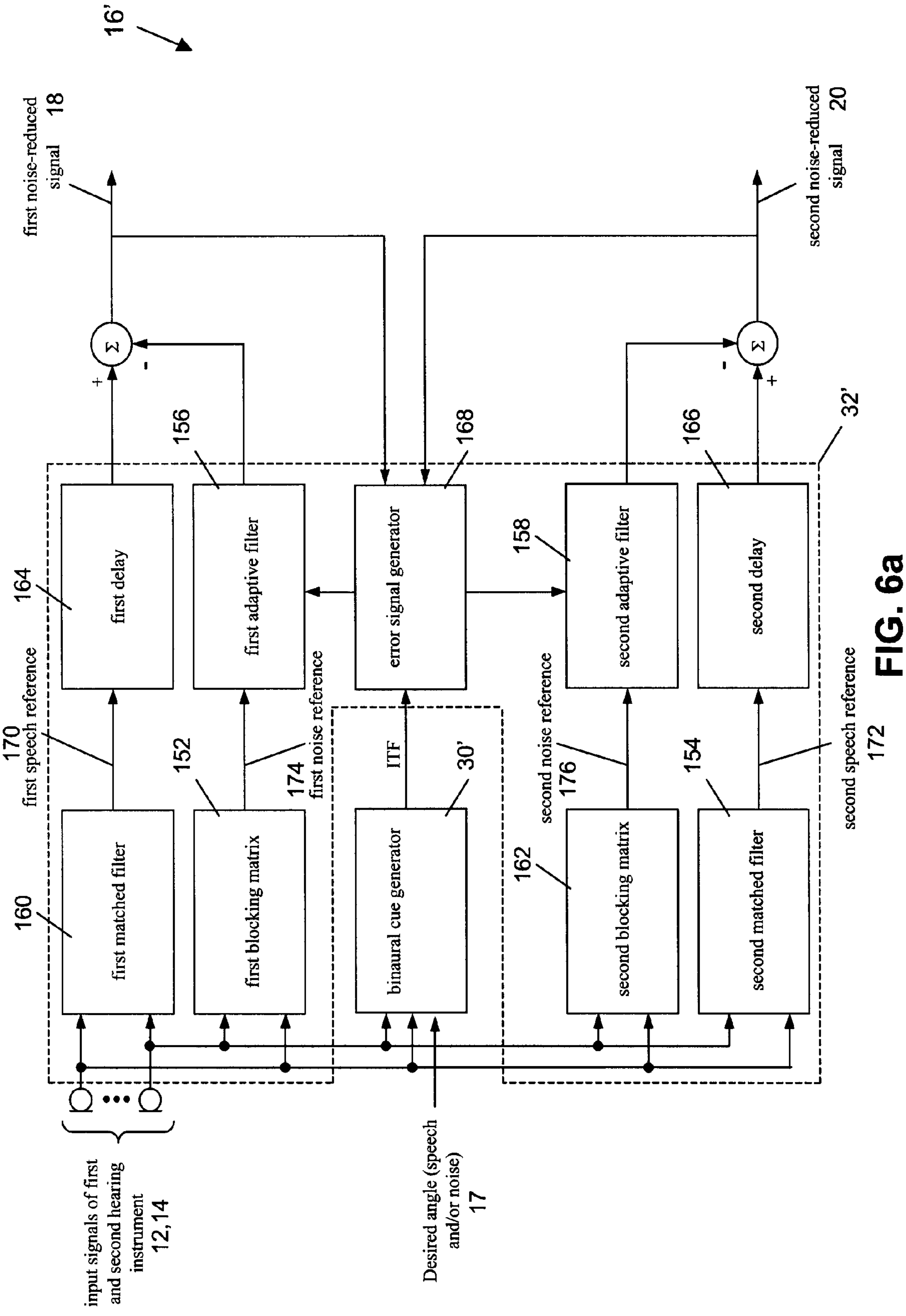
FIG. 6*a* is a block diagram of another exemplary embodiment of the binaural spatial noise reduction unit of FIG. 1.

Referring now to FIG. 6*a*, shown therein is an alternative embodiment of the binaural spatial noise reduction unit 16' that generally corresponds to the embodiment 150 shown in FIG. 5. In both cases, the desired interaural transfer function ($ITF_{des}$) of the noise component is determined and the beamformer unit 32 employs an extended TF-LCMV methodology that is extended with a cost function that takes into account the ITF as previously described. The interaural transfer function (ITF) of the noise component can be determined by the binaural cue generator 30' using one or more signals from the input signals sets 12 and 14 provided by the microphone arrays 13 and 15 (see the section on cue processing), but can also be determined by computing or specifying the desired angle 17 from which the noise source should be perceived and by using head related transfer functions (see equations 82 and 83) (this can include using one or more signals from each input signal set).

For the noise reduction unit 16', the extended TF-LCMV beamformer 32' includes first and second matched filters 160 and 154, first and second blocking matrices 152 and 162, first and second delay blocks 164 and 166, first and second adaptive filters 156 and 158, and error signal generator 168. These blocks correspond to those labeled with similar reference numbers in FIG. 5. The derivation of the weights used in the matched filters, adaptive filters and the blocking matrices have been provided above. The input signals of both microphone arrays 12 and 14 are processed by the first matched filter 160 to produce a first speech reference signal 170, and by the first blocking matrix 152 to produce a first noise reference signal 174. The first matched filter 160 is designed such that the speech component of the first speech reference signal 170 is very similar, and in some cases equal, to the speech component of one of the input signals of the first microphone array 13. The first blocking matrix 152 is preferably designed to avoid leakage of speech components into the first noise reference signal 174. The first delay block 164 provides an appropriate amount of delay to allow the adaptive filter 156 to use non-causal filter taps. The first delay block 164 is optional but will typically improve performance when included. A typical value used for the delay is half of the filter length of the adaptive filter 156. The first noise-reduced output signal 18 is then obtained by processing the first noise reference signal 174 with the first adaptive filter 156 and subtracting the result from the possibly delayed first speech reference signal 170. It should be noted that there can be some embodiments in which matched filters per se are not used for blocks 160 and 154; rather any filters can be used for blocks 160 and 154 which attempt to preserve the speech component as described.

Similarly, the input signals of both microphone arrays 13 and 15 are processed by a second matched filter 154 to produce a second speech reference signal 172, and by a second blocking matrix 162 to produce second noise reference signal 176. The second matched filter 154 is designed such that the speech component of the second speech reference signal 172 is very similar, and in some cases equal, to the speech component of one of the input signals provided by the second microphone array 15. The second blocking matrix 162 is designed to avoid leakage of speech components into the second noise reference signal 176. The second delay block 166 is present for the same reasons as the first delay block 164 and can also be optional. The second noise-reduced output signal 20 is then obtained by processing the second noise reference signal 176 with the second adaptive filter 158 and subtracting the result from the possibly delayed second speech reference signal 172.

The (different) error signals that are used to vary the weights used in the first and the second adaptive filter 156 and 158 can be calculated by the error signal generator 168 based on the ITF of the noise component of the input signals from both microphone arrays 13 and 15. The adaptation rule for the adaptive filters 156 and 158 are provided by equations (99) and (102). The operation of the error signal generator 168 has already been discussed above.

Figure 6B:
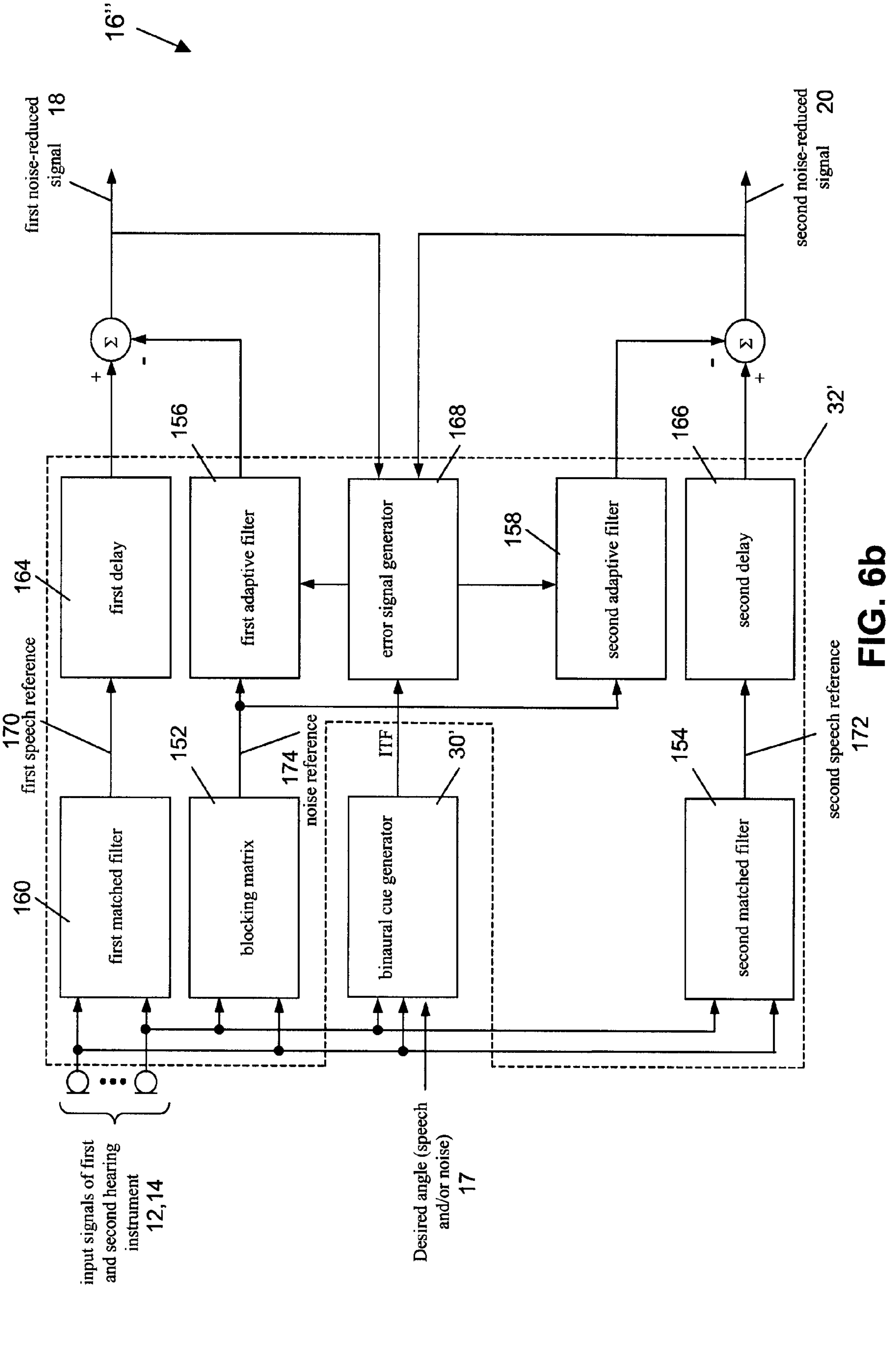
FIG. 6*b* is a block diagram of another exemplary embodiment of the binaural spatial noise reduction unit of FIG. 1.

Referring now to FIG. 6*b*, shown therein is an alternative embodiment for the beamformer 16" in which there is just one blocking matrix 152 and one noise reference signal 174. The remainder of the beamformer 16" is similar to the beamformer 16'. The performance of the beamformer 16" is similar to that of beamformer 16' but at a lower computational complexity. Beamformer 16" is possible when providing all input signals from both input signal sets to both blocking matrices 152 and 154 since in this case, the noise reference signals 174 and 176 provided by the blocking matrices 152 and 154 can no longer be generated such that they are independent from one another.

Figure 7:
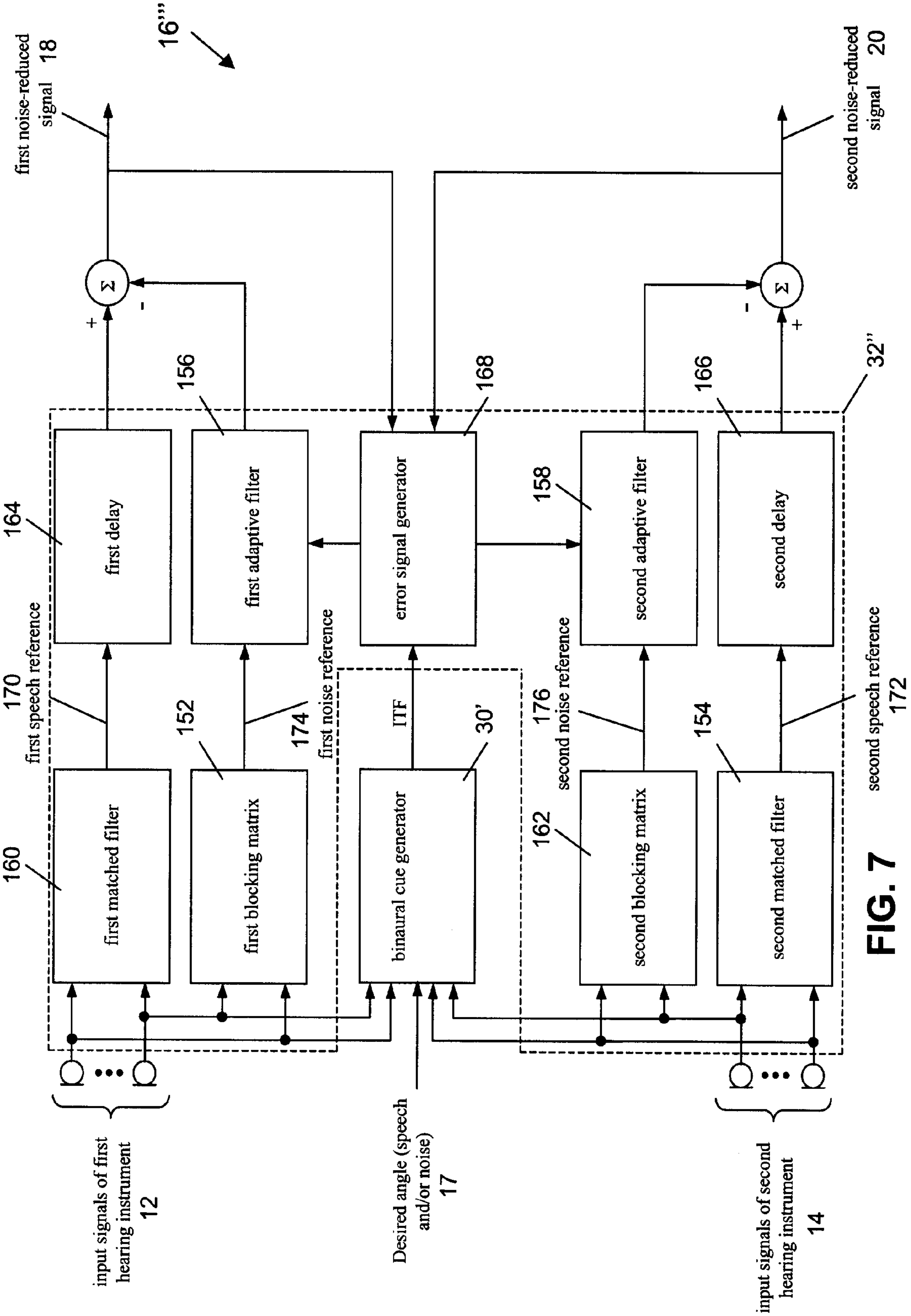
FIG. 7 is a block diagram of another exemplary embodiment of the binaural spatial noise reduction unit of FIG. 1.

Referring now to FIG. 7, shown therein is another alternative embodiment of the binaural spatial noise reduction unit 16''' that generally corresponds to the embodiment shown in FIG. 5. However, the spatial preprocessing provided by the matched filters 160 and 154 and the blocking matrices 152 and 162 are performed independently for each set of input signals 12 and 14 provided by the microphone arrays 13 and 15. This provides the advantage that less communication is required between left and right hearing instruments.

Figure 8:
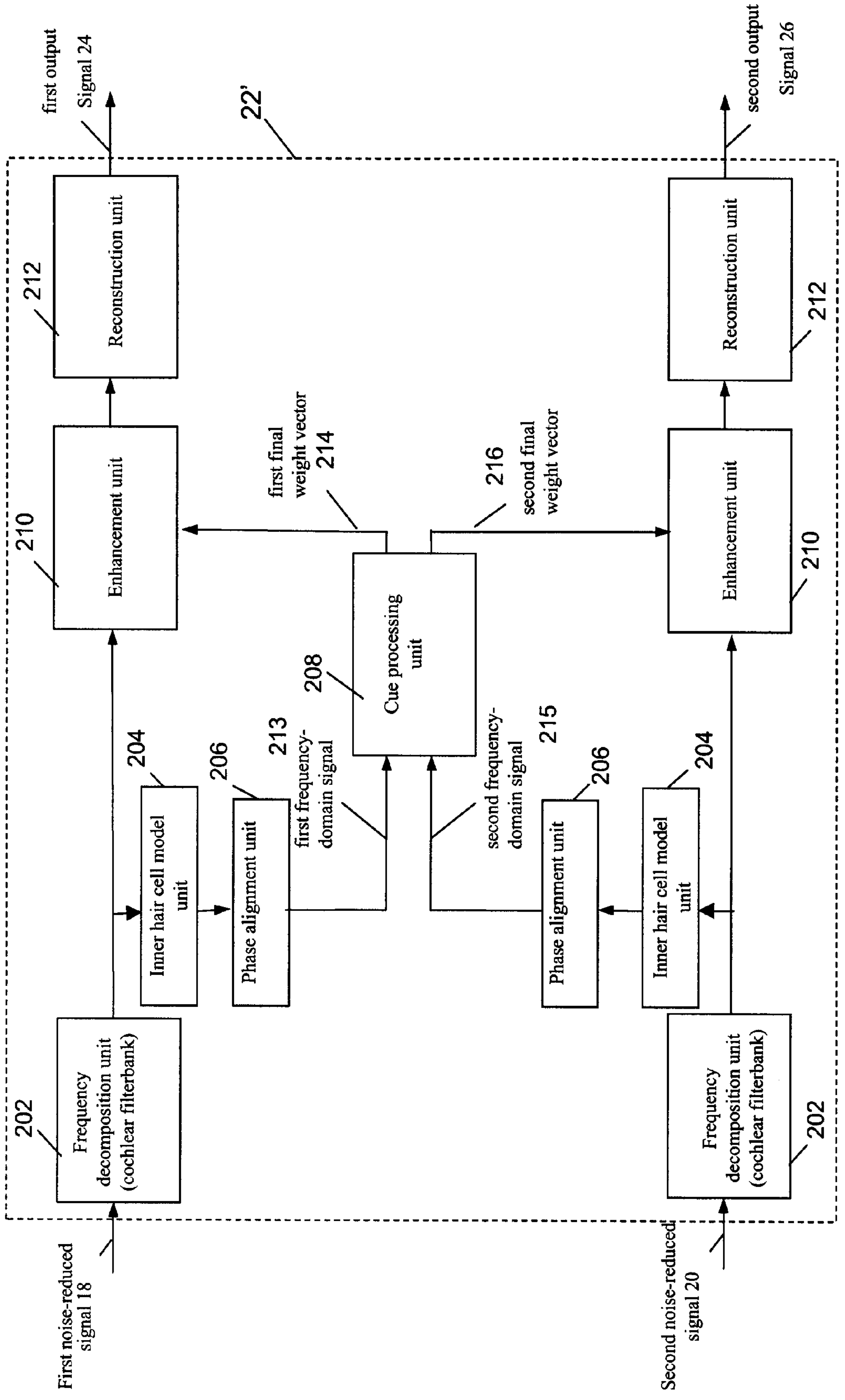
FIG. 8 is a block diagram of an exemplary embodiment of the perceptual binaural speech enhancement unit of FIG. 1.

Referring next to FIG. 8, shown therein is a block diagram of an exemplary embodiment of the perceptual binaural speech enhancement unit 22'. It is psychophysically motivated by the primitive segregation mechanism that is used in human auditory scene analysis. In some implementations, the perceptual binaural speech enhancement unit 22 performs bottom-up segregation of the incoming signals, extracts information pertaining to a target speech signal in a noisy background and compensates for any perceptual grouping process that is missing from the auditory system of a hearing-impaired person. In the exemplary embodiment, the enhancement unit 22' includes a first path for processing the first noise reduced signal 18 and a second path for processing the second noise reduced signal 20. Each path includes a frequency decomposition unit 202, an inner hair cell model unit 204, a phase alignment unit 206, an enhancement unit 210 and a reconstruction unit 212. The speech enhancement unit 22' also includes a cue processing unit 208 that can perform cue extraction, cue fusion and weight estimation. The perceptual binaural speech enhancement unit 22' can be combined with other subband speech enhancement techniques and auditory compensation schemes that are used in typical multiband hearing instruments, such as, for example, automatic volume control and multiband dynamic range compression. In general, the speech enhancement unit 22' can be considered to include two processing branches and the cue processing unit 208; each processing branch includes a frequency decomposition unit 202, an inner hair cell unit 204, a phase alignment unit 206, an enhancement unit 210 and a reconstruction unit 212. Both branches are connected to the cue processing unit 208.

Sounds from several sources arrive at the ear as a complex mixture. They are largely overlapping in the time-domain. In order to organize sounds into their independent sources, it is often more meaningful to transform the signal from the time-domain to a time-frequency representation, where subsequent grouping can be applied. In a hearing instrument application, the temporal waveform of the enhanced signal needs to be recovered and applied to the ears of the hearing instrument user. To facilitate a faithful reconstruction, the time-frequency analysis transform that is used should be a linear and invertible process.

In some embodiments, the frequency decomposition 202 is implemented with a cochlear filterbank, which is a filterbank that approximates the frequency selectivity of the human cochlea. Accordingly, the noise-reduced signals 18 and 20 are passed through a bank of bandpass filters, each of which simulates the frequency response that is associated with a particular position on the basilar membrane of the human cochlea. In some implementations of the frequency decomposition unit 202, each bandpass filter may consist of a cascade of four second-order IIR filters to provide a linear and impulse-invariant transform as discussed in Slaney, "*An efficient implementation of the Patterson-Holdsworth auditory filterbank", Apple Computer,* 1993. In an alternative realization, the frequency decomposition unit 202 can be made by using FIR filters (see e.g. Irino & Unoki, "*A time-varying, analysis/synthesis auditory filterbank using the gammachirp", in Proc. IEEE Int Conf. Acoustics, Speech, and Signal Processing*, Seattle Wash., USA, May 1998, pp. 3653-3656). The output from the frequency decomposition unit 202 is a plurality of frequency band signals corresponding to one of two distinct spatial orientations such as left and right for a hearing instrument user. The frequency band output signals from the frequency decomposition unit 202 are processed by both the inner hair cell model unit 204 and the enhancement unit 210.

Because the temporal property of sound is important to identify the acoustic attribute of sound and the spatial direction of the sound source, the auditory nerve fibers in the human auditory system exhibit a remarkable ability to synchronize their responses to the fine structure of the low-frequency sound or the temporal envelope of the sound. The auditory nerve fibers phase-lock to the fine time structure for low-frequency stimuli. At higher frequencies, phase-locking to the fine structure is lost due to the membrane capacitance of the hair cell. Instead, the auditory nerve fibers will phase-lock to the envelope fluctuation. Inspired by the nonlinear neural transduction in the inner hair cells of the human auditory system, the frequency band signals at the output of the frequency decomposition unit 202 are processed by the inner hair cell model unit 204 according to an inner hair cell model for each frequency band. The inner hair cell model corresponds to at least a portion of the processing that is performed by the inner hair cell of the human auditory system. In some implementations, the processing corresponding to one exemplary inner hair cell model can be implemented by a half-wave rectifier followed by a low-pass filter operating at 1 kHz. Accordingly, the inner hair cell model unit 204 performs envelope tracking in the high-frequency bands (since the envelope of the high-frequency components of the input signals carry most of the information), while passing the signals in the low-frequency bands. In this way, the fine temporal structures in the responses of the high frequencies are removed. The cue extraction in the high frequencies hence becomes easier. The resulting filtered signal from the inner hair cell model unit 204 is then processed by the phase alignment unit 206.

At the output of the frequency decomposition unit 202, low-frequency band signals show a 10 ms or longer phase lag compared to high-frequency band signals. This delay decreases with increasing centre frequency. This can be interpreted as a wave that starts at the high-frequency side of the cochlea and travels down to the low-frequency side with a finite propagation speed. Information carried by natural speech signals is non-stationary, especially during a rapid transition (e.g. onset). Accordingly, the phase alignment unit 206 can provide phase alignment to compensate for this phase difference across the frequency band signals to align the frequency channel responses to give a synchronous representation of auditory events in the first and second frequency-domain signals 213 and 215. In some implementations, this can be done by time-shifting the response with the value of a local phase lag, so that the impulse responses of all the frequency channels reflect the moment of maximal excitation at approximately the same time. This local phase lag produced by the frequency decomposition unit 202 can be calculated as the time it takes for the impulse response of the filterbank to reach its maximal value. However, this approach entails that the responses of the high-frequency channels at time t are lined up with the responses of the low-frequency channels at t+10 ms or even later (10 ms is used for exemplary purposes). However, a real-time system for hearing instruments cannot afford such a long delay. Accordingly, in some implementations, a given frequency band signal provided by the inner hair cell model unit 204 is only advanced by one cycle with respect to its centre frequency. With this phase alignment scheme, the onset timing is closely synchronized across the various frequency band signals that are produced by the inner hair cell module units 204.

The low-pass filter portion of the inner hair cell model unit 204 produces an additional group delay in the auditory peripheral response. In contrast to the phase lag caused by the frequency decomposition unit 202, this delay is constant across the frequencies. Although this delay does not cause asynchrony across the frequencies, it is beneficial to equalize this delay in the enhancement unit 210, so that any misalignment between the estimated spectral gains and the outputs of the frequency decomposition unit 202 is minimized.

For each time-frequency element (i.e. frequency band signal for a given frame or time segment) at the output of the inner hair cell model unit 204, a set of perceptual cues is extracted by the cue processing unit 208 to determine particular acoustic properties associated with each time-frequency element. The length of the time segment is preferably several milliseconds; in some implementations, the time segment can be 16 milliseconds long. These cues can include pitch, onset, and spatial localization cues, such as ITD, IID and IED. Other perceptual grouping cues, such as amplitude modulation, frequency modulation, and temporal continuity, may also be additionally incorporated into the same framework. The cue processing unit 208 then fuses information from multiple cues together. By exploiting the correlation of various cues, as well as spatial information or behaviour, a subsequent grouping process is performed on the time-frequency elements of the first and second frequency domain signals 213 and 215 in order to identify time-frequency elements that are likely to arise from the desired target sound stream.

Figure 9:
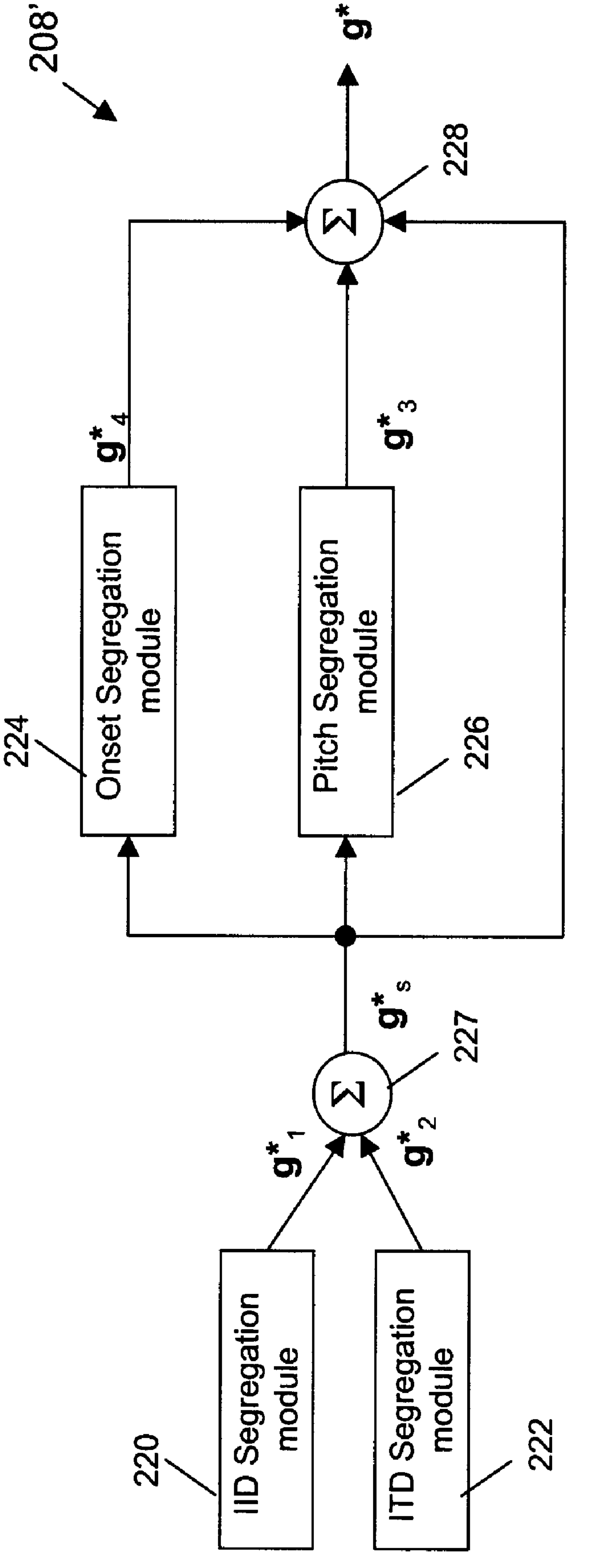
FIG. 9 is a block diagram of an exemplary embodiment of a portion of the cue processing unit of FIG. 8.

Referring now to FIG. 9, shown therein is an exemplary embodiment of a portion of the cue processing unit 208'. For a given cue, values are calculated for the time-frequency elements (i.e. frequency components) for a current time frame by the cue processing unit 208' so that the cue processing unit 208' can segregate the various frequency components for the current time frame to discriminate between frequency components that are associated with cues of interest (i.e. the target speech signal) and frequency components that are associated with cues due to interference. The cue processing unit 208' then generates weight vectors for these cues that contains a list of weight coefficients computed for the constituent frequency components in the current time frame. These weight vectors are composed of real values restricted to the range [0, 1]. For a given time-frequency element that is dominated by the target sound stream, a larger weight is assigned to preserve this element. Otherwise, a smaller weight is set to suppress elements that are distorted by interference. The weight vectors for various cues are then combined according to a cue processing hierarchy to arrive at final weights that can be applied to the first and second noise reduced signals 18 and 20.

In some embodiments, to perform segregation on a given cue, a likelihood weighting vector maybe associated to each cue, which represents the confidence of the cue extraction in each time-frequency element output from the inner hair cell model unit 206. This allows one to take advantage of a priori knowledge with respect to the frequency behaviour of certain cues to adjust the weight vectors for the cues.

Since the potential hearing instrument user can flexibly steer his/her head to the desired source direction (actually, even normal hearing people need to take advantage of directional hearing in a noisy listening environment), it is reasonable to assume that the desired signal arises around the frontal centre direction, while the interference comes from off-centre. According to this assumption, the binaural spatial cues are able to distinguish the target sound source from the interference sources in a cocktail-party environment. On the contrary, while monaural cues are useful to group the simultaneous sound components into separate sound streams, monaural cues have difficulty distinguishing the foreground and background sound streams in a multi-babble cocktail-party environment. Therefore, in some implementations, the preliminary segregation is also preferably performed in a hierarchical process, where the monaural cue segregation is guided by the results of the binaural spatial segregation (i.e. segregation of spatial cues occurs before segregation of monaural cues). After the preliminary segregation, all these weight vectors are pooled together to arrive at the final weight vector, which is used to control the selective enhancement provided in the enhancement unit 210.

In some embodiments, the likelihood weighting vectors for each cue can also be adapted such that the weights for the cues that agree with the final decision are increased and the weights for the other cues are reduced.

Spatial localization cues, as long as they can be exploited, have the advantage that they exist all the time, irrespective of whether the sound is periodic or not. For source localization, ITD is the main cue at low frequencies (<750 Hz), while IID is the main cue at high frequencies (>1200 Hz). But unfortunately, in most real listening environments, multi-path echoes due to room reverberation inevitably distort the localization information of the signal. Hence, there is no single predominant cue from which a robust grouping decision can be made. It is believed that one reason why human auditory systems are exceptionally resistant to distortion lies in the high redundancy of information conveyed by the speech signal. Therefore, for a computational system aiming to separate the sound source of interest from the complex inputs, the fusion of information conveyed by multiple cues has the potential to produce satisfactory performance, similar to that in human auditory systems.

In the embodiment 208' shown in FIG. 9, the portion of the cue processing unit 208' that is shown includes an IID segregation module 220, an ITD segregation module 222, an onset segregation module 224 and a pitch segregation module 226. Embodiment 208' shows one general framework of cue processing that can be used to enhance speech. The modules 220, 222, 224 and 226 operate on values that have been estimated for the corresponding cue from the time-frequency elements provided by the phase alignment unit 206. The cue processing unit 208' further includes two combination units 227 and 228. Spatial cue processing is first done by the IID and ITD segregation module 220 and 222. Overall weight vectors $g^*_1$ and $g^*_2$ are then calculated for the time-frequency elements based on values of the IID and ITD cues for these time-frequency elements. The weight vectors $g^*_1$ and $g^*_2$ are then combined to provide an intermediate spatial segregation weight vector $g^*_s$. The intermediate spatial segregation weight vector $g^*_s$ is then used along with pitch and onset values calculated for the time-frequency elements to generate weight vectors $g^*_3$ and $g^*_4$ for the onset and pitch cues. The weight vectors $g^*_3$ and $g^*_4$ are then combined with the intermediate spatial segregation weight vector $g^*_s$ by the combination unit 228 to provide a final weight vector $g^*$. The final weight vector $g^*$ can then be applied against the time-frequency elements by the enhancement unit 210 to enhance time-frequency elements (i.e. frequency band signals for a given time frame) that correspond to the desired speech target signal while de-emphasizing time-frequency elements that corresponds to interference.

It should be noted that other cues can be used for the spatial and temporal processing that is performed by the cue processing unit 208'. In fact, more cues can be processed however this will lead to a more complicated design that requires more computation and most likely an increased delay in providing an enhanced signal to the user. This increased delay may not be acceptable in certain cases. An exemplary list of cues that may be used include ITD, IID, intensity, loudness, periodicity, rhythm, onsets/offsets, amplitude modulation, frequency modulation, pitch, timbre, tone harmonicity and formant. This list is not meant to be an exhaustive list of cues that can be used.

Furthermore, it should be noted that the weight estimation for cue processing unit can be based on a soft decision rather than a hard decision. A hard decision involves selecting a value of 0 or 1 for a weight of a time-frequency element based on the value of a given cue; i.e. the time-frequency element is either accepted or rejected. A soft decision involves selecting a value from the range of 0 to 1 for a weight of a time-frequency element based on the value of a given cue; i.e. the time-frequency element is weighted to provide more or less emphasis which can include totally accepting the time-frequency element (the weight value is 1) or totally rejecting the time-frequency element (the weight value is 0). Hard decisions lose information content and the human auditory system uses soft decisions for auditory processing.

Figure 10:
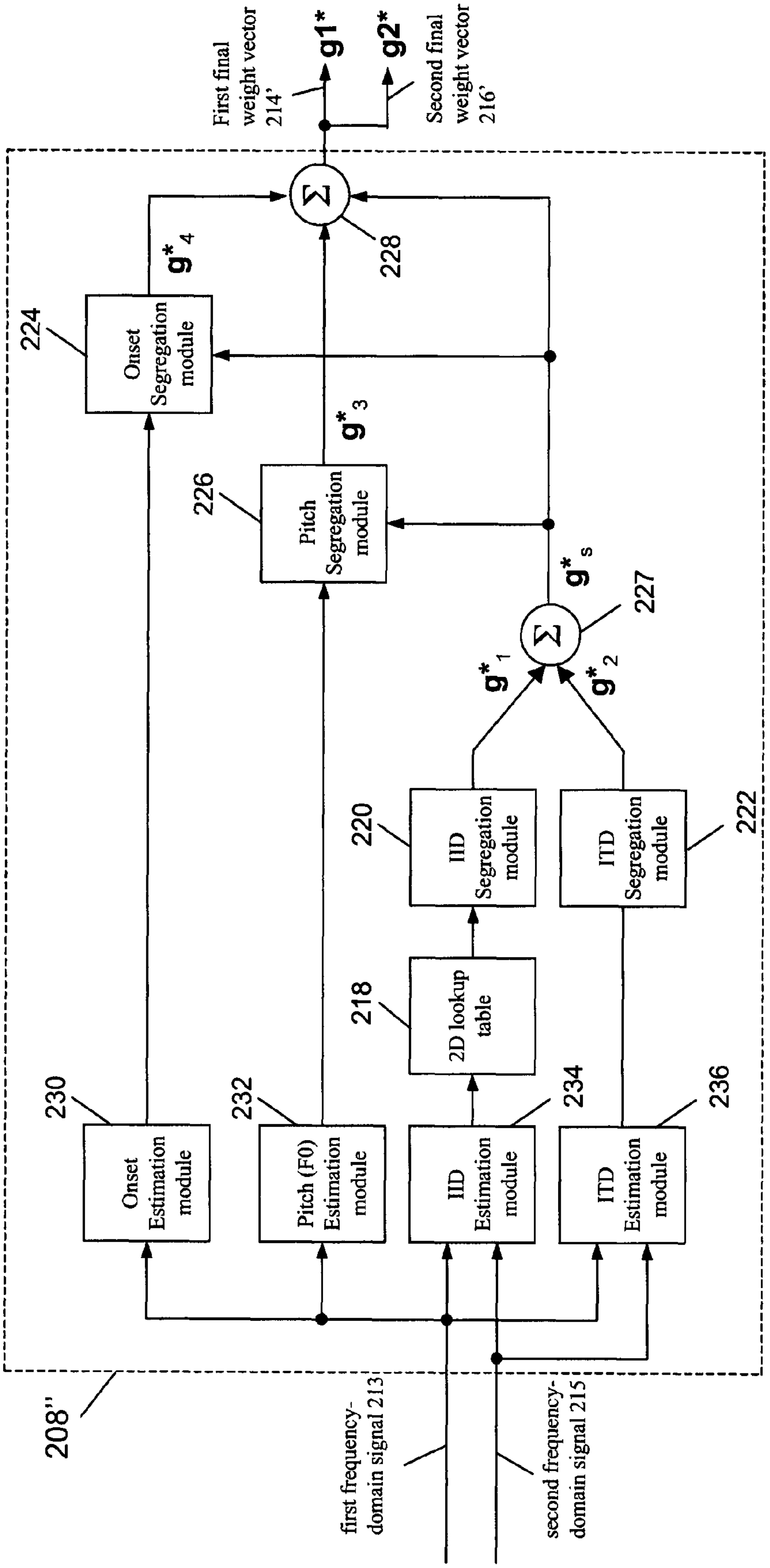
FIG. 10 is a block diagram of another exemplary embodiment of the cue processing unit of FIG. 8.
Figure 11:
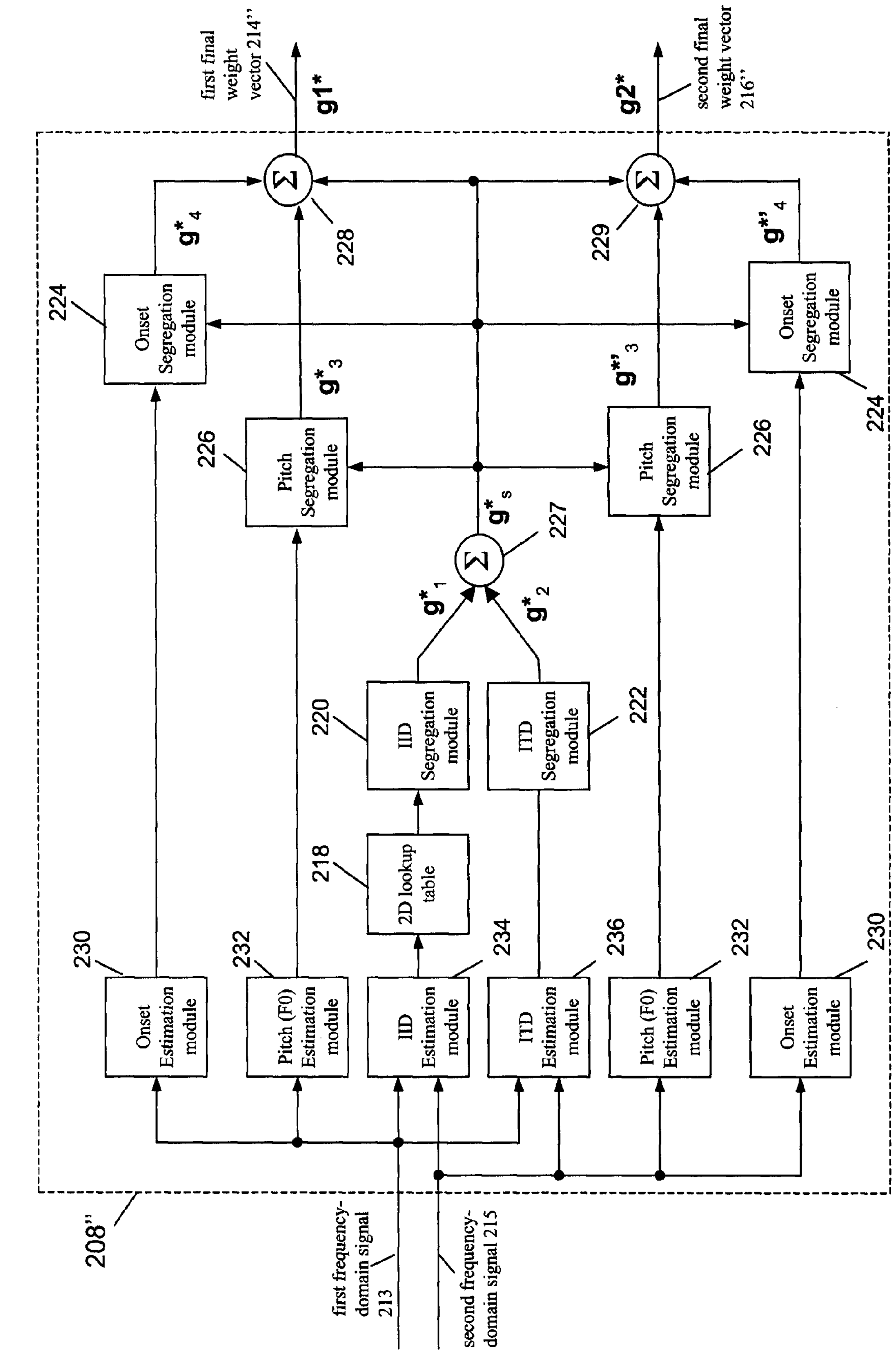
FIG. 11 is a block diagram of another exemplary embodiment of the cue processing unit of FIG. 8.

Referring now to FIGS. 10 and 11, shown therein are block diagrams of two alternative embodiments of the cue processing unit 208" and 208'". For embodiment 208" the same final weight vector is used for both the left and right channels in binaural enhancement, and in embodiment 208'" different final weight vectors are used for both the left and right channels in binaural enhancement. Many other different types of acoustic cues can be used to derive separate perceptual streams corresponding to the individual sources.

Referring now to FIGS. 10 to 11, cues that are used in these exemplary embodiments include monaural pitch, acoustic onset, IID and ITD. Accordingly, embodiments 208" and 208'" include an onset estimation module 230, a pitch module 232, an IID estimation module 234 and an ITD estimation module 236. These modules are not shown in FIG. 9 but it should be understood that they can be used to provide cue data for the time-frequency elements that the onset segregation module 224, pitch segregation module 226, IID segregation module 220 and the ITD segregation module 222 operate on to produce the weight vectors $g^*_4$, $g^*_3$, $g^*_1$ and $g^*_2$.

With regards to embodiment 208", the onset estimation and pitch estimation modules 230 and 232 operate on the first frequency domain signal 213, while the IID estimation and ITD estimation modules 234 and 236 operate on both the first and second frequency-domain signals 213 and 215 since these modules perform processing for spatial cues. It is understood that the first and second frequency domain signals 213 and 215 are two different spatially oriented signals such as the left and right channel signals for a binaural hearing aid instrument that each include a plurality of frequency band signals (i.e. time-frequency elements). The cue processing unit 208" uses the same weight vector for the first and second final weight vectors 214 and 216 (i.e. for left and right channels).

With regards to embodiment 208'", modules 230 and 234 operate on both the first and second frequency domain signals 213 and 215, and while the onset estimation and pitch estimation modules 230 and 232 process both the first and second frequency-domain signals 213 and 215 but in a separate fashion. Accordingly, there are two separate signal paths for processing the onset and pitch cues, hence the two sets of onset estimation 230, pitch estimation 232, onset segregation 224 and pitch segregation 226 modules. The cue processing unit 208'" uses different weight vectors for the first and second final weight vectors 214 and 216 (i.e. for left and right channels).

Pitch is the perceptual attribute related to the periodicity of a sound waveform. For a periodic complex sound, pitch is the fundamental frequency (F0) of a harmonic signal. The common fundamental period across frequencies provides a basis for associating speech components originating from the same larynx and vocal tract. Compatible with this idea, psychological experiments have revealed that periodicity cues in voiced speech contribute to noise robustness via auditory grouping processes.

Robust pitch extraction from noisy speech is a nontrivial process. In some implementations, the pitch estimation module 232 may use the autocorrelation function to estimate pitch. It is a process whereby each frequency output band signal of the phase alignment unit 206 is correlated with a delayed version of the same signal. At each time instance, a two-dimensional (centre frequency vs. autocorrelation lag) representation, known as the autocorrelogram, is generated. For a periodic signal, the similarity is greatest at lags equal to integer multiples of its fundamental period. This results in peaks in the autocorrelation function (ACF) that can be used as a cue for periodicity.

Different definitions of the ACF can be used. For dynamic signals, the signal of interest is the periodicity of the signal within a short window. This short-time ACF can be defined by:

$$ACF(i, j, \tau) = \frac{\sum_{k=0}^{K-1} x_i(j-k)x_i(j-k-\tau)}{\sum_{k=0}^{K-1} x_i^2(j-k)}, \quad (103)$$

where $x_i(j)$ is the $j^{th}$ sample of the signal at the $i^{th}$ frequency band, $\tau$ is the autocorrelation lag, K is the integration window length and k is the index inside the window. This function is normalized by the short-time energy $$\sum_{k=0}^{K-1} x_i^2(j-k).$$

With this normalization, the dynamic range of the results is restricted to the interval [−1,1], which facilities a thresholding decision. Normalization can also equalize the peaks in the frequency bands whose short-time energy might be quite low compared to the other frequency bands. Note that all the minus signs in (103) ensure that this implementation is causal. In one implementation, using the discrete correlation theorem, the short-time ACF can be efficiently computed using the fast Fourier transform (FFT).

The ACF reaches its maximum value at zero lag. This value is normalized to unity. For a periodic signal, the ACF displays peaks at lags equal to the integer multiples of the period. Therefore, the common periodicity across the frequency bands is represented as a vertical structure (common peaks across the frequency channels) in the autocorrelogram. Since a given fundamental period of $T_0$ will result in peaks at lags of $2T_0$, $3T_0$, etc., this vertical structure is repeated at lags of multiple periods with comparatively lower intensity.

Due to the low-pass filtering action in the inner hair cell model unit 204, the fine structure is removed for time-frequency elements in high-frequency bands. As a result, only the temporal envelopes are retained. Therefore, the peaks in the ACF for the high-frequency channels mainly reflect the periodicities in the temporal modulation, not the periodicities of the subharmonics. This modulation rate is associated to the pitch period, which is represented as a vertical structure at pitch lag across high-frequency channels in the autocorrelogram.

Alternatively, for some implementations, to estimate pitch, a pattern matching process can be used, where the frequencies of harmonics are compared to spectral templates. These templates consist of the harmonic series of all possible pitches. The model then searches for the template whose harmonics give the closest match to the magnitude spectrum.

Onset refers to the beginning of a discrete event in an acoustic signal, caused by a sudden increase in energy. The rationale behind onset grouping is the fact that the energy in different frequency components excited by the same source usually starts at the same time. Hence common onsets across frequencies are interpreted as an indication that these frequency components arise from the same sound source. On the other hand, asynchronous onsets enhance the separation of acoustic events.

Since every sound source has an attack time, the onset cue does not require any particular kind of structured sound source. In contrast to the periodicity cue, the onset cue will work equally well with periodic and aperiodic sounds. However, when concurrent sounds are present, it is hard to know how to assign an onset to a particular sound source. Therefore, some implementations of the onset segregation module 224 may be prone to switching between emphasizing foreground and background objects. Even for a clean sound stream, it is difficult to distinguish genuine onsets from the gradual changes and amplitude modulations during sound production. Therefore, a reliable detection of sound onsets is a very challenging task.

Most onset detectors are based on the first-order time difference of the amplitude envelopes, whereby the maximum of the rising slope of the amplitude envelopes is taken as a measure of onset (see e.g. Bilmes, "*Timing is of the Essence: Perceptual and Computational Techniques for Representing, Learning, and Reproducing Expressive Timing in Percussive Rhythm", Master Thesis, MIT, USA,* 1993; Goto & Muraoka, "*Beat Tracking based on Multiple-agent Architecture—A Real-time Beat Tracking System for Audio Signals", in Proc. Int. Conf on Multiagent Systems,* 1996, pp. 103-110; Scheirer, "*Tempo and Beat Analysis of Acoustic Musical Signals", J. Acoust. Soc. Amer*., vol. 103, no. 1, pp. 588-601, January 1998; Fishbach, Nelken & Y. Yeshurun, "*Auditory Edge Detection: A Neural Model for Physiological and Psychoacoustical Responses to Amplitude Transients", Journal of Neurophysiology*, vol. 85, pp. 2303-2323, 2001).

In the present invention, the onset estimation model 230 may be implemented by a neural model adapted from Fishbach, Nelken & Y. Yeshurun, "Auditory Edge Detection: A Neural Model for Physiological and Psychoacoustical Responses to Amplitude Transients", Journal of Neurophysiology, vol. 85, pp. 2303-2323, 2001. The model simulates the computation of the first-order time derivative of the amplitude envelope. It consists of two neurons with excitatory and inhibitory connections. Each neuron is characterized by an α-filter. The overall impulse response of the onset estimation model can be given by:

$$h_{OT}(n) = \frac{1}{\tau_1^2} n e^{-n/\tau_1} - \frac{1}{\tau_2^2} n e^{-n/\tau_2} (\tau_1 < \tau_2). \quad (104)$$

The time constants $\tau_1$ and $\tau_2$ can be selected to be 6 ms and 15 ms respectively in order to obtain a bandpass filter. The passband of this bandpass filter covers frequencies from 4 to 32 Hz. These frequencies are within the most important range for speech perception of the human auditory system (see e.g. Drullman, Festen & Plomp, "*Effect of temporal envelope*

*smearing on speech reception", J. Acoust. Soc. Amer.*, vol. 95, no. 2, pp. 1053-1064, February 1994; Drullman, Festen & Plomp, "*Effect of reducing slow temporal modulations on speech reception", J. Acoust. Soc. Amer.*, vol. 95, no. 5, pp. 2670-2680, May 1994).

Although the onset estimation model characterized in equation (104) does not perform a frame-by-frame processing, it is preferable to generate a consistent data structure with the other cue extraction mechanisms. Therefore, the result of the onset estimation module 230 can be artificially segmented into subsequent frames or time-frequency elements. The definition of frame segment is exactly the same as its definition in pitch analysis. For the $i^{th}$ frequency band and the $j^{th}$ frame, the output onset map is denoted as OT(i,j,τ). Here the variable r is a local time index within the $j^{th}$ time frame.

Sounds reaching the farther ear are delayed in time and are less intense than those reaching the nearer ear. Hence, several possible spatial cues exist, such as interaural time difference (ITD), interaural intensity difference (IID), and interaural envelope difference (IED).

In the exemplary embodiments of the cue processing unit 208 shown herein, the ITD may be determined using the ITD estimation module 236 by using the cross-correlation between the outputs of the inner hair cell model units 204 for both channels (i.e. at the opposite ears) after phase alignment. The interaural crosscorrelation function (CCF) may be defined by:

$$CCF(i,j,\tau) = \frac{\sum_{k=0}^{K-1} l_i(j-k) r_i(j-k-\tau)}{\sqrt{\sum_{k=0}^{K-1} l_i^2(j-k) \sum_{k=0}^{K-1} r_i^2(j-k-\tau)}}, \quad (105)$$

where CCF (i,j,τ) is the short-time crosscorrelation at lag τ for the $i^{th}$ frequency band at the $j^{th}$ time instance; l and r are the auditory periphery outputs at the left and right phase alignment units; K is the integration window length and k is the index inside the window. As in the definition of the ACF, the CCF is also normalized by the short-time energy estimated over the integration window. This normalization can equalize the contribution from different channels. Again, all of the minus signs in equation (105) ensure that this implementation is causal. The short-time CCF can be efficiently computed using the FFT.

Similar to the autocorrelogram in pitch analysis, the CCFs can be visually displayed in a two-dimensional (centre frequency×crosscorrelation lag) representation, called the crosscorrelogram. The crosscorrelogram and the autocorrelogram are updated synchronously. For the sake of simplicity, the frame rate and window size may be selected as is done for the autocorrelogram computation in pitch analysis. As a result, the same FFT values can be used by both the pitch estimation and ITD estimation modules 232 and 236.

For a signal without any interaural time disparity, the CCF reaches its maximum value at zero lag. In this case, the crosscorrelogram is a symmetrical pattern with a vertical stripe in the centre. As the sound moves laterally, the interaural time difference results in a shift of the CCF along the lag axis. Hence, for each frequency band, the ITD can be computed as the lag corresponding to the position of the maximum value in the CCF.

For low-frequency narrow-band channels, the CCF is nearly periodic with respect to the lag, with a period equal to the reciprocal of the centre frequency. By limiting the ITD to the range −1<τ<1 ms, the repeated peaks at lags outside this range can be largely eliminated. It is however still probable that channels with a centre frequency within approximately 500 to 3000 Hz have multiple peaks falling inside this range. This quasi-periodicity of crosscorrelation, also known as spatial aliasing, makes an accurate estimation of ITD a difficult task. However, the inner hair cell model that is used removes the fine structure of the signals and retains the envelope information which addresses the spatial aliasing problem in the high-frequency bands. The crosscorrelation analysis in the high frequency bands essentially gives an estimate of the interaural envelope difference (IED) instead of the interaural time difference (ITD). However, the estimate of the IED in these bands is similar to the computation of the ITD in the low-frequency bands in terms of the information that is obtained.

Interaural intensity difference (IID) is defined as the log ratio of the local short-time energy at the output of the auditory periphery. For the $i^{th}$ frequency channel and the $j^{th}$ time instance, the IID can be estimated by the IID estimation module 234 as:

$$IID(i,j) = 10\log_{10}\left(\frac{\sum_{k=0}^{K-1} r_i^2(j-k)}{\sum_{k=0}^{K-1} l_i^2(j-k)}\right), \quad (106)$$

where l and r are the auditory periphery outputs at the left and right ear phase alignment units; K is the integration window size, and k is the index inside the window. Again, the frame rate and window size used in the IID estimation performed by the IID estimation module 234 can be selected to be similar as those used in the autocorrelogram computation for pitch analysis and the crosscorrelogram computation for ITD estimation.

Figure 12:
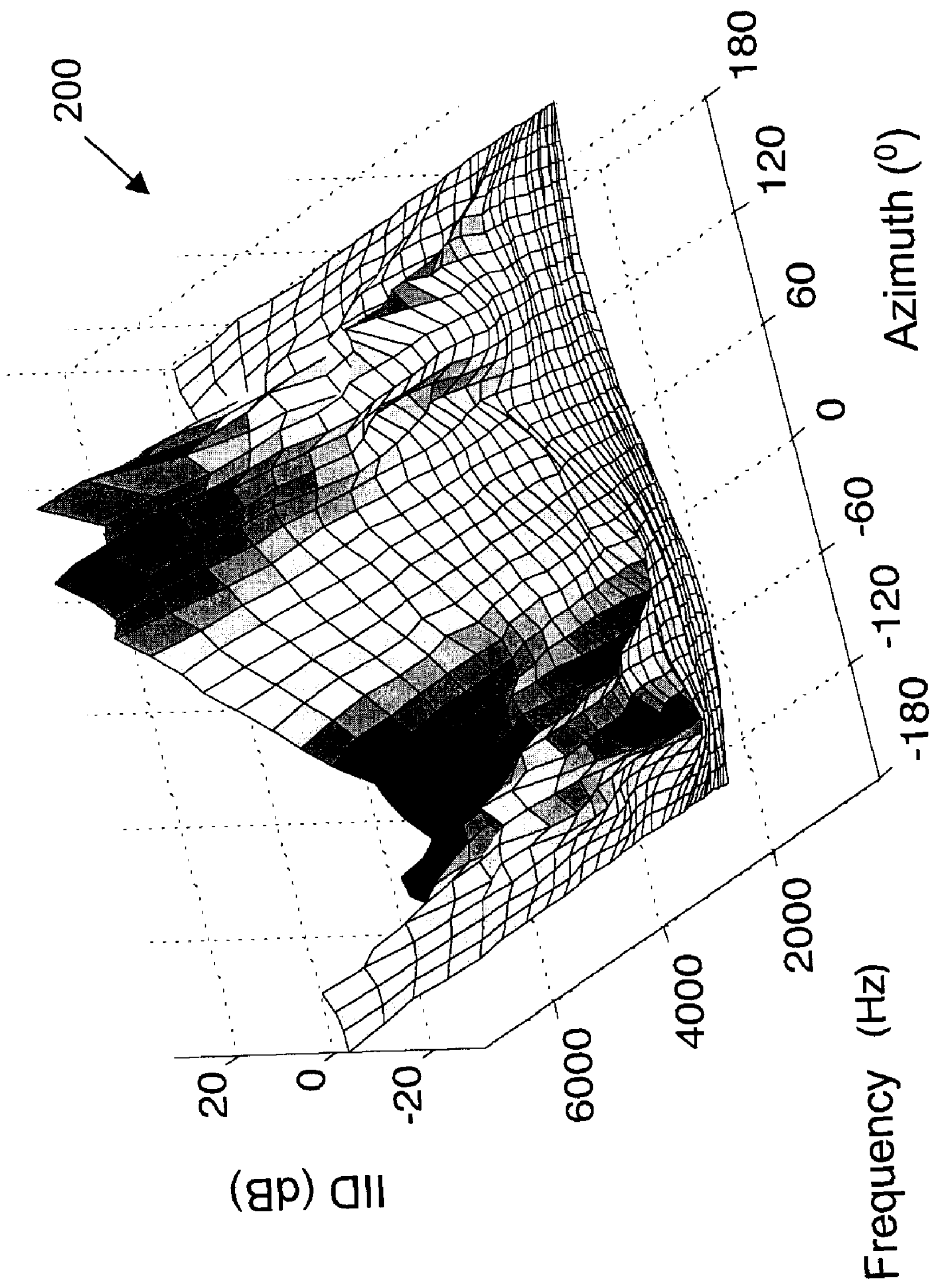
FIG. 12 is a graph showing an example of Interaural Intensity Difference (IID) as a function of azimuth and frequency.

Referring now to FIG. 12, shown therein is a graphical representation of an IID-frequency-azimuth mapping measured from experimental data. The IID is a frequency-dependent value. There is no simple mathematical formula that can describe the relationship between IID, frequency and azimuth. However, given a complete binaural sound database, IID-frequency-azimuth mapping can be empirically evaluated by the IID estimation module 234 in conjunction with a lookup table 218. Zero degrees points to the front centre direction. Positive azimuth refers to the right and negative azimuth refers to the left. During the processing, the IIDs for each frame (i.e. time-frequency element) can be calculated and then converted to an azimuth value based on the look-up table 218.

There may be scenarios in which one or more of the cues that are used for auditory scene analysis may become unavailable or unreliable. Further, in some circumstances, different cues may lead to conflicting decisions. Accordingly, the cues can be used in a competitive way in order to achieve the correct interpretation of a complex input. For a computational system aiming to account for various cues as is done in the human auditory system, a strategy for cue-fusion can be incorporated to dynamically resolve the ambiguities of segregation based on multiple cues.

The design of a specific cue-fusion scheme is based on prior knowledge about the physical nature of speech. The multiple cue-extractions are not completely independent. For example, it is more meaningful to estimate the pitch and onset of the speech components which are likely to have arisen from the same spatial direction.

Referring once more to FIGS. 10 to 11, an exemplary hierarchical manner in which cue-fusion and weight-estimation can be performed is illustrated. The processing methodology is based on using a weight to rescale each time-frequency element to enhance the time-frequency elements corresponding to target auditory objects (i.e. desired speech components) and to suppress the time-frequency elements corresponding to interference (i.e. undesired noise components). First, a preliminary weight vector $g_1(j)$ is calculated from the azimuth information estimated by the IID estimation module 234 and the lookup table 218. The preliminary IID weight vector contains the weight for each frequency component in the $j^{th}$ time frame, i.e.

$$g_1(j)=[g_{11}(j) \ldots g_{1i}(j) \ldots g_{1I}(J)]^T, \quad (107)$$

where i is the frequency band index and I is the total number of frequency bands.

In some embodiments, in addition to the weight vector $g_1(j)$, additionally, a likelihood IID weighting vector $\alpha_i(j)$ can be associated with the IID cue, i.e.

$$\alpha_1(j)=[\alpha_{11}(j) \ldots \alpha_{1i}(j) \ldots \alpha_{1I}(j)]^T. \quad (108)$$

The likelihood IID weighting vector $\alpha_1(j)$ represents the confidence or likelihood that for IID cue segregation on a frequency basis for the current time index or time frame, a given frequency component is likely to represent a speech component rather than an interference component. Since the IID cue is more reliable at high frequencies than at low frequencies, the likelihood weights $\alpha_1(j)$ for the IID cue can be chosen to provide higher likelihood values for frequency components at higher frequencies. In contrast, more weight can be placed on the ITD cues at low frequencies than at high frequencies. The initial value for these weights can be predefined.

The two weight vectors $g_1(j)$ and $\alpha_1(j)$ are then combined to provide an overall ITD weight vector $g^*_1(j)$. Likewise, the ITD estimation module 236 and ITD segregation module 222 produce a preliminary ITD weight vector $g_2$ (j), an associated likelihood weighting vector $\alpha_2(j)$, and an overall weight vector $g^*_2(j)$. The two weight vectors $g_1^*(j)$ and $g_2^*(j)$ can then be combined by a weighted average, for example, to generate an intermediate spatial segregation weight vector $g_s^*(j)$. In this example, the intermediate spatial segregation weight vector $g_s^*(j)$ can be used in the pitch segregation module 226 to estimate the weight vectors associated with the pitch cue and in the onset segregation module 224 to estimate the weight vectors associated with the onset cue. Accordingly, two preliminary pitch and onset weight vectors $g_3(j)$ and $g_4(j)$, two associated likelihood pitch and onset weighting vectors $\alpha_3(j)$ and $\alpha_4(j)$, and two overall pitch and onset weight vectors $g^*_3(j)$ and $g^*_4(j)$ are produced.

All weight vectors are preferably composed of real values, restricted to the range [0, 1]. For a time-frequency element dominated by a target sound stream, a larger weight is assigned to preserve the target sound components. Otherwise, the value for the weight is selected closer to zero to suppress the components distorted by the interference. In some implementations, the estimated weight can be rounded to binary values, where a value of one is used for a time-frequency element where the target energy is greater than the interference energy and a value of zero is used otherwise. The resulting binary mask values (i.e. 0 and 1) are able to produce a high SNR improvement, but will also produce noticeable sound artifacts, known as musical noise. In some implementations, non-binary weight values can be used so that the musical noise can be largely reduced.

After the preliminary segregation is performed, all weight vectors generated by the individual cues are pooled together by the weighted-sum operation 228 for embodiment 208" and weighed-sum operations 228 and 230 for embodiment 208''' to arrive at the final decision, which is used to control the selective enhancement of certain time-frequency elements in the enhancement unit 210. In another embodiment, at the same time, the likelihood weighting vectors for the cues can be adapted to the constantly changing listening conditions due to the processing performed by the onset estimation module 230, the pitch estimation module 232, the IID estimation module 234 and the ITD estimation module 236. If the preliminary weight estimated for a specific cue for a set of time-frequency elements for a given frame agrees to the overall estimate, the likelihood weight on this cue for this particular time-frequency element can be increased to put more emphasis on this cue. On the other hand, if the preliminary weight estimated for a specific cue for a set of time-frequency elements for a given frame conflicts with the overall estimate, it means that this particular cue is unreliable for the situation at that moment. Hence, the likelihood weight associated with this cue for this particular time-frequency element can be reduced.

In the IID segregation module 220, the interaural intensity difference IID(i,j) in the $i^{th}$ frequency band and the $j^{th}$ time frame is calculated according to equation (106). Next, IID(i,j) is converted to azimuth Azi(i,j) using the two-dimensional lookup table 218 plotted in FIG. 12. Since the potential hearing instrument user can flexibly steer his/her head to the desired source direction (actually, even normal hearing people need to take advantage of directional hearing in a noisy listening environment), it is reasonable to assume that the desired signal arises around the frontal centre direction, while the interference comes from off-centre. According to this assumption, a higher weight can be assigned to those time-frequency elements, whose estimated azimuths are closer to the centre direction. On the other hand, time-frequency elements with large absolute azimuths, are more likely to be distorted by the interference. Hence, these elements can be partially suppressed by resealing with a lower weight. Based on these assumptions, in some implementations, the IID weight vector can be determined by a sigmoid function of the absolute azimuths, which is another way of saying that soft-decision processing is performed. Specifically, the subband IID weight coefficient can be defined as:

$$g_{1i}(j) = F_1(|Azi(i,j)|) = 1 - \frac{1}{1 + e^{-a_1|Azi(i,j) - m_1|}}. \quad (109)$$

The ITD segregation can be performed in parallel with the IID segregation. Assuming that the target originates from the centre, the preliminary weight vector $g_2(j)$ can be determined by the cross-correlation function at zero lag. Specifically, the subband ITD weight coefficient can be defined as:

$$g_{2i}(j) = \begin{cases} CCF(i,j,0) & CCF(i,j,0) > 0, \\ 0 & CCF(i,j,0) \leq 0. \end{cases} \quad (110)$$

The two weight vectors $g_1(j)$ and $g_2(j)$ can then be combined to generate the intermediate spatial segregation weight vector $g_s(j)$ by calculating the weighted average:

$$g_{si}(j) = \frac{\alpha_{1i}(j)}{\alpha_{1i}(j)+\alpha_{2i}(j)} g_{1i}(j) + \frac{\alpha_{2i}(j)}{\alpha_{1i}(j)+\alpha_{2i}(j)} g_{2i}(j). \quad (111)$$

Pitch segregation is more complicated than IID and ITD segregation. In the autocorrelogram, a common fundamental period across frequencies is represented as common peaks at the same lag. In order to emphasize the harmonic structure in the autocorrelogram, the conventional approach is to sum up all ACFs across the different frequency bands. In the resulting summary ACF (SACF), a large peak should occur at the period of the fundamental. However, when multiple competing acoustic sources are present, the SACF may fail to capture the pitch lag of each individual stream. In order to enhance the harmonic structure induced by the target sound stream, the subband ACFs can be rescaled by the intermediate spatial segregation weight vector $g_s(j)$ and then summed across all frequency bands to generate the enhanced SACF, i.e.:

$$SACF(j,\tau) = \sum_{i=1}^{I} g_{si}(j) ACF(i,j,\tau). \quad (112)$$

By searching for the maximum of the SACF within a possible pitch lag interval [MinPL,MaxPL], the common period of the target sound components can be estimated, i.e.:

$$\tau_a^*(j) = \underset{\tau\in[MinPL,MaxPL]}{\text{argmax}}\ SACF(j,\tau). \quad (113)$$

The search range [MinPL,MaxPL] can be determined based on the possible pitch range of human adults, i.e. 80~320 Hz. Hence, MinPL=1/320≈3.1 ms and MaxPL=1/80≈12.5 ms. The subband pitch weight coefficient can then be determined by the subband ACF at the common period lag, i.e.:

$$g_{3i}(j)=ACF(i,j,\tau_a^*(j)). \quad (114)$$

Similarly to pitch detection, the consistent onsets across the frequency components are demonstrated as a prominent peak in the summary onset map. As a monaural cue, the onset cue itself is unable to distinguish the target sound components from the interference sound components in a complex cocktail party environment. Therefore, onset segregation preferably follows the initial spatial segregation. By resealing the onset map with the intermediate spatial segregation weight vector $g^*_s$, the onsets of the target signal are enhanced while the onsets of the interference are suppressed. The resealed onset map can then be summed across the frequencies to generate the summary onset function, i.e.:

$$SOT(j,\tau) = \sum_{i=1}^{I} g_{si}(j) OT(i,j,\tau). \quad (115)$$

By searching for the maximum of the summary onset function over the local time frame, the most prominent local onset time can be determined, i.e.:

$$\tau_o^*(j) = \underset{\tau}{\text{argmax}}\ SOT(j,\tau). \quad (116)$$

The frequency components exhibiting prominent onsets at the local time $\tau_0^*(j)$ are grouped into the target stream. Hence, a large onset weight is given to these components as shown in equation 117.

$$g_4(j) = \begin{cases} \dfrac{OT(i,j,\tau_o^*(j))}{\max_i OT(i,j,\tau_o^*(j))} & OT(i,j,\tau_o^*(j)) > 0 \\ 0 & OT(i,j,\tau_o^*(j)) \le 0 \end{cases} \quad (117)$$

Note that the onset weight has been normalized to the range [0, 1].

As a result of the preliminary segregation, each cue (indexed by n=1, 2, . . . , N) generates the preliminary weight vector $g_n(j)$, which contains the weight computed for each frequency component in the $j^{th}$ time frame. For combining the different cues, in some embodiments, the associated likelihood weighting vectors $\alpha_n(j)$, representing the confidence of the cue extraction in each subband (i.e. for a given frequency), can also be used. The initial values for the likelihood weighting vectors are known a priori based on the frequency behaviour of the corresponding cue. The weights for a given likelihood weighting vector are also selected such that the sum of the initial value of the weights is equal to 1, i.e.:

$$\sum_n \alpha_n(1) = 1. \quad (118)$$

The preliminary weight vector $g_n(j)$ and associated likelihood weight vector $\alpha_n(j)$ for a given cue are then combined to produce the overall weight $g^*(j)$ for the given cue by computing the overall weight, i.e.:

$$g^*(j) = \sum_n \alpha_n(j) g_n(j). \quad (119)$$

The overall weight vectors are then combined on a frequency basis for the current time frame. For instance, for cue estimation unit 208", the intermediate spatial segregation weight vector $g^*_s(n)$ is added to the overall pitch and onset weight vectors $g^*_3(n)$ and $g^*_4(n)$ by the combination unit 228 for the current time frame. For cue estimation unit 208'", a similar procedure is followed except that there are two combination units 228 and 229. Combination unit 228 adds the intermediate spatial segregation weight vector $g^*_s(n)$ to the overall pitch and onset weight vectors $g^*_3(n)$ and $g^*_4(n)$ derived from the first frequency domain signal 213 (i.e. left channel). Combination unit 229 adds the intermediate spatial segregation weight vector $g^*_s(n)$ to the overall pitch and onset weight vectors $g^{*\prime}_3(n)$ and $g^{*\prime}_4(n)$ derived from the second frequency domain signal 213 (i.e. left channel).

In some embodiments, adaptation can be additionally performed on the likelihood weight vectors. In this case, an estimation error vector $e_n(j)$ can be defined for each cue, measuring how much its individual decision agrees with the corresponding final weight vector $g^*(j)$ by comparing the preliminary weight vector $g_n(j)$ and the corresponding final weight vector $g^*(j)$ where $g^*(j)$ is either g1* or g2* as shown in FIGS. 10 and 11, i.e.:

$$e_n(j)=|g^*(j)-g_n(j)|. \quad (120)$$

The likelihood weighting vectors are now adapted as follows: the likelihood weights $\alpha_n(j)$ for a given cue that gives rise to a small estimation error $e_n(j)$ are increased, otherwise they are reduced. In some implementations, the adaptation can be described by:

$$\nabla\alpha_n(j) = \lambda\left(\alpha_n(j) - \frac{e_n(j)}{\sum_m e_m(j)}\right) \quad (121)$$

$$\alpha_n(j+1) = \alpha_n(j) + \nabla\alpha_n(j) \quad (122)$$

where $\nabla\alpha_n(j)$ represents the adjustment to the likelihood weighting vectors, $\lambda$ is a parameter to control the step size, and $\alpha_n(j+1)$ is the updated value for the likelihood weighting vector. Since the normalized estimation error vector is used in equation (121), this results in $$\sum_n \nabla\alpha_n(j) = 0,$$

such that the sum of the updated weighting vector is equal to unity for all time frames, i.e.

$$\sum_n \alpha_n(j+1) = 1, \forall j. \quad (123)$$

As previously described, for the cue processing unit 208" shown in FIG. 10, the monaural cues, i.e. pitch and onset, are extracted from the signal received at a single channel (i.e. either the left or right ear) and the same weight vector is applied to the left and right frequency band signals provided by the frequency decomposition units 202 via the first and second final weight vectors 214' and 216'.

Further, for the cue processing unit 208'" shown in FIG. 11, the cue extraction and the weight estimation are symmetrically performed on the binaural signals provided by the frequency decomposition units 202. The binaural spatial segregation modules 220 and 222 are shared between the two channels or two signal paths of the cue processing unit 208'", but separate pitch segregation modules 226 and onset segregation modules 224 can be provided for both channels or signal paths. Accordingly, the cue-fusion in the two channels is independent. As a result, the final weight vectors estimated for the two channels may be different. In addition, two sets of weighting vectors, $g_n(j)$, $g'_n(j)$, $\alpha_n(j)$, $\alpha_n'(j)$, $g^*_n(j)$ and $g^{*\prime}_n(j)$ are used. They are updated independently in the two channels, resulting in different first and second final weight vectors 214" and 216".

The final weight vectors 214 and 216 are applied to the corresponding time-frequency components for a current time frame. As a result, the sound elements dominated by the target stream are preserved, while the undesired sound elements are suppressed by the enhancement unit 210. The enhancement unit 210 can be a multiplication unit that multiplies the frequency band output signals for the current time frame by the corresponding weight in the final weight vectors 214 and 216.

In a hearing-aid application, once the binaural speech enhancement processing has been completed, the desired sound waveform needs to be reconstructed to be provided to the ears of the hearing aid user. Although the perceptual cues are estimated from the output of the (non-invertible) nonlinear inner hair cell model unit 204, once this output has been phase aligned, the actual segregation is performed on the frequency band output signals provided by both frequency decomposition units 202. Since the cochlear-based filterbank used to implement the frequency decomposition unit 202 is completely invertible, the enhanced waveform can be faithfully recovered by the reconstruction unit 212.

Figure 13:
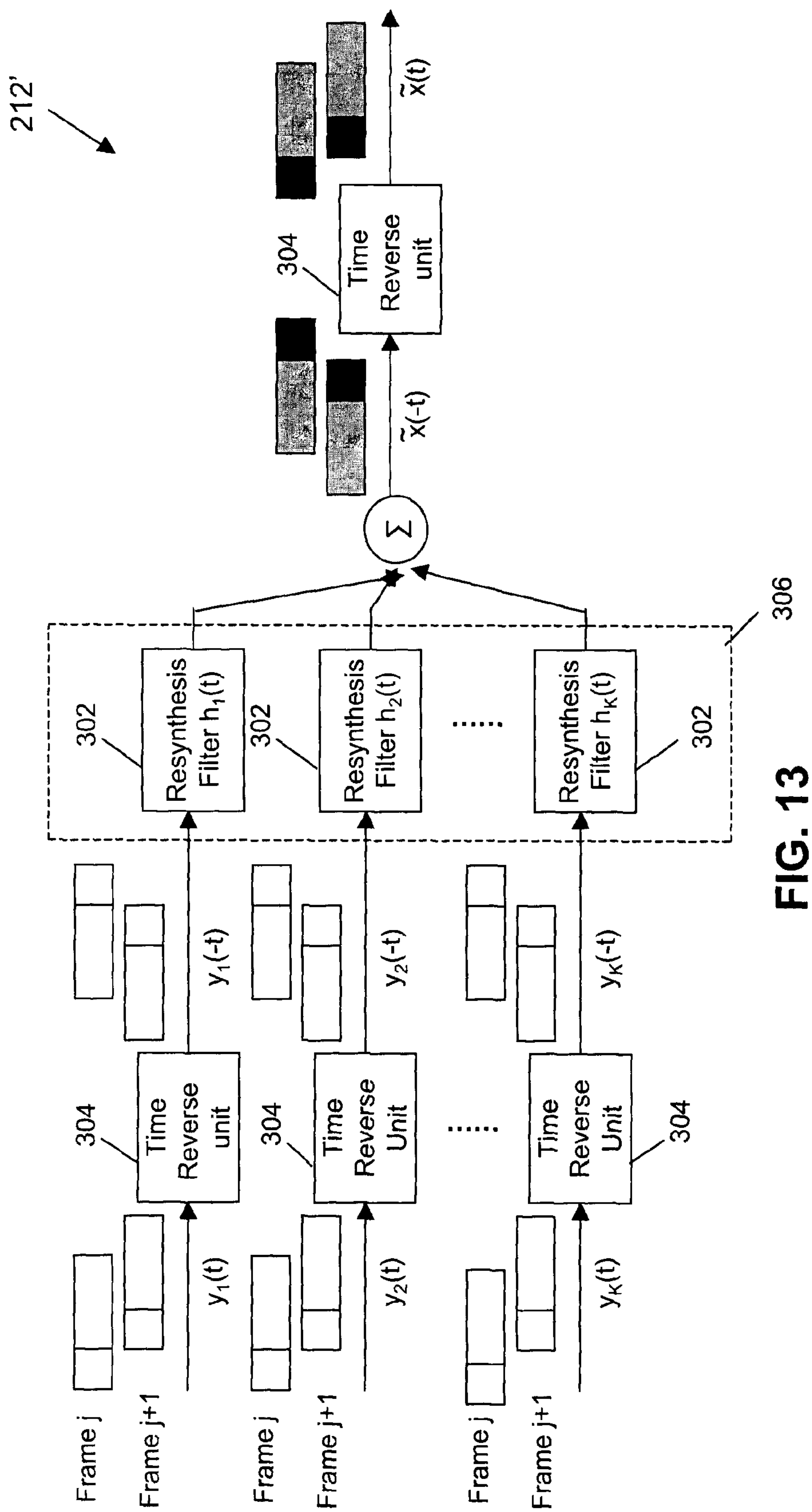
FIG. 13 is a block diagram of a reconstruction unit used in the perceptual binaural speech enhancement unit.

Referring now to FIG. 13, an exemplary embodiment of the reconstruction unit 212' is shown that performs the reconstruction process. The reconstruction process is shown as the inverse of the frequency decomposition process. As long as the impulse responses of the IIR filters used in the frequency decomposition units 202 have a limited effective duration, this time reversal process can be approximated in block-wise processing. However, the IIR-type filterbank used in the frequency decomposition unit 202 cannot be directly inverted. An alternative approach is to make resynthesis filters 302 exactly the same as the IIR analysis filters used in the filterbank 202, while time-reversing 304 both the input and the output of the resynthesis filterbank 306 to achieve a linear phase response (see Lin, Holmes & Ambikairajah, "*Auditory filter bank inversion", in Proc. IEEE Int. Symp. on Circuits and Systems*, Sydney, Australia, May 2001, pp. 537-540).

There are various combinations of the components of the binaural speech enhancement system 10 that hearing impaired individuals will find useful. For instance, the binaural spatial noise reduction unit 16 can be used (without the perceptual binaural speech enhancement unit 22) as a pre-processing unit for a hearing instrument to provide spatial noise reduction for binaural acoustic input signals. In another instance, the perceptual binaural speech enhancement unit 22 can be used (without the binaural spatial noise reduction unit 16) as a pre-processor for a hearing instrument to provide segregation of signal components from noise components for binaural acoustic input signals. In another instance, both the binaural spatial noise reduction unit 16 and the perceptual binaural speech enhancement unit 22 can be used in combination as a pre-processor for a hearing instrument. In each of these instances, the binaural spatial noise reduction unit 16, the perceptual binaural speech enhancement unit 22 or a combination thereof can be applied to other hearing applications other than hearing aids such as headphones and the like.

It should be understood by those skilled in the art that the components of the hearing aid system may be implemented using at least one digital signal processor as well as dedicated hardware such as application specific integrated circuits or field programmable arrays. Most operations can be done digitally. Accordingly, some of the units and modules referred to in the embodiments described herein may be implemented by software modules or dedicated circuits.

It should also be understood that various modifications can be made to the preferred embodiments described and illustrated herein, without departing from the present invention.

The invention claimed is:

1. A binaural speech enhancement system for processing first and second sets of input signals to provide a first and second output signal with enhanced speech, the first and second sets of input signals being spatially distinct from one another and each having at least one input signal with speech and noise components, wherein the binaural speech enhancement system comprises:

a binaural spatial noise reduction unit for receiving and processing the first and second sets of input signals to provide first and second noise-reduced signals, the binaural spatial noise reduction unit being configured to generate one or more binaural cues based on at least the noise component of the first and second sets of input signals and perform noise reduction while attempting to preserve the binaural cues for the speech and noise components between the first and second sets of input signals and the first and second noise-reduced signals; and a perceptual binaural speech enhancement unit coupled to the binaural spatial noise reduction unit, the perceptual binaural speech enhancement unit being configured to receive and process the first and second noise-reduced signals by generating and applying weights to time-frequency elements of the first and second noise-reduced signals, the weights being based on estimated cues generated from the at least one of the first and second noise-reduced signals.

2. The system of claim 1, wherein the estimated cues comprise a combination of spatial and temporal cues.

3. The system of claim 2, wherein the binaural spatial noise reduction unit comprises:

a binaural cue generator that is configured to receive the first and second sets of input signals and generate the one or more binaural cues for the noise component in the sets of input signals; and a beamformer unit coupled to the binaural cue generator for receiving the one or more generated binaural cues and processing the first and second sets of input signals to produce the first and second noise-reduced signals by minimizing the energy of the first and second noise-reduced signals under the constraints that the speech component of the first noise-reduced signal is similar to the speech component of one of the input signals in the first set of input signals, the speech component of the second noise-reduced signal is similar to the speech component of one of the input signals in the second set of input signals and that the one or more binaural cues for the noise component in the first and second sets of input signals is preserved in the first and second noise-reduced signals.

4. The system of claim 3, wherein the beamformer unit performs the TF-LCMV method extended with a cost function based on one of the one or more binaural cues or a combination thereof.

5. The system of claim 3, wherein the beamformer unit comprises:

first and second filters for processing at least one of the first and second set of input signals to respectively produce first and second speech reference signals, wherein the speech component in the first speech reference signal is similar to the speech component in one of the input signals of the first set of input signals and the speech component in the second speech reference signal is similar to the speech component in one of the input signals of the second set of input signals;

at least one blocking matrix for processing at least one of the first and second sets of input signals to respectively produce at least one noise reference signal, where the at least one noise reference signal has minimized speech components;

first and second adaptive filters coupled to the at least one blocking matrix for processing the at least one noise reference signal with adaptive weights;

an error signal generator coupled to the binaural cue generator and the first and second adaptive filters, the error signal generator being configured to receive the one or more generated binaural cues and the first and second noise-reduced signals and modify the adaptive weights used in the first and second adaptive filters for reducing noise and attempting to preserve the one or more binaural cues for the noise component in the first and second noise-reduced signals, wherein, the first and second noise-reduced signals are produced by subtracting the output of the first and second adaptive filters from the first and second speech reference signals respectively.

6. The system of claim 3, wherein the generated one or more binaural cues comprise at least one of interaural time difference (ITD), interaural intensity difference (IID), and interaural transfer function (ITF).

7. The system of claim 3, wherein the one or more binaural cues are additionally determined for the speech component of the first and second set of input signals.

8. The system of claim 3, wherein the binaural cue generator is configured to determine the one or more binaural cues using one of the input signals in the first set of input signals and one of the input signals in the second set of input signals.

9. The system of claim 3, wherein the one or more desired binaural cues are determined by specifying the desired angles from which sound sources for the sounds in the first and second sets of input signals should be perceived with respect to a user of the system and by using head related transfer functions.

10. The system of claim 5, wherein the beamformer unit comprises first and second blocking matrices for processing at least one of the first and second sets of input signals respectively to produce first and second noise reference signals each having minimized speech components and the first and second adaptive filters are configured to process the first and second noise reference signals respectively.

11. The system of claim 5, wherein the beamformer unit further comprises first and second delay blocks connected to the first and second filters respectively for delaying the first and second speech reference signals respectively, and wherein the first and second noise-reduced signals are produced by subtracting the output of the first and second delay blocks from the first and second speech reference signals respectively.

12. The system of claim 5, wherein the first and second filters are matched filters.

13. The system of claim 3, wherein the beamformer unit is configured to employ the binaural linearly constrained minimum variance methodology with a cost function based on one of an Interaural Time Difference (ITD) cost function, an Interaural Intensity Difference (IID) cost function and an Interaural Transfer function cost (ITF) function for selecting values for weights.

14. The system of claim 2, wherein the perceptual binaural speech enhancement unit comprises first and second processing branches and a cue processing unit, wherein a given processing branch comprises:

a frequency decomposition unit for processing one of the first and second noise-reduced signals to produce a plurality of time-frequency elements for a given frame;

an inner hair cell model unit coupled to the frequency decomposition unit for applying nonlinear processing to the plurality of time-frequency elements; and a phase alignment unit coupled to the inner hair cell model unit for compensating for any phase lag amongst the plurality of time-frequency elements at the output of the inner hair cell model unit;

wherein, the cue processing unit is coupled to the phase alignment unit of both processing branches and is configured to receive and process first and second frequency domain signals produced by the phase alignment unit of both processing branches, the cue processing unit further being configured to calculate weight vectors for several cues according to a cue processing hierarchy and combine the weight vectors to produce first and second final weight vectors.

15. The system of claim 14, wherein the given processing branch further comprises:

an enhancement unit coupled to the frequency decomposition unit and the cue processing unit for applying one of the final weight vectors to the plurality of time-frequency elements produced by the frequency decomposition unit; and a reconstruction unit coupled to the enhancement unit for reconstructing a time-domain waveform based on the output of the enhancement unit.

16. The system of claim 14, wherein the cue processing unit comprises:

estimation modules for estimating values for perceptual cues based on at least one of the first and second frequency domain signals, the first and second frequency domain signals having a plurality of time-frequency elements and the perceptual cues being estimated for each time-frequency element;

segregation modules for generating the weight vectors for the perceptual cues, each segregation module being coupled to a corresponding estimation module, the weight vectors being computed based on the estimated values for the perceptual cues; and combination units for combining the weight vectors to produce the first and second final weight vectors.

17. The system of claim 16, wherein according to the cue processing hierarchy, weight vectors for spatial cues are first generated including an intermediate spatial segregation weight vector, weight vectors for temporal cues are then generated based on the intermediate spatial segregation weight vector, and weight vectors for temporal cues are then combined with the intermediate spatial segregation weight vector to produce the first and second final weight vectors.

18. The system of claim 17, wherein the temporal cues comprise pitch and onset, and the spatial cues comprise interaural intensity difference and interaural time difference.

19. The system of claim 17, wherein the weight vectors include real numbers selected in the range of 0 to 1 inclusive for implementing a soft-decision process wherein for a given time-frequency element, a higher weight is assigned when the given time-frequency element has more speech than noise and a lower weight is assigned when the given time-frequency element has more noise than speech.

20. The system of claim 17, wherein estimation modules which estimate values for temporal cues are configured to process one of the first and second frequency domain signals, estimation modules which estimate values for spatial cues are configured to process both the first and second frequency domain signals, and the first and second final weight vectors are the same.

21. The system of claim 17, wherein one set of estimation modules which estimate values for temporal cues are configured to process the first frequency domain signal, another set of estimation modules which estimate values for temporal cues are configured to process the second frequency domain signal, estimation modules which estimate values for spatial cues are configured to process both the first and second frequency domain signals, and the first and second final weight vectors are different.

22. The system of claim 17, wherein for a given cue, the corresponding segregation module is configured to generate a preliminary weight vector based on the values estimated for the given cue by the corresponding estimation unit, and to multiply the preliminary weight vector with a corresponding likelihood weight vector based on a priori knowledge with respect to the frequency behaviour of the given cue.

23. The system of claim 22, wherein the likelihood weight vector is adaptively updated based on an acoustic environment associated with the first and second sets of input signals by increasing weight values in the likelihood weight vector for components of a given weight vector that correspond more closely to the final weight vector.

24. The system of claim 14, wherein the frequency decomposition unit comprises a filterbank that approximates the frequency selectivity of the human cochlea.

25. The system of claim 14, wherein for each frequency band output from the frequency decomposition unit, the inner hair cell model unit comprises a half-wave rectifier followed by a low-pass filter to perform a portion of nonlinear inner hair cell processing that corresponds to the frequency band.

26. The system of claim 16, wherein the perceptual cues comprise at least one of pitch, onset, interaural time difference, interaural intensity difference, interaural envelope difference, intensity, loudness, periodicity, rhythm, offset, timbre, amplitude modulation, frequency modulation, tone harmonicity, formant and temporal continuity.

27. The system of claim 16, wherein the estimation modules comprise an onset estimation module and the segregation modules comprise an onset segregation module.

28. The system of claim 27, wherein the onset estimation module is configured to employ an onset map scaled with an intermediate spatial segregation weight vector.

29. The system of claim 16, wherein the estimation modules comprise a pitch estimation module and the segregation modules comprise a pitch segregation module.

30. The system of claim 29, wherein the pitch estimation module is configured to estimate values for pitch by employing one of:

an autocorrelation function rescaled by an intermediate spatial segregation weight vector and summed across frequency bands; and a pattern matching process that includes templates of harmonic series of possible pitches.

31. The system of claim 16, wherein the estimation modules comprise an interaural intensity difference estimation module, and the segregation modules comprise an interaural intensity difference segregation module.

32. The system of claim 31, wherein the interaural intensity difference estimation module is configured to estimate interaural intensity difference based on a log ratio of local short time energy at the outputs of the phase alignment unit of the processing branches.

33. The system of claim 31, wherein the cue processing unit further comprises a lookup table coupling the IID estimation module with the IID segregation module, wherein the lookup table provides IID-frequency-azimuth mapping to estimate azimuth values, and wherein higher weights are given to the azimuth values closer to a centre direction of a user of the system.

34. The system of claim 16, wherein the estimation modules comprise an interaural time difference estimation module and the segregation modules comprise an interaural time difference segregation module.

35. The system of claim 34, wherein the interaural time difference estimation module is configured to cross-correlate the output of the inner hair cell unit of both processing branches after phase alignment to estimate interaural time difference.

* * * * *